US012716377B2

(12) United States Patent
Udhane et al.

(10) Patent No.: US 12,716,377 B2
(45) Date of Patent: Aug. 25, 2026

(54) MIXERS FOR EXHAUST AFTERTREATMENT SYSTEMS

(71) Applicant: Cummins Emission Solutions Inc., Columbus, IN (US)

(72) Inventors: Tushar Sudam Udhane, Pune (IN); Ryan M. Johnson, Cottage Grove, WI (US); Chetan Kishorrao Chawane, Pune (IN); Enoch Nanduru, Pune (IN); Jacob W. Brown, Columbus, IN (US); Ambarish D. Khot, Pune (IN); Nachiket D. Pawar, Pune (IN); Tanmay Puranik, Pune (IN); Mukesh Kumar, Pune (IN); Sachin Sharma, Pune (IN)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 19/048,740

(22) Filed: Feb. 7, 2025

(65) Prior Publication Data

US 2025/0179954 A1 Jun. 5, 2025

Related U.S. Application Data

(63) Continuation of application No. PCT/US2023/028796, filed on Jul. 27, 2023.

(30) Foreign Application Priority Data

Aug. 9, 2022 (IN) ............................ 202241045394

(51) Int. Cl.
*F01N 3/28* (2006.01)
*B01F 23/213* (2022.01)
(Continued)

(52) U.S. Cl.
CPC .......... *F01N 3/2892* (2013.01); *F01N 3/208* (2013.01); *B01F 23/21322* (2022.01);
(Continued)

(58) Field of Classification Search
CPC ............. B01F 2025/931; B01F 23/213; B01F 23/2132; B01F 23/21322; B01F 25/102;
(Continued)

(56) References Cited

U.S. PATENT DOCUMENTS 4,111,778 A 9/1978 Davis et al.
4,534,213 A 8/1985 Mirikidani
(Continued)

FOREIGN PATENT DOCUMENTS

CN 103573351 B 2/2014
CN 205025535 U 2/2016
(Continued)

OTHER PUBLICATIONS

Dwyer, "Air Velocity Measurement," retrieved from https://www.dwyer-inst.com/products/airvelocityintroduction.cfm, 6 pages (2010).
(Continued)

*Primary Examiner* — Binh Q Tran
(74) *Attorney, Agent, or Firm* — Foley & Lardner LLP

(57) ABSTRACT

A mixer for an exhaust aftertreatment system includes a mixer body positioned such that an injection axis of an injector of a dosing module extends into the mixer body. The mixer body receives exhaust and treatment fluid. The mixer further includes a plurality of apertures extending through the mixer body. Each of the apertures facilitate flow of the exhaust and the treatment fluid through the mixer body. The mixer further includes a plurality of blades. Each of the blades are coupled to the mixer body along a portion of one of the apertures. Each of the blades extend radially outward from the mixer body. The mixer further includes a first end.
(Continued)

The first end includes a plurality of tabs and a plurality of edge slots. Each of the edge slots is positioned between two of the tabs.

28 Claims, 41 Drawing Sheets

(51) Int. Cl.
*B01F 25/30* (2022.01)
*B01F 25/433* (2022.01)
*F01N 3/20* (2006.01)

(52) U.S. Cl.
CPC ........... *B01F 25/30* (2022.01); *B01F 25/4334* (2022.01); *B01F 25/4336* (2022.01); *F01N 3/206* (2013.01); *F01N 2610/01* (2013.01); *F01N 2610/1453* (2013.01)

(58) Field of Classification Search
CPC .. B01F 25/1041; B01F 25/30; B01F 25/3131; B01F 25/3142; B01F 25/40; B01F 25/4334; B01F 25/4336; B01F 25/70; B01F 25/72; F01N 3/206; F01N 3/2066; F01N 3/208; F01N 3/2892; F01N 2240/20; F01N 2330/28; F01N 2610/01; F01N 2610/02; F01N 2610/1453; F01N 2610/146
See application file for complete search history.

(56) References Cited

U.S. PATENT DOCUMENTS 4,851,015 A 7/1989 Wagner et al.
5,009,065 A 4/1991 Howe
5,285,640 A 2/1994 Olivo
5,355,973 A 10/1994 Wagner
5,403,557 A 4/1995 Harris
5,521,339 A 5/1996 Despain et al.
5,961,313 A 10/1999 Haumann et al.
6,158,214 A 12/2000 Kempka et al.
6,220,021 B1 4/2001 Frederiksen
6,651,773 B1 11/2003 Marocco
6,722,123 B2 4/2004 Liu et al.
6,729,127 B2 5/2004 Woerner et al.
6,732,509 B2 5/2004 Shiga
6,843,104 B2 1/2005 Busch
6,976,397 B2 12/2005 Widmer
7,104,358 B2 9/2006 Frederiksen
7,273,592 B2 9/2007 Jacob et al.
7,415,901 B2 8/2008 Desrochers et al.
7,430,855 B2 10/2008 Amemiya et al.
7,533,520 B2 5/2009 Cheng et al.
7,665,797 B1 2/2010 Brosseau
8,079,211 B2 12/2011 Levin et al.
8,114,364 B2 2/2012 Harinath et al.
8,220,253 B2 7/2012 Werni et al.
8,240,137 B2 8/2012 Liu et al.
8,341,936 B2 1/2013 Zhang
8,342,159 B2 1/2013 Detore
8,371,109 B2 2/2013 Endo et al.
8,393,147 B2 3/2013 Gerges
8,528,319 B2 9/2013 Wilhelm et al.
8,580,003 B2 11/2013 Mitsuda
8,789,363 B2 7/2014 Iverson et al.
8,991,160 B2 3/2015 Katou et al.
9,010,096 B2 4/2015 Golin et al.
9,103,252 B2 8/2015 Golin et al.
9,217,348 B2 12/2015 Kimura
9,221,016 B2 12/2015 Van Niekerk et al.
9,346,790 B2 5/2016 Alvaro et al.
9,352,276 B2 5/2016 Sampath
9,410,464 B2 8/2016 Hicks et al.
9,435,240 B2 9/2016 Sampath et al.
9,528,415 B2 12/2016 Brandl et al.
9,556,781 B2 1/2017 Ludeman et al.
9,790,832 B2 10/2017 Mitsuda
9,849,424 B2 12/2017 Davidson et al.
9,982,584 B2 5/2018 Püschel et al.
10,188,994 B2 1/2019 Tyni et al.
10,247,081 B2 4/2019 Niaz
10,273,853 B2 4/2019 Golin
10,273,855 B2 4/2019 Noren et al.
10,287,948 B1 5/2019 Moulieres et al.
10,422,268 B2 9/2019 Niaz
10,493,410 B2 12/2019 Muruganantham et al.
10,583,393 B2 3/2020 Valentine et al.
10,612,443 B2 4/2020 Li et al.
10,787,946 B2 9/2020 Rohde et al.
10,920,635 B2 2/2021 Kozakiewicz
10,920,642 B2 2/2021 Wang et al.
10,933,387 B2 3/2021 Cvelbar
10,967,334 B2 4/2021 Quan et al.
11,193,412 B2 12/2021 Cvelbar et al.
11,293,328 B2 4/2022 Cvelbar et al.
11,428,139 B2 8/2022 Lu et al.
11,459,929 B2 10/2022 Dimpelfeld et al.
2004/0040782 A1 3/2004 Frederiksen
2004/0099475 A1 5/2004 Schulte
2007/0039316 A1 2/2007 Bosanec et al.
2007/0101703 A1 5/2007 Kanaya et al.
2007/0214862 A1 9/2007 Kubinski et al.
2008/0041043 A1 2/2008 Andersen
2009/0007551 A1 1/2009 Wahlstrom et al.
2009/0145689 A1 6/2009 Han
2009/0165447 A1 7/2009 Hiranuma et al.
2009/0180937 A1 7/2009 Nohl et al.
2009/0266644 A1 10/2009 Price
2010/0064662 A1 3/2010 Hinz et al.
2010/0107614 A1 5/2010 Levin et al.
2010/0139258 A1 6/2010 Hackett et al.
2010/0146942 A1 6/2010 Mayr et al.
2010/0196225 A1 8/2010 Harinath et al.
2010/0212292 A1 8/2010 Rusch et al.
2010/0263359 A1 10/2010 Haverkamp et al.
2010/0319329 A1 12/2010 Khadiya
2011/0030343 A1 2/2011 Kiser et al.
2011/0094206 A1 4/2011 Liu et al.
2011/0099978 A1 5/2011 Davidson et al.
2011/0107743 A1 5/2011 Ranganathan et al.
2011/0113759 A1 5/2011 Tilinski et al.
2011/0131958 A1 6/2011 Adelman et al.
2011/0146253 A1 6/2011 Isada et al.
2011/0146254 A1 6/2011 Yi et al.
2011/0167805 A1 7/2011 Chen
2011/0180347 A1 7/2011 Butler
2012/0090305 A1 4/2012 Floyd et al.
2012/0102920 A1 5/2012 Pipis, Jr.
2012/0174561 A1 7/2012 Troxler et al.
2012/0324872 A1 12/2012 Jaruvatee et al.
2013/0031891 A1 2/2013 Ponnathpur
2013/0061577 A1 3/2013 Floyd et al.
2013/0167516 A1 7/2013 Loman
2013/0340417 A1 12/2013 Morey et al.
2014/0230411 A1 8/2014 De Rudder et al.
2014/0238000 A1* 8/2014 Olivier ...................... F01N 3/38 60/303
2014/0325967 A1 11/2014 Kimura
2015/0040537 A1* 2/2015 Hicks .................. B01F 23/2132 60/273
2015/0071826 A1* 3/2015 Sampath ............... F01N 3/2892 422/168
2015/0071828 A1 3/2015 Sampath et al.
2015/0101318 A1 4/2015 Munnannur et al.
2015/0218996 A1 8/2015 Brandl et al.
2015/0233276 A1 8/2015 Cassity et al.
2016/0006111 A1 1/2016 Miskovsk et al.
2016/0047288 A1 2/2016 Arrowsmith et al.
2016/0084133 A1 3/2016 Sampath et al.
2016/0129397 A1 5/2016 Lee et al.
2016/0215673 A1 7/2016 Noren et al.
2016/0326931 A1* 11/2016 Freeman ............... F01N 3/2066
2017/0074133 A1 3/2017 Reichelt et al.

(56) References Cited

U.S. PATENT DOCUMENTS

| | | | | |
|---|---|---|---|---|
| 2017/0082007 | A1 | 3/2017 | Alano et al. | |
| 2017/0342888 | A1* | 11/2017 | Noren, IV | F01N 3/2892 |
| 2017/0361273 | A1 | 12/2017 | Zoran et al. | |
| 2017/0370262 | A1 | 12/2017 | Zoran et al. | |
| 2018/0058291 | A1 | 3/2018 | Bugos et al. | |
| 2018/0078912 | A1 | 3/2018 | Yadav et al. | |
| 2018/0363530 | A1 | 12/2018 | Caulkins et al. | |
| 2019/0101037 | A1* | 4/2019 | Golin | B01D 53/944 |
| 2020/0047136 | A1 | 2/2020 | Kurpejovic et al. | |
| 2020/0123955 | A1* | 4/2020 | Liu | B01F 25/31425 |
| 2020/0206700 | A1 | 7/2020 | Seal et al. | |
| 2020/0269189 | A1 | 8/2020 | Alano et al. | |
| 2020/0376450 | A1 | 12/2020 | Poinsot et al. | |
| 2021/0039056 | A1 | 2/2021 | De Rudder et al. | |
| 2021/0095587 | A1 | 4/2021 | Cvelbar et al. | |
| 2021/0095588 | A1 | 4/2021 | Gandikota et al. | |
| 2021/0270174 | A1 | 9/2021 | Volmerding et al. | |
| 2021/0285356 | A1 | 9/2021 | Tan et al. | |
| 2021/0301710 | A1 | 9/2021 | Cvelbar et al. | |
| 2021/0308635 | A1 | 10/2021 | Mayer et al. | |
| 2021/0348538 | A1 | 11/2021 | Aru et al. | |
| 2021/0388751 | A1 | 12/2021 | Cvelbar et al. | |
| 2021/0404367 | A1 | 12/2021 | Alano et al. | |
| 2022/0090531 | A1 | 3/2022 | Cvelbar et al. | |
| 2022/0162974 | A1 | 5/2022 | Cvelbar et al. | |
| 2022/0162975 | A1 | 5/2022 | Cvelbar et al. | |
| 2022/0162976 | A1 | 5/2022 | Alano et al. | |
| 2022/0178293 | A1 | 6/2022 | Lu et al. | |
| 2022/0184567 | A1 | 6/2022 | Geant | |
| 2022/0341357 | A1* | 10/2022 | Chauvin | F01N 3/2892 |
| 2023/0065989 | A1 | 3/2023 | Geant et al. | |

FOREIGN PATENT DOCUMENTS

| | | | |
|---|---|---|---|
| CN | 106232955 | A | 12/2016 |
| CN | 108374708 | A | 8/2018 |
| CN | 208106533 | U | 11/2018 |
| CN | 110761876 | A | 2/2020 |
| CN | 210195855 | U | 3/2020 |
| CN | 210686097 | U | 6/2020 |
| CN | 210829445 | U | 6/2020 |
| CN | 210858886 | U | 6/2020 |
| CN | 211082028 | U | 7/2020 |
| CN | 211116205 | U | 7/2020 |
| CN | 211314342 | U | 8/2020 |
| CN | 211397693 | U | 9/2020 |
| CN | 211573625 | U | 9/2020 |
| CN | 211737255 | U | 10/2020 |
| CN | 212130586 | U | 12/2020 |
| CN | 212130587 | U | 12/2020 |
| CN | 112196645 | A | 1/2021 |
| CN | 112282900 | A | 1/2021 |
| CN | 212671904 | U | 3/2021 |
| CN | 214836650 | U | 11/2021 |
| CN | 214887318 | U | 11/2021 |
| CN | 215109110 | U | 12/2021 |
| CN | 215292631 | U | 12/2021 |
| CN | 215486219 | U | 1/2022 |
| CN | 216617626 | U | 5/2022 |
| CN | 217872989 | U | 11/2022 |
| DE | 10203310 | A1 | 7/2003 |
| DE | 10348175 | A1 | 5/2004 |
| DE | 10 2008 018 063 | A1 | 11/2008 |
| DE | 10 2008 043 408 | A1 | 5/2010 |
| DE | 10 2009 036 511 | A1 | 2/2011 |
| DE | 10 2018 107 690 | A1 | 10/2019 |
| DE | 10 2020 128 226 | B3 | 9/2021 |
| EP | 0 556 846 | A1 | 8/1993 |
| EP | 0 931 913 | A1 | 7/1999 |
| EP | 0 978 721 | A1 | 2/2000 |
| EP | 1 748 162 | A1 | 1/2007 |
| FR | 2290580 | B1 | 6/1976 |
| FR | 3102684 | B1 | 11/2021 |
| FR | 3102683 | B1 | 6/2022 |
| GB | 2 448 993 | B | 11/2008 |
| GB | 2 539 711 | | 12/2016 |
| JP | 2009-150338 | A | 7/2009 |
| JP | 2009-167965 | A | 7/2009 |
| KR | 20150099893 | A | 9/2015 |
| WO | WO-2011/126930 | A2 | 10/2011 |
| WO | WO-2011/163395 | A1 | 12/2011 |
| WO | WO-2013/025860 | A1 | 2/2013 |
| WO | WO-2018/040300 | A1 | 3/2018 |
| WO | WO-2020/009694 | A1 | 1/2020 |

OTHER PUBLICATIONS

Elnady, et al., "Investigation of the Acoustic Performance of After Treatment Devices," SAE International Journal of Passenger Cars—Mechanical Systems 42(2), pp. 1068-1075 (2011).

Extended European Search Report in European Patent App. No. 13154457.9 dated May 7, 2013, 7 pages.

Final Office Action in U.S. Appl. No. 17/851,361 issued Jul. 16, 2024.

Final Office Action in U.S. Appl. No. 17/947,822 issued May 25, 2023.

Search Report in French Patent Application No. FR2400263 issued Apr. 8, 2024.

Search Report in French Patent Application No. FR 2213452 issued May 31, 2023.

Search Report in French Patent Application No. 2302689 dated Oct. 6, 2023.

Howard & craig, "Adaptive-Passive Quarter-Wave Tube Resonator Silencer," Proceedings of Acoustics 2011, 64, 6 pages (2011).

International Search Report & Written Opinion in PCT Application No. PCT/US2015/010837, issued May 6, 2015.

International Search Report & Written Opinion in PCT Application No. PCT/US2018/040737, issued Sep. 7, 2018.

International Search Report and Written Opinion in PCT Application No. PCT/US2023/028796, issued Oct. 19, 2023.

International Search Report and Written opinion in PCT Application No. PCT/US2018/00259, issued Dec. 6, 2018.

International Search Report and Written Opinion in PCT Application No. PCT/US2023/083072 dated Feb. 15, 2024.

International Search Report and Written Opinion in PCT Application No. PCT/US2024/20901 issued Jul. 16, 2024.

Non-Final Office Action in U.S. Appl. No. 17/255,310 issued Mar. 7, 2022.

Non-Final Office Action in U.S. Appl. No. 17/851,361 issued Mar. 28, 2024.

Non-Final Office Action in U.S. Appl. No. 17/947,822 issued Jan. 18, 2023.

Office Action in U.S. Appl. No. 17/042,578 issued May 12, 2021.

Proventia, Improved SCR Performance with Effective Urea Mixing, https://www.proventia.com/emission_control/oem_emission_control_non- road/eat_systems_technologies/scr_and_urea_mixing (last accessed Mar. 22, 2022).

Star-CCM+, Droplets trajectories and velocities inside Proventia Tornado mixer, Nov. 12, 2019, https://www.youtube.com/watch?v=qMViqu8RYPs (Last accessed Mar. 22, 2022).

Office Action In U.S. Appl. No. 19/020,093 issued Feb. 20, 2026.

Notice of Allowance in U.S. Appl. No. 19/020,093 issued May 8, 2026.

* cited by examiner

MIXERS FOR EXHAUST AFTERTREATMENT SYSTEMS

CROSS-REFERENCE TO RELATED APPLICATION

This application claims the benefit of and priority to India Provisional Patent Application No. 202241045394, filed Aug. 9, 2022, which is incorporated herein by reference in its entirety.

TECHNICAL FIELD

The present disclosure relates generally to mixers for exhaust aftertreatment systems for an internal combustion engine.

BACKGROUND

The exhaust of internal combustion engines, such as diesel engines, includes nitrogen oxide ($NO_x$) compounds. It is desirable to reduce $NO_x$ emissions to comply with environmental regulations, for example. To reduce $NO_x$ emissions, a treatment fluid may be dosed into the exhaust by a doser assembly within an aftertreatment system. The treatment fluid facilitates conversion of a portion of the exhaust into non-$NO_x$ emissions, such as nitrogen ($N_2$), carbon dioxide ($CO_2$), and water ($H_2O$), thereby reducing $NO_x$ emissions. These aftertreatment systems may include a mixer that facilitates mixing of the treatment fluid and the exhaust.

SUMMARY

In one embodiment, a mixer for an exhaust aftertreatment system includes a mixer body positioned such that an injection axis of an injector of a dosing module extends into the mixer body. The mixer body receives exhaust and treatment fluid. The mixer further includes a plurality of apertures extending through the mixer body. Each of the apertures facilitate flow of the exhaust and the treatment fluid through the mixer body. The mixer further includes a plurality of blades. Each of the blades are coupled to the mixer body along a portion of one of the apertures. Each of the blades extend radially outward from the mixer body. The mixer further includes a first end. The first end includes a plurality of tabs and a plurality of edge slots. Each of the edge slots is positioned between two of the tabs.

In another embodiment, a mixer for an exhaust aftertreatment system include a mixer body centered on a mixer axis and positioned such that an injection axis of an injector of a dosing module extends into the mixer body. The mixer body receives exhaust and treatment fluid. The mixer further includes a plurality of apertures extending through the mixer body. Each of the apertures disposed on the mixer body at an aperture angle relative to a reference axis that is parallel to the mixer axis. The aperture angle is between 5 degrees and 30 degrees. Each of the apertures facilitates flow of the exhaust through the mixer body. Each of the apertures includes a first edge and a second edge perpendicular to the first edge and contiguous with the first edge. The mixer further includes a plurality of blades. Each of the blades is coupled to the mixer body along a portion of one of the apertures. Each of the blades extends radially inward from the mixer body. The reference axis extends through: (i) an intersection between the first edge and the second edge of one of the apertures and (ii) an intersection between the first edge and the second edge of another of the apertures.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

Figure 1:
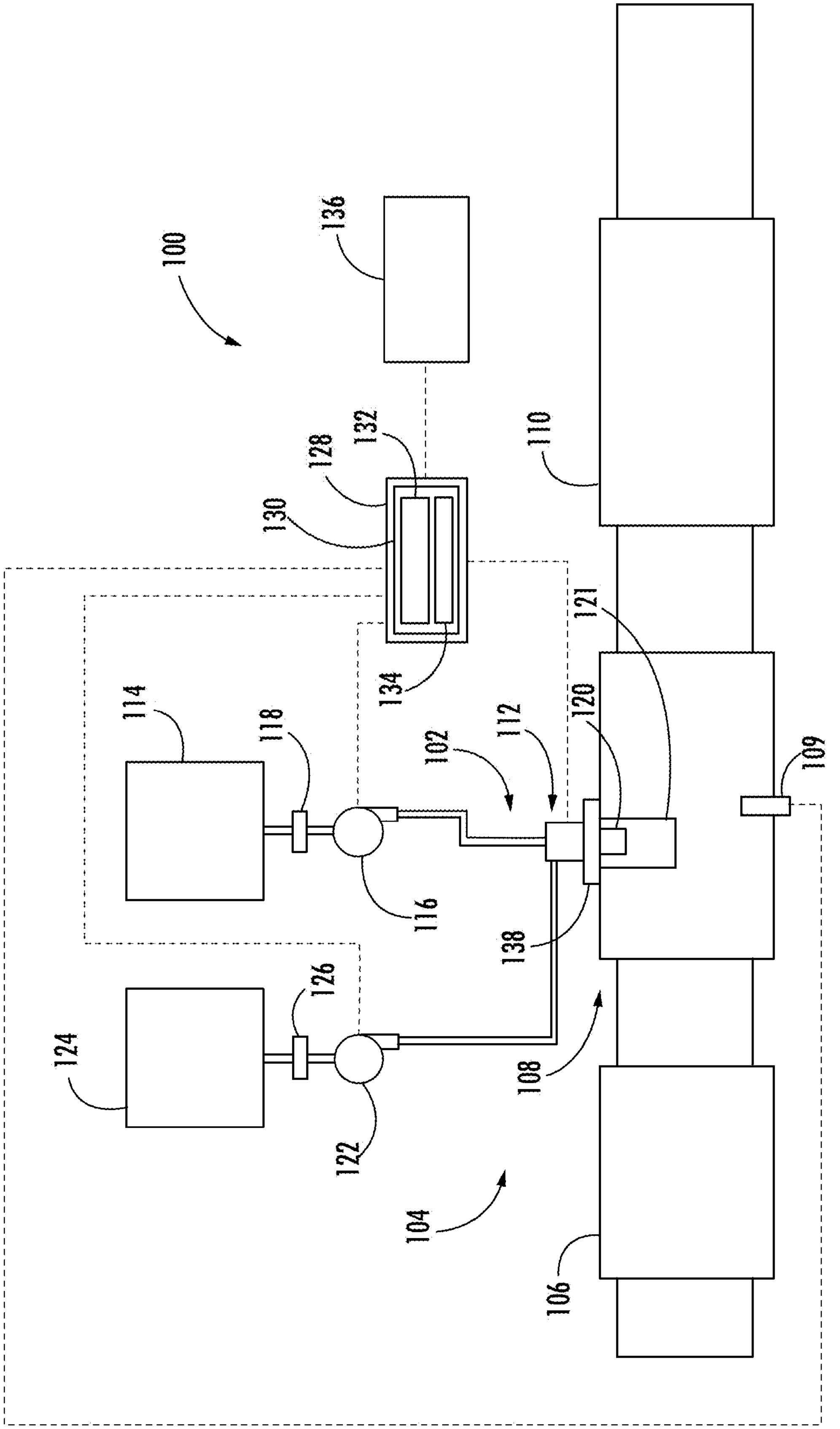
FIG. 1 is a block schematic diagram of an example exhaust aftertreatment system.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing a mixer for an exhaust aftertreatment system of an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust that is often treated by a doser assembly within an exhaust aftertreatment system. The doser assembly typically treats exhaust using a treatment fluid (e.g., reductant, hydrocarbon, etc.) released from the doser assembly by an injector of a doser. The treatment fluid, such as the reductant, may be adsorbed by a catalyst member. The adsorbed treatment fluid in the catalyst member functions to reduce $NO_x$ in the exhaust. The treatment fluid, such as the hydrocarbon, may increase a temperature of the exhaust to reduce $NO_x$ in the exhaust. The doser assembly is mounted on a component of the exhaust aftertreatment system. For example, the doser assembly may be mounted on a decomposition reactor, an exhaust conduit, a panel, or other similar components of the exhaust aftertreatment system.

Mixing the exhaust with the treatment fluid improves the reduction of NOx in the exhaust. A device can be used to facilitate mixing between the exhaust and the treatment fluid through turbulent flow (e.g., turbulence, etc.). Turbulence in the form of swirling (e.g., eddies, etc.) improves the mixing characteristics of a fluid. For example, swirling of the exhaust causes dispersal of treatment fluid within the exhaust, thereby improving the mixing between the exhaust and the treatment fluid. However, a device in a flow path of the treatment fluid may be prone to collecting (e.g., accumulating, etc.) deposits of the treatment fluid. These deposits may reduce a mixing efficiency of the device and a flow rate of the exhaust and/or the treatment fluid within a conduit that the device is within or fluidly coupled to.

Implementations herein are directed to an exhaust aftertreatment system that includes a panel and a mixer coupled to an inner side of the panel. The mixer includes a mixer body configured to receive exhaust and treatment fluid. The mixer also includes a plurality of apertures that extend through the mixer body. The apertures facilitate flow of the exhaust and the treatment fluid through the mixer body. The mixer also includes a plurality of blades. The blades are coupled to the mixer body along portions of the apertures and extend radially outward from the mixer body. The blades cause the exhaust to swirl and disperse the treatment fluid in the exhaust. The mixer may also include a first end having a plurality of tabs coupled to the inner side of the panel. The mixer may also include and a plurality of edge slots, where the edge slots are positioned between two of the tabs. The edge slots facilitate flow of the exhaust between the mixer and the inner side of the panel, such that deposits of the treatment fluid are prevented or minimized from collecting on the mixer via the exhaust. Deposits of the treatment fluid are most prone to collecting near an injector of the dosing module. In these implementation, the injector is coupled to an outer side of the panel, such that the first end of the mixer is a nearest component of the mixer to the injector.

Implementations herein are also directed to an exhaust aftertreatment system that includes a decomposition chamber, a panel that forms a wall upstream of the decomposition chamber, and a mixer coupled to an inner side of the panel. The decomposition chamber is configured to receive exhaust and a treatment fluid and convert the treatment fluid into ammonia. The mixer includes a mixer body configured to receive the exhaust and the treatment fluid. The mixer also includes a plurality of apertures that extend through the mixer body. The apertures facilitate flow of the exhaust and the treatment fluid through the mixer body. The mixer also includes a plurality of blades. The blades are coupled to the mixer body along portions of the apertures and extend radially inward from the mixer body. The blades cause the exhaust to swirl and disperse the treatment fluid in the exhaust. Having the blades extend radially inward form the mixer body reduces a number of impingement surfaces contacting the exhaust as the exhaust enters the mixer body, which results in less deposits forming on the mixer. The mixer body may be combined with the decomposition chamber, such that the mixer body functions as the decomposition chamber. This results in reducing a pressure drop within the decomposition chamber, assisting the mixer in efficiently dispersing the treatment fluid within the exhaust downstream of the mixer. The exhaust aftertreatment system may further include an additional mixing volume downstream of the mixer. The additional mixing volume provides additional time, via space (e.g., volume), for the exhaust and treatment fluid to mix, resulting in better mixing of the exhaust and treatment fluid.

II. Overview of Exhaust Aftertreatment Systems

FIG. 1 depicts an exhaust aftertreatment system 100 having an example treatment fluid delivery system 102 for an exhaust conduit system 104. The exhaust aftertreatment system 100 includes the treatment fluid delivery system 102, a particulate filter 106 (e.g., a diesel particulate filter (DPF)), a decomposition chamber 108 (e.g., reactor, reactor pipe, conduit, etc.), and a catalyst member 110 (e.g., SCR catalyst member, etc.).

The particulate filter 106 is configured to (e.g., structured to, able to, etc.) remove particulate matter, such as soot, from exhaust flowing in the exhaust conduit system 104. The particulate filter 106 includes an inlet, where the exhaust is received, and an outlet, where the exhaust exits after having particulate matter substantially filtered from the exhaust and/or converting the particulate matter into carbon dioxide. In some implementations, the particulate filter 106 may be omitted.

Figure 2:
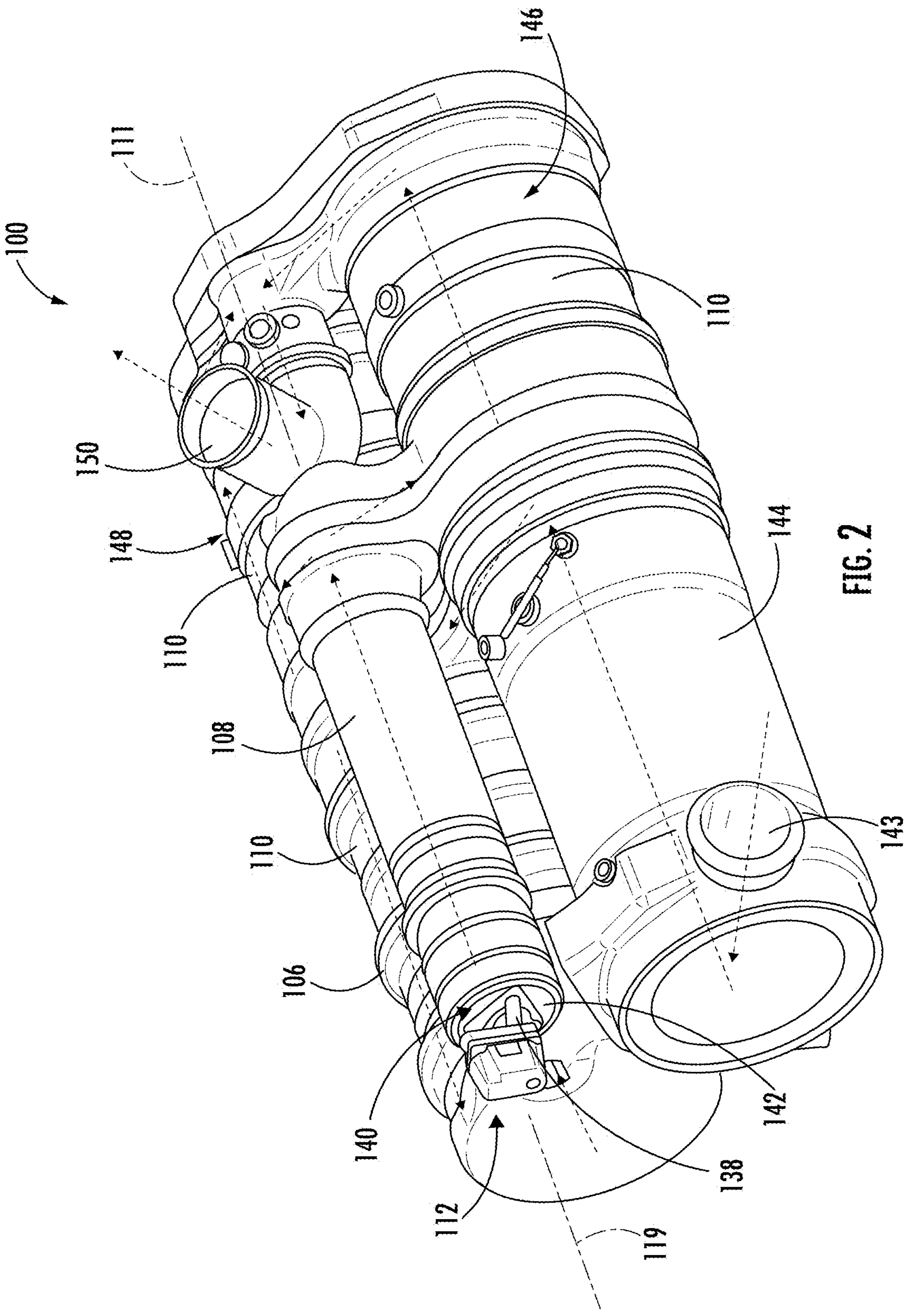
FIG. 2 is a perspective view of another example exhaust aftertreatment system.
Figure 3:
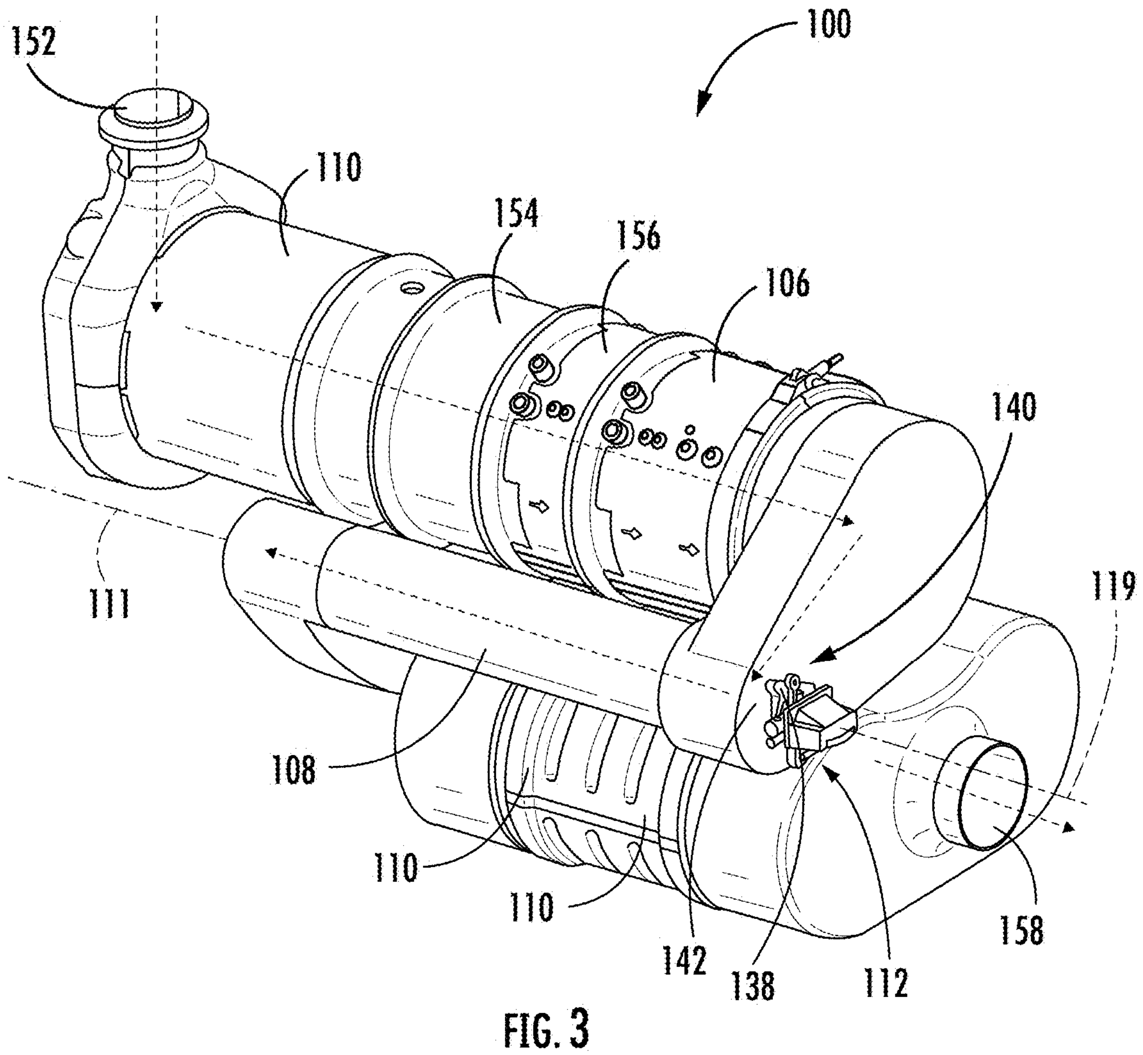
FIG. 3 is a perspective view of yet another example exhaust aftertreatment system.

The decomposition chamber 108 is configured to receive the exhaust from the particulate filter 106 and a treatment fluid from the treatment fluid delivery system 102. The treatment fluid may be, for example, a reductant (e.g., urea, diesel exhaust fluid (DEF), Adblue®, a urea water solution (UWS), an aqueous urea solution (e.g., AUS32, etc.), and/or other similar fluids) or a hydrocarbon (e.g., fuel, oil, additive, etc.). When the reductant is introduced into the exhaust, reduction of emission of undesirable components (e.g., $NO_x$, etc.) in the exhaust may be facilitated. When the hydrocarbon is introduced into the exhaust, the temperature of the exhaust may be increased (e.g., to facilitate regeneration of components of the exhaust aftertreatment system 100, etc.). For example, the exhaust aftertreatment system 100 may include a spark plug 109 (e.g., igniter, etc.) configured to increase the temperature of the exhaust by combusting the hydrocarbon within the exhaust. The decomposition chamber 108 includes an inlet in fluid communication with the particulate filter 106 to receive the exhaust containing $NO_x$ emissions and an outlet for the exhaust, $NO_x$ emissions, ammonia, and/or treatment fluid to flow to the catalyst member 110. In some embodiments, such as is shown in FIGS. 2 and 3, the decomposition chamber 108 is centered on a chamber axis 111.

The treatment fluid delivery system 102 includes a doser assembly 112 (e.g., dosing module, etc.) configured to dose the treatment fluid into the decomposition chamber 108 (e.g., via an injector). The doser assembly 112 is mounted to the decomposition chamber 108 such that the doser assembly 112 may dose the treatment fluid into the exhaust flowing through the exhaust conduit system 104. The doser assembly 112 may include an insulator (e.g., vibrational insulator, thermal insulator, etc.) interposed between a portion of the doser assembly 112 and a portion of the decomposition chamber 108 on which the doser assembly 112 is mounted. The insulator may mitigate transfer of vibrations and/or heat from the decomposition chamber 108 to the doser assembly 112.

The doser assembly 112 is fluidly coupled to (e.g., fluidly configured to communicate with, etc.) a treatment fluid source 114. The treatment fluid source 114 may include multiple treatment fluid sources 114. The treatment fluid source 114 may be, for example, a diesel exhaust fluid tank containing Adblue®. A treatment fluid pump 116 (e.g., supply unit, etc.) is used to pressurize the treatment fluid from the treatment fluid source 114 for delivery to the doser assembly 112. In some embodiments, the treatment fluid pump 116 is pressure-controlled (e.g., controlled to obtain a target pressure, etc.). The treatment fluid pump 116 includes a treatment fluid filter 118. The treatment fluid filter 118 filters (e.g., strains, etc.) the treatment fluid prior to the treatment fluid being provided to internal components (e.g., pistons, vanes, etc.) of the treatment fluid pump 116. For example, the treatment fluid filter 118 may inhibit or prevent the transmission of solids (e.g., solidified treatment fluid, contaminants, etc.) to the internal components of the treatment fluid pump 116. In this way, the treatment fluid filter 118 may facilitate prolonged desirable operation of the treatment fluid pump 116. In some embodiments, the treatment fluid pump 116 is coupled (e.g., fastened, attached, affixed, welded, etc.) to a chassis of a vehicle associated with the exhaust aftertreatment system 100.

The doser assembly 112 includes at least one injector 120. Each injector 120 is configured to dose the treatment fluid into the exhaust (e.g., within the decomposition chamber 108, etc.) at an injection axis 119. The exhaust aftertreatment system 100 includes a mixer 121 (e.g., a swirl generating device, a vane plate, inlet plate, deflector plate, etc.). At least a portion of the mixer 121 may be located within the decomposition chamber 108. However, at least a portion of the mixer 121 may also be located in a conduit of the exhaust conduit system 104 (e.g., a conduit upstream of the decomposition chamber 108, etc.). The mixer 121 is configured to receive exhaust from the decomposition chamber 108 and treatment fluid from the injector 120, such that the injection axis 119 extends into the mixer 121. The mixer 121 is also configured to facilitate mixing of the exhaust and the treatment fluid. The mixer 121 is configured to facilitate swirling (e.g., tumbling, rotation, etc.) of the exhaust and mixing (e.g., combination, etc.) of the exhaust and the treatment fluid so as to disperse the treatment fluid within the exhaust downstream of the mixer 121. By dispersing the treatment fluid within the exhaust (e.g., to obtain an increased uniformity index, etc.) using the mixer 121, reduction of emission of undesirable components in the exhaust is enhanced or a temperature of the exhaust may be increased.

While the injection axis 119 extends into the mixer 121, the injection axis 119 may extend into the mixer 121 at an angle relative to a central axis of the mixer 121. For example, in some embodiments, the injection axis 119 may be coincident with a central axis of the mixer 121. In other embodiments, the injection axis 119 may be perpendicular to the central axis of the mixer 121. In yet other embodiment, the injection axis 119 may be parallel to the central axis of the mixer 121.

In some embodiments, the injector 120 is not directly coupled to the mixer 121. In these embodiments, the injector 120 and the mixer 121 may each be coupled to a same component (e.g., panel, chamber, etc.). In other embodiments, the injector 120 is directly coupled to the mixer 121. In these embodiments, the injector 120 and the mixer 121 may also each be coupled to the same component. In some embodiments, the injector 120 is not disposed within the mixer 121. In other embodiments, the injector 120 may be at least partially disposed within the mixer 121.

In some embodiments, the treatment fluid delivery system 102 also includes an air pump 122. In these embodiments, the air pump 122 draws air from an air source 124 (e.g., air intake, etc.) and through an air filter 126 disposed upstream of the air pump 122. Additionally, the air pump 122 provides the air to the doser assembly 112 via a conduit. In these embodiments, the doser assembly 112 is configured to mix the air and the treatment fluid into an air-treatment fluid mixture and to provide the air-treatment fluid mixture into the decomposition chamber 108. In other embodiments, the treatment fluid delivery system 102 does not include the air pump 122 or the air source 124. In such embodiments, the doser assembly 112 is not configured to mix the treatment fluid with air.

The spark plug 109, the doser assembly 112, and the treatment fluid pump 116 are also electrically or communicatively coupled to a treatment fluid delivery system controller 128. The treatment fluid delivery system controller 128 may control the spark plug 109 to ignite the treatment fluid in the decomposition chamber 108. The treatment fluid delivery system controller 128 controls the doser assembly 112 to dose the treatment fluid into the decomposition chamber 108. The treatment fluid delivery system controller 128 may also control the treatment fluid pump 116.

The treatment fluid delivery system controller 128 includes a processing circuit 130. The processing circuit 130 includes a processor 132 and a memory 134. The processor 132 may include a microprocessor, an application-specific integrated circuit (ASIC), a field-programmable gate array (FPGA), etc., or combinations thereof. The memory 134 may include, but is not limited to, electronic, optical, magnetic, or any other storage or transmission device capable of providing a processor, ASIC, FPGA, etc. with program instructions. This memory 134 may include a memory chip, Electrically Erasable Programmable Read-Only Memory (EEPROM), Erasable Programmable Read Only Memory (EPROM), flash memory, or any other suitable memory from which the treatment fluid delivery system controller 128 can read instructions. The instructions may include code from any suitable programming language. The memory 134 may include various modules that include instructions which are configured to be implemented by the processor 132.

In various embodiments, the treatment fluid delivery system controller 128 is configured to communicate with a central controller 136 (e.g., engine control unit (ECU), engine control module (ECM), etc.) of an internal combustion engine having the exhaust aftertreatment system 100. In some embodiments, the central controller 136 and the treatment fluid delivery system controller 128 are integrated into a single controller.

In some embodiments, the central controller 136 is communicable with a display device (e.g., screen, monitor, touch screen, heads up display (HUD), indicator light, etc.). The display device may be configured to change state in response to receiving information from the central controller 136. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 136. By changing state, the display device may provide an indication to a user (e.g., operator, etc.) of a status (e.g., operation, in need of service, etc.) of the treatment fluid delivery system 102.

The decomposition chamber 108 is located upstream of the catalyst member 110. As a result, the treatment fluid is injected upstream of the catalyst member 110 such that the catalyst member 110 receives a mixture of the treatment fluid and exhaust. The treatment fluid droplets undergo the processes of evaporation, thermolysis, and hydrolysis to form non-$NO_x$ emissions (e.g., gaseous ammonia, etc.) within the exhaust conduit system 104.

The catalyst member 110 includes an inlet in fluid communication with the decomposition chamber 108 from which exhaust and treatment fluid are received and an outlet in fluid communication with an end of the exhaust conduit system 104.

The exhaust aftertreatment system 100 may further include an oxidation catalyst member (e.g., a diesel oxidation catalyst (DOC)) in fluid communication with the exhaust conduit system 104 (e.g., downstream of the catalyst member 110 or upstream of the particulate filter 106) to oxidize hydrocarbons and carbon monoxide in the exhaust.

In some implementations, the particulate filter 106 may be positioned downstream of the decomposition chamber 108. For instance, the particulate filter 106 and the catalyst member 110 may be combined into a single unit. In some implementations, the doser assembly 112 may instead be positioned downstream of a turbocharger or upstream of a turbocharger.

The exhaust aftertreatment system 100 also includes a doser mounting bracket 138 (e.g., mounting bracket, coupler, plate, etc.). The doser mounting bracket 138 couples the doser assembly 112 to a component of the exhaust aftertreatment system 100. The doser mounting bracket 138 is configured to mitigate the transfer of heat from the exhaust passing through the exhaust conduit system 104 to the doser assembly 112. In this way, the doser assembly 112 is capable of operating more efficiently and desirably than other doser assemblies which are not able to mitigate the transfer of heat. Additionally, the doser mounting bracket 138 is configured to aid in reliable installation of the doser assembly 112. This may decrease manufacturing costs associated with the exhaust aftertreatment system 100 and ensure repeated desirable installation of the doser assembly 112.

In various embodiments, the doser mounting bracket 138 couples the doser assembly 112 to the decomposition chamber 108. In some embodiments, the doser mounting bracket 138 couples the doser assembly 112 to an exhaust conduit of the exhaust conduit system 104. For example, the doser mounting bracket 138 may couple the doser assembly 112 to an exhaust conduit of the exhaust conduit system 104 that is upstream of the decomposition chamber 108 or to an exhaust conduit of the exhaust conduit system 104 that is downstream of the decomposition chamber 108. In some embodiments, the doser mounting bracket 138 couples the doser assembly 112 to the particulate filter 106 and/or the catalyst member 110. The location of the doser mounting bracket 138 may be varied depending on the application of the exhaust aftertreatment system 100. For example, in some exhaust aftertreatment systems 100, the doser mounting bracket 138 may be located further upstream than in other exhaust aftertreatment systems 100. Furthermore, some exhaust aftertreatment systems 100 may include multiple doser assemblies 112 and therefore may include multiple doser mounting brackets 138.

FIGS. 2-5 illustrate various embodiments of the exhaust aftertreatment system 100, where a flow direction of the exhaust is shown by dashed lines. In these embodiments, the exhaust aftertreatment system 100 also includes a panel 140 (e.g., endcap, etc.). The panel 140 forms a wall upstream of the decomposition chamber 108 and downstream of the particulate filter 106. The doser mounting bracket 138 is coupled to the panel 140. The panel 140 may be coupled to the decomposition chamber 108. In some embodiments, such as those shown in FIGS. 2 and 3, the panel 140 is positioned such that the chamber axis 111 extends through the panel 140. The panel 140 includes an inner side 141 (e.g., inner surface, inside surface, etc.) that faces the decomposition chamber 108. The panel 140 also includes an outer side 142 (e.g., outer surface, outside surface, etc.) opposite the inner side 141. The outer side 142 faces the doser mounting bracket 138. The doser assembly 112 is coupled to the outer side 142 via the doser mounting bracket 138. As a result of the doser assembly 112 being coupled to the outer side 142, the injector 120 is configured to provide the treatment fluid into the decomposition chamber 108 though the panel 140. The panel 140 may include an injector aperture 139 configured to receive the injector 120 when the doser assembly 112 is coupled to the outer side 142 of the panel 140.

FIG. 2 illustrates an embodiment of the exhaust aftertreatment system 100. In this embodiment, the exhaust aftertreatment system 100 includes an inlet exhaust conduit 143 (e.g., chamber, pipe, etc.) fluidly coupled to the internal combustion engine and is configured to receive the exhaust from the internal combustion engine. The exhaust aftertreatment system 100 further includes an oxidation catalyst member 144 disposed downstream of the inlet exhaust conduit 143 and configured to receive the exhaust from the inlet exhaust conduit 143. The exhaust aftertreatment system 100 further includes a first conversion catalyst member (e.g., catalyst member 110) disposed downstream of the oxidation catalyst member 144 and configured to receive the exhaust from the oxidation catalyst member 144. The exhaust aftertreatment system 100 further includes an exhaust filtration member (e.g., the particulate filter 106) disposed downstream of the first conversion catalyst member and configured to receive the exhaust from the first conversion catalyst member. The exhaust aftertreatment system 100 further includes the decomposition chamber 108 disposed downstream of the exhaust filtration member and configured to receive the exhaust from the exhaust filtration member. The exhaust aftertreatment system 100 further includes the panel 140 and the doser assembly 112 is coupled to the panel 140. The injector 120 of the doser assembly 112 is configured to inject the treatment fluid through the panel 140 and into the decomposition chamber 108.

In the embodiment illustrated in FIG. 2, the exhaust aftertreatment system 100 further includes a first exhaust dividing conduit 146 (e.g., chamber, pipe, etc.) and a second exhaust dividing conduit 148 (e.g., chamber, pipe, etc.). Both the first exhaust dividing conduit 146 and the second exhaust dividing conduit 148 are downstream of the decomposition chamber 108 and are configured to receive the exhaust from the decomposition chamber 108, where the exhaust from the decomposition chamber 108 is split (e.g., divided, spread, etc.) approximately evenly (e.g., evenly, within 5% of being even, etc.) among the first exhaust dividing conduit 146 and the second exhaust dividing conduit 148. The exhaust aftertreatment system 100 includes a second conversion catalyst member (e.g., catalyst member 110) coupled to the first exhaust dividing conduit 146 and configured to receive the exhaust from the decomposition chamber 108 through the first exhaust dividing conduit 146. The exhaust aftertreatment system 100 includes a third conversion catalyst member (e.g., catalyst member 110) coupled to the second exhaust dividing conduit 148 and configured to receive the exhaust from the decomposition chamber 108 through the second exhaust dividing conduit 148. The exhaust aftertreatment system 100 further includes an outlet exhaust conduit 150 disposed downstream of the first exhaust dividing conduit 146 and the second exhaust dividing conduit 148 and configured to receive the exhaust from the first exhaust dividing conduit 146 and the second exhaust dividing conduit 148.

FIG. 3 illustrates another embodiment of the exhaust aftertreatment system 100. In this embodiment, the exhaust aftertreatment system 100 includes an intake chamber 152 (e.g., line, pipe, etc.). The intake chamber 152 is configured to receive the exhaust from the internal combustion engine. The exhaust aftertreatment system 100 further includes an upstream catalyst member (e.g., catalyst member 110). The upstream catalyst member is disposed downstream of the intake chamber 152. The upstream catalyst member is configured to receive the exhaust from the intake chamber 152. The exhaust aftertreatment system 100 may include a hydrocarbon decomposition chamber 154 (e.g., reactor, reactor pipe, conduit, etc.) that is downstream of the upstream catalyst member and configured to receive the exhaust from the upstream catalyst member and treat (e.g., dose, etc.) the exhaust with hydrocarbons via a hydrocarbon dosing module. The exhaust aftertreatment system 100 further includes a first oxidation catalyst member 156 disposed downstream of the hydrocarbon decomposition chamber 154. The first oxidation catalyst member 156 is configured to receive the exhaust from the hydrocarbon decomposition chamber 154.

In the embodiment illustrated in FIG. 3, the exhaust aftertreatment system 100 further includes an upstream particulate filter (e.g., the particulate filter 106) disposed downstream of the first oxidation catalyst member 156. The upstream particulate filter is configured to receive the exhaust from the first oxidation catalyst member 156. The exhaust aftertreatment system 100 further includes the decomposition chamber 108 disposed downstream of the upstream particulate filter. The decomposition chamber 108 is configured to receive the exhaust from the upstream particulate filter. The exhaust aftertreatment system 100 further includes the panel 140 and the doser assembly 112 coupled to the panel 140. The injector 120 of the doser assembly 112 is configured to inject the treatment fluid through the panel 140 and into the decomposition chamber 108. The exhaust aftertreatment system 100 further includes a first downstream catalyst member (e.g., catalyst member 110) disposed downstream of the decomposition chamber 108 and configured to receive the exhaust from decomposition chamber 108. The exhaust aftertreatment system 100 further includes a second downstream catalyst member (e.g., catalyst member 110) disposed downstream of the first downstream catalyst member and configured to receive the exhaust from the first downstream catalyst member. The exhaust aftertreatment system 100 further includes an outlet chamber 158 (e.g., line, pipe, conduit, etc.) disposed downstream of the second downstream catalyst member and configured to receive the exhaust from the second downstream catalyst member.

Figure 4:
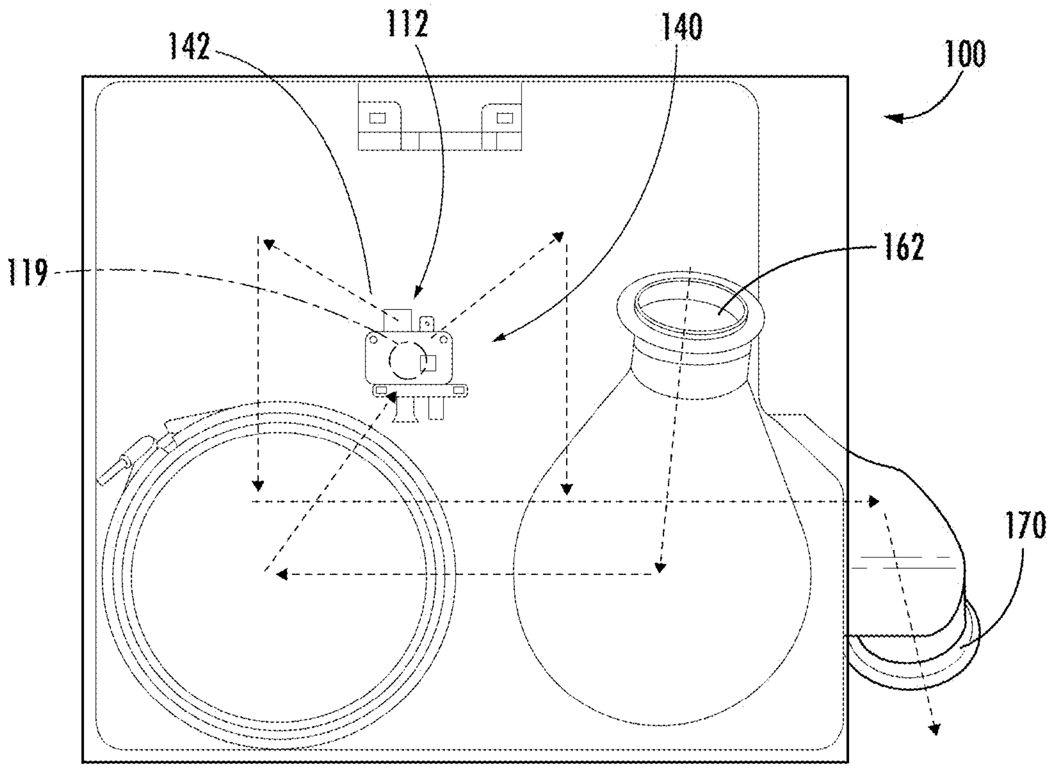
FIG. 4 is a front view of yet another example exhaust aftertreatment system including a doser assembly.
Figure 5:
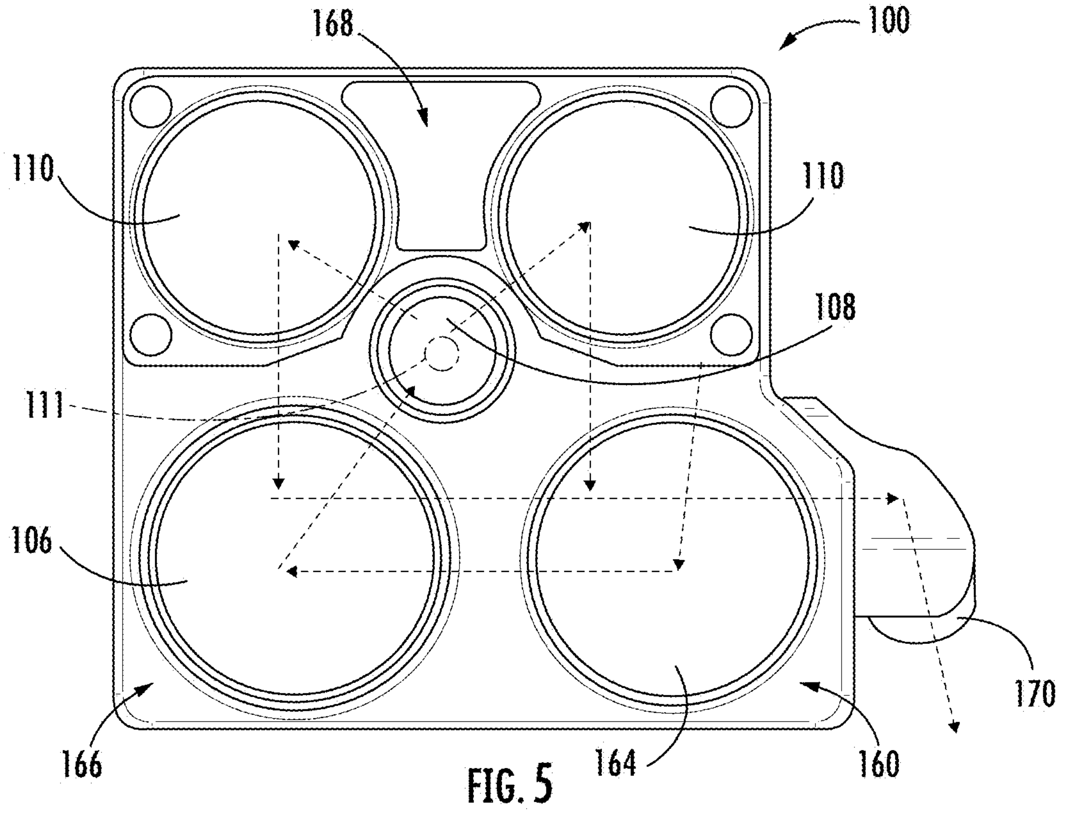
FIG. 5 is a cross-sectional view of the exhaust aftertreatment system of FIG. 4.

FIGS. 4 and 5 illustrate yet another embodiment of the exhaust aftertreatment system 100. In this embodiment, the exhaust aftertreatment system 100 includes a first aftertreatment leg 160 (e.g., conduit, chamber, etc.) and an inlet conduit 162 (e.g., line, pipe, conduit, etc.) fluidly coupled to the first aftertreatment leg 160. The first aftertreatment leg 160 is configured to receive the exhaust via the inlet conduit 162. The first aftertreatment leg 160 includes an oxidation catalyst member 164 configured to oxidize the hydrocarbons in the exhaust. The exhaust aftertreatment system 100 further includes a second aftertreatment leg 166 (e.g., conduit, chamber, etc.) fluidly coupled to the first aftertreatment leg 160. The second aftertreatment leg 166 is configured to receive the exhaust from the oxidation catalyst member 164 of the first aftertreatment leg 160. The second aftertreatment leg 166 includes the particulate filter 106. The exhaust aftertreatment system 100 includes the decomposition chamber 108. The decomposition chamber 108 is fluidly coupled to the second aftertreatment leg 166 and is configured to receive the exhaust from the particulate filter 106 of the second aftertreatment leg 166. The exhaust aftertreatment system 100 further includes the panel 140 and the doser assembly 112 coupled to the panel 140. The injector 120 of the doser assembly 112 is configured to inject the treatment fluid through the panel 140 and into the decomposition chamber 108. The exhaust aftertreatment system 100 further includes a third aftertreatment leg 168 (e.g., conduit, chamber, etc.) fluidly coupled to the decomposition chamber 108. The third aftertreatment leg 168 includes one or more catalyst members 110. The exhaust aftertreatment system 100 further includes an outlet conduit 170 fluidly coupled to the third aftertreatment leg 168. The outlet conduit 170 (e.g., line, chamber, pipe, etc.) is configured to receive the exhaust from the one or more catalyst members 110 of the third aftertreatment leg 168.

Figure 23:
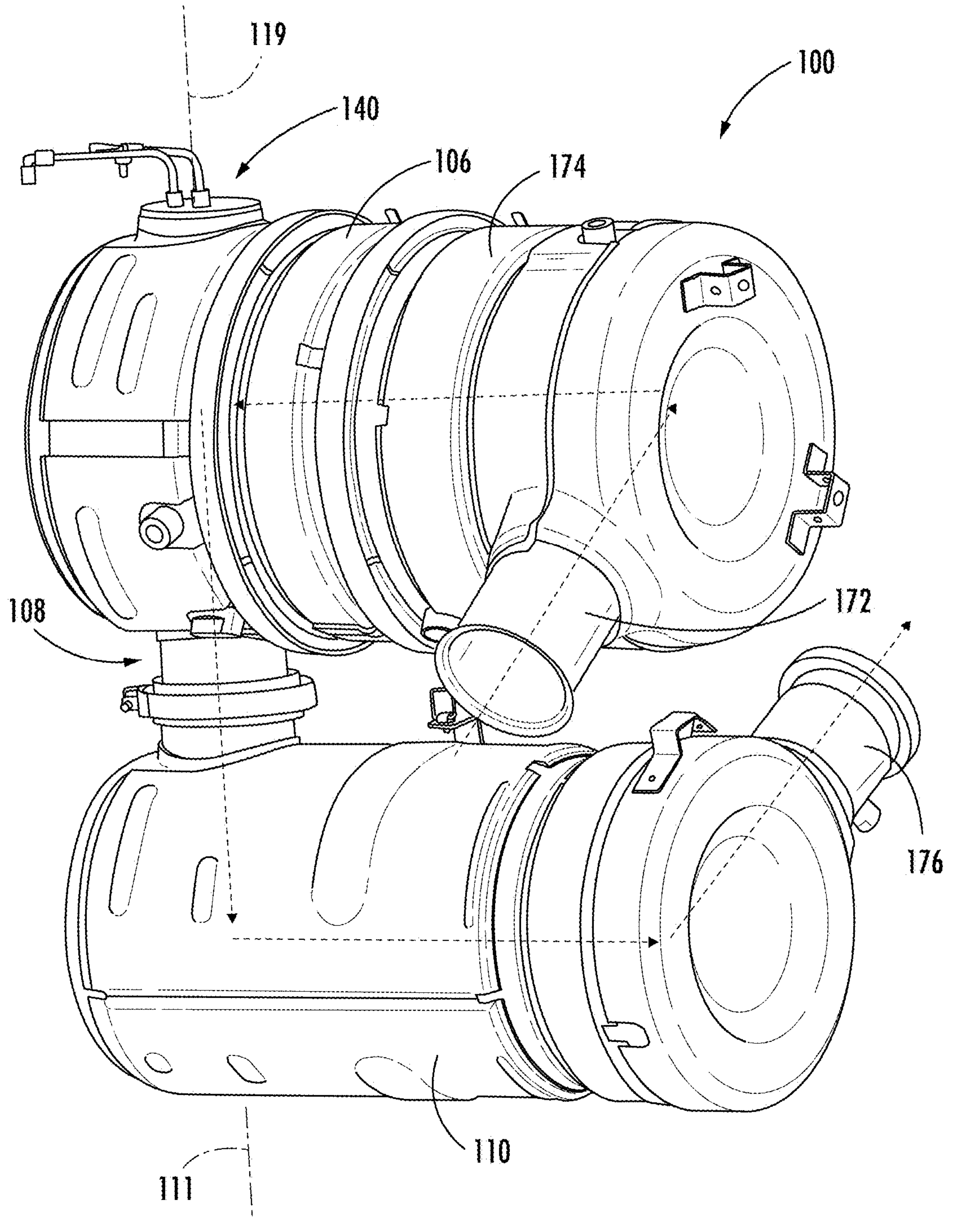
FIGS. 23 and 24 are perspective views of yet another example exhaust aftertreatment system.
Figure 24:
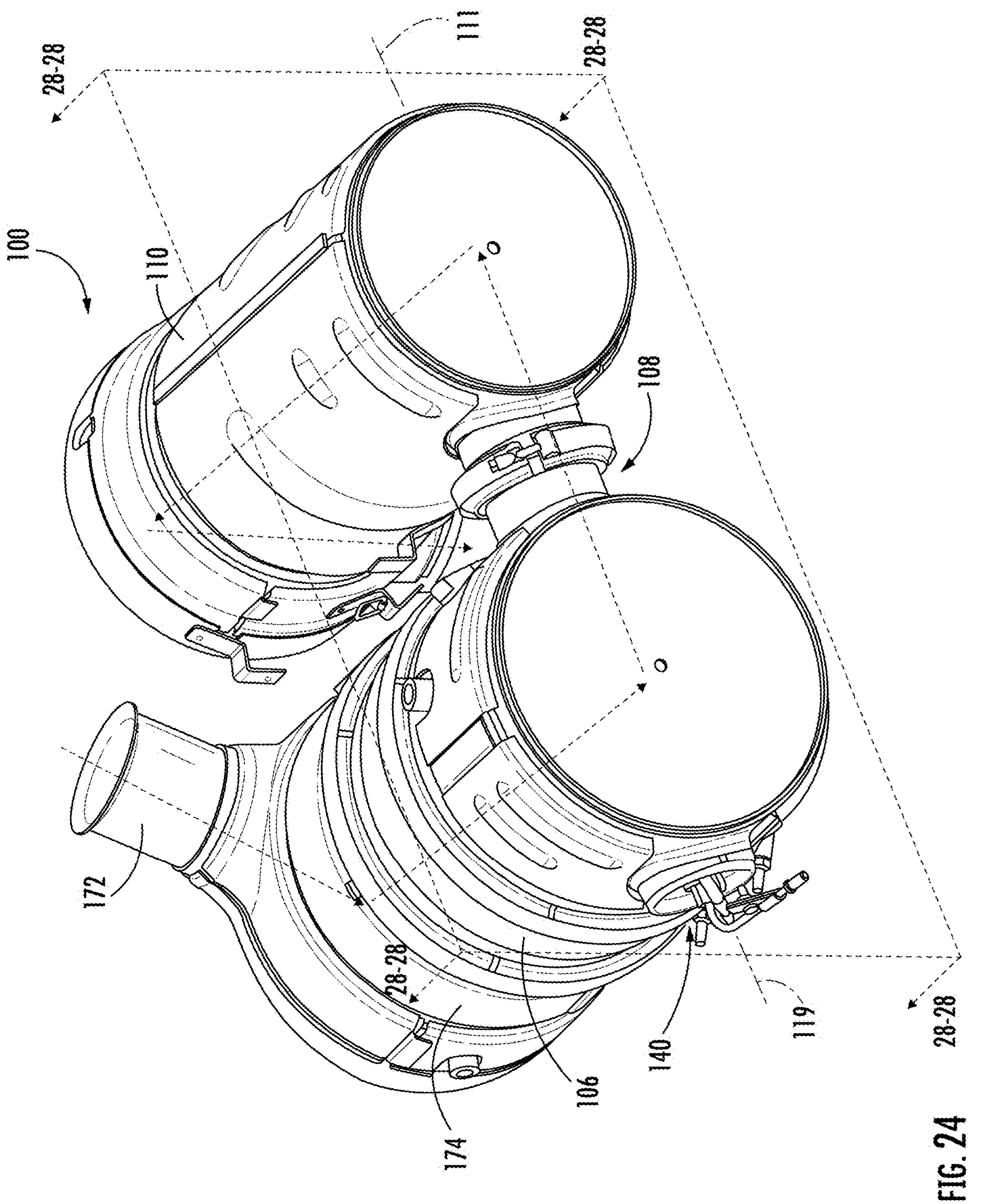
Figure 25:
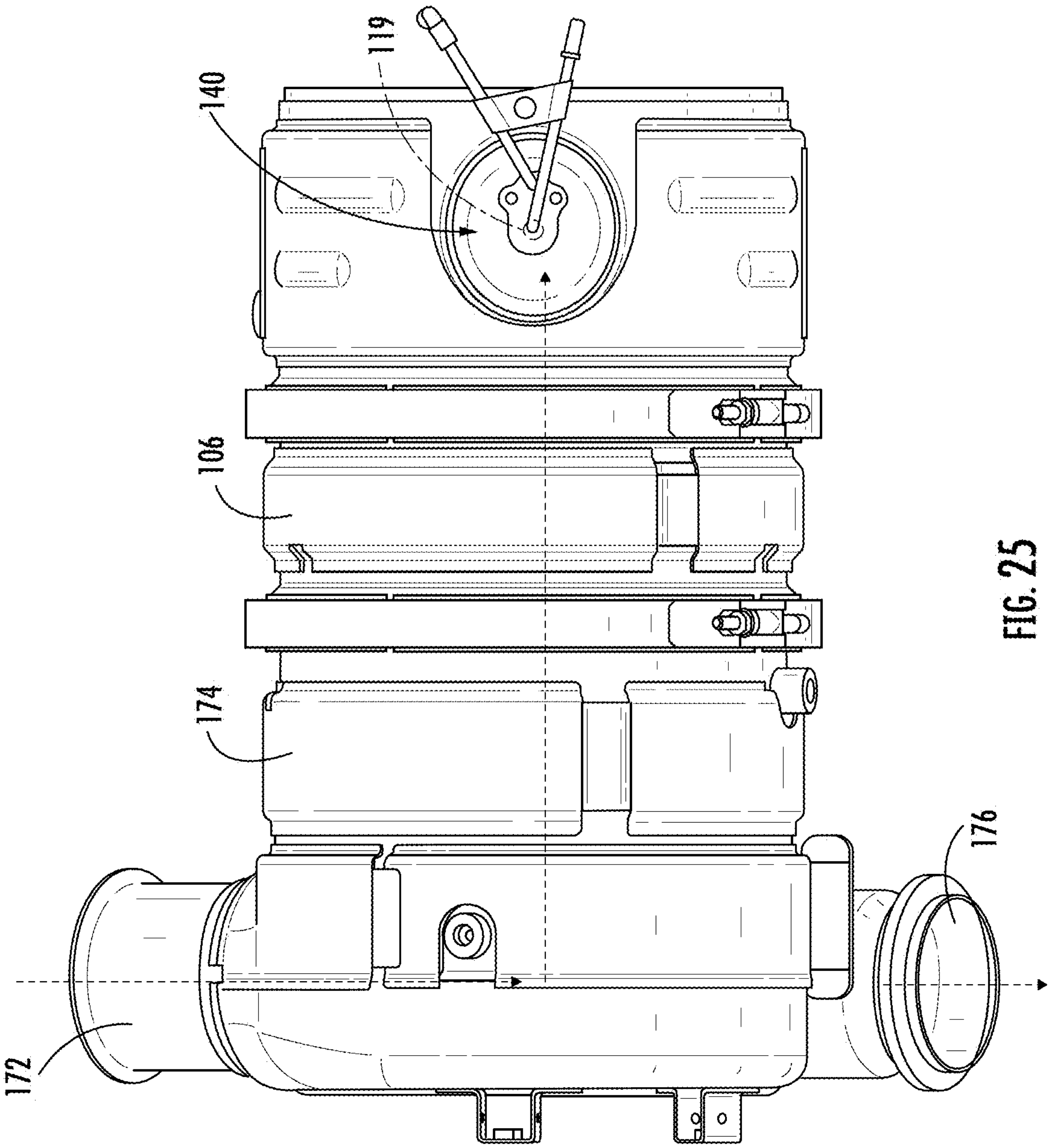
FIG. 25 is a side view of the exhaust aftertreatment system of FIGS. 23 and 24.
Figure 26:
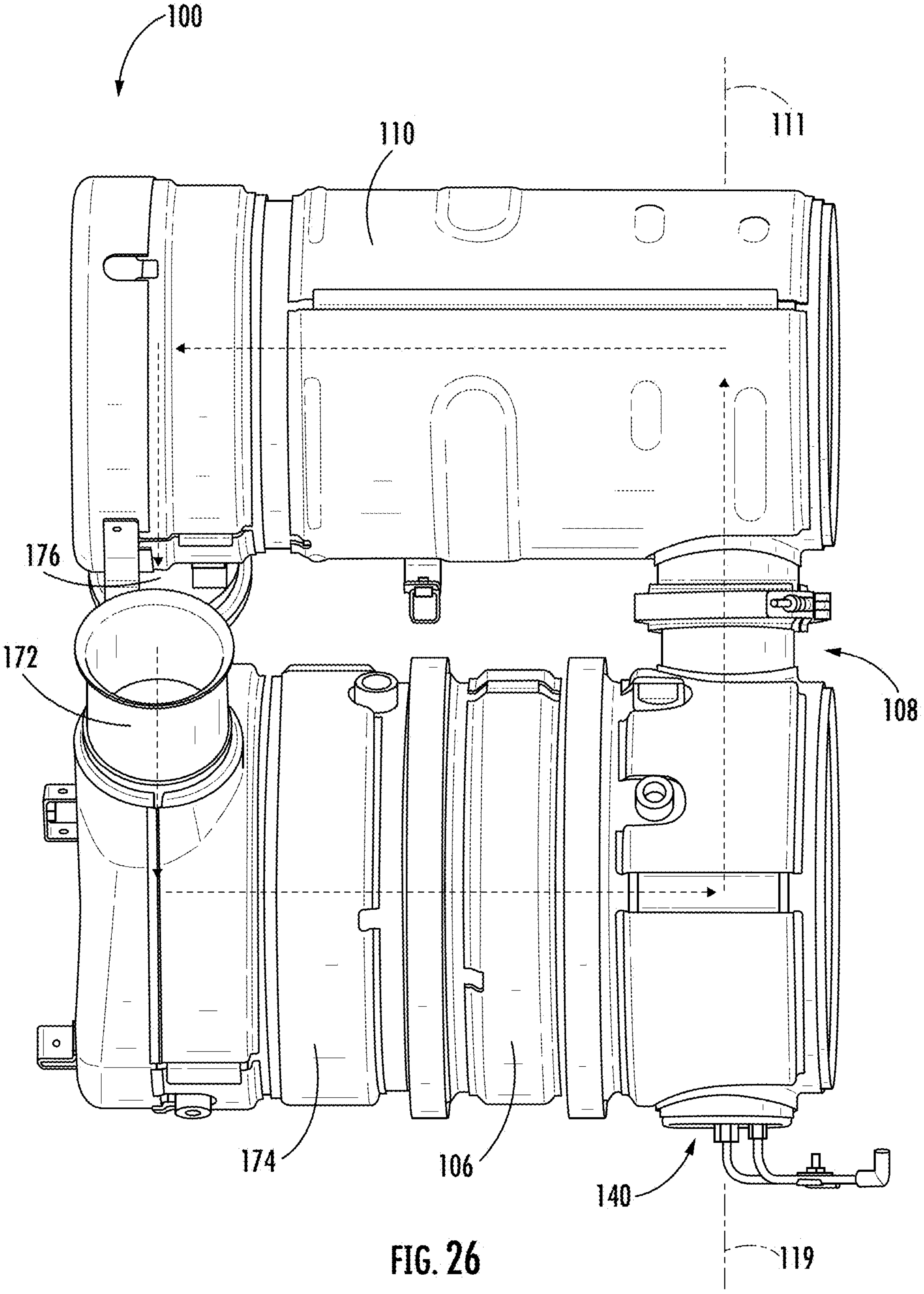
FIG. 26 is a top view of the exhaust aftertreatment system of FIGS. 23 and 24.
Figure 27:
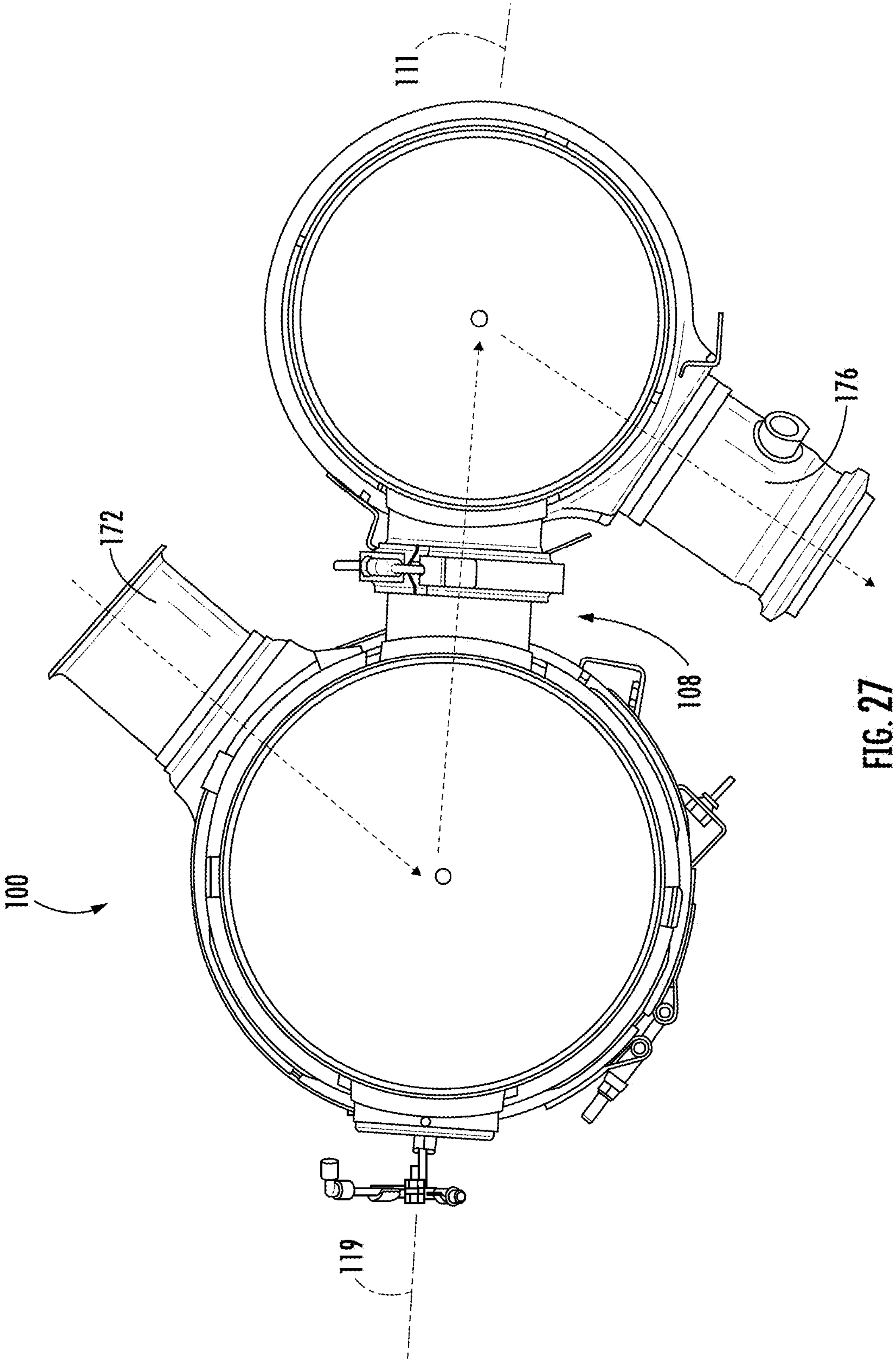
FIG. 27 is a back view of the exhaust aftertreatment system of FIGS. 23 and 24.

FIGS. 23-29 illustrates yet another embodiment of the exhaust aftertreatment system 100. FIG. 23 illustrates another embodiment of the exhaust aftertreatment system 100. In this embodiment, the exhaust aftertreatment system 100 includes an intake conduit 172 (e.g., line, pipe, etc.). The intake conduit 172 is configured to receive the exhaust from the internal combustion engine. The exhaust aftertreatment system 100 further includes an oxidation catalyst member 174 disposed downstream of the intake conduit 172. The oxidation catalyst member 174 is configured to receive the exhaust from the intake conduit 172. The exhaust aftertreatment system 100 further includes the particulate filter 106 disposed downstream of the oxidation catalyst member 174. The particulate filter 106 is configured to receive the exhaust from the oxidation catalyst member 174.

In the embodiment illustrated in FIG. 23-29, the exhaust aftertreatment system 100 further includes the decomposition chamber 108 disposed downstream of the particulate filter 106. The decomposition chamber 108 is configured to receive the exhaust from the particulate filter 106. The exhaust aftertreatment system 100 further includes the panel 140 and the doser assembly 112 coupled to the panel 140. The injector 120 of the doser assembly 112 is configured to inject the treatment fluid through the panel 140 and into the decomposition chamber 108. The exhaust aftertreatment system 100 further includes the catalyst member 110 disposed downstream of the decomposition chamber 108 and configured to receive the exhaust from decomposition chamber 108. The exhaust aftertreatment system 100 further includes an outlet conduit 176 (e.g., line, pipe, conduit, etc.) disposed downstream of the catalyst member 110 and configured to receive the exhaust from the catalyst member 110.

III. Overview of Example Mixers

FIGS. 6, 7, 9, 10, 12-14, 17-19B, 21, 22, and 31-41 illustrate the mixer 121 according to various embodiments. The mixer 121 includes a mixer body 200 (e.g., housing, frame, etc.). The mixer body 200 is positioned such that the injection axis 119 extends into the mixer body 200. In some embodiments, such as those of FIGS. 2 and 3, the mixer body 200 is positioned such that the mixer body 200 extends around the chamber axis 111. As is explained in more detail herein, the mixer body 200 is configured to receive a radial flow of the exhaust, receive an at least partially axial flow of the treatment fluid, and provide an at least partially axial flow of a mixture of the exhaust and the treatment fluid. The mixer body 200 harnesses the radial entry of the exhaust to cause rotation of the exhaust and the treatment fluid within the mixer body 200 to facilitate mixing the exhaust and the treatment fluid within the mixer body 200 and downstream of the mixer body 200 (e.g., within the decomposition chamber 108, etc.). In some embodiments, at least a portion of the mixer body 200 is frustoconical in shape (as shown in FIGS. 6-19B, 21, and 22). In other embodiments, at least a portion of the mixer body 200 is cylindrically shaped (as shown in FIGS. 23-26), pyramidal in shape, or spherically shaped.

The mixer 121 includes a plurality of (e.g., more than one) apertures 202. Each aperture 202 extends through the mixer body 200 and is configured to facilitate flow of the exhaust and the treatment fluid through the mixer body 200. In some embodiments, the mixer 121 includes ten apertures 202. In other embodiments, the mixer 121 includes (i) less than ten apertures 202 (e.g., nine, eight, three, etc.) or (ii) more than ten apertures 202 (e.g., eleven, twelve, twenty, etc.).

In some embodiments, each aperture 202 has a rectangular shape, where a width of the aperture 202 is approximately (e.g., within 5% of, etc.) constant throughout the aperture 202 and a length of the aperture 202 is approximately constant throughout the aperture 202. In other embodiments, each aperture 202 has a trapezoidal shape. In these embodiments, (i) the width of the aperture 202 may vary throughout the aperture 202 and the length of the aperture 202 may also vary throughout the aperture 202, (ii) the width of the aperture 202 may remain approximately constant throughout the aperture 202 while the length of the aperture 202 may vary throughout the aperture 202, and (iii) the width of the aperture 202 may vary throughout the aperture 202 while the length of the aperture 202 may remain constant throughout the aperture 202. In other embodiments, each aperture 202 has a circular shape, a semi-circular shape, a triangular shape, an oval shape, an octagonal shape, a square shape, or other common shapes. Each aperture 202 includes an open area defined by dimensions of the aperture 202. In some embodiments, the open area of each aperture 202 is between approximately 400 $mm^2$ and 850 $mm^2$ (e.g., 621.94 $mm^2$, etc.).

Figure 6:
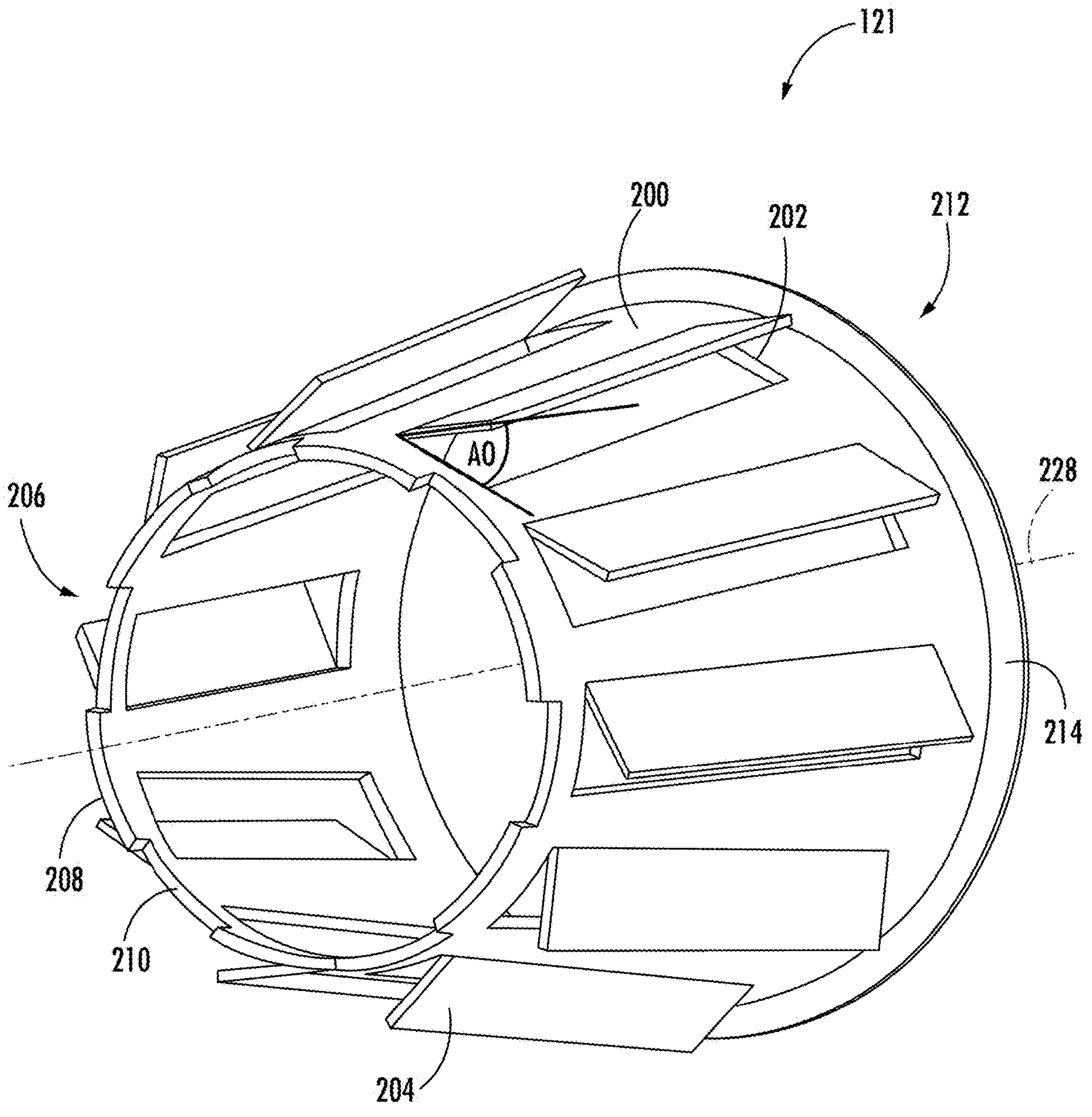
FIGS. 6 and 7 are various perspective views of a mixer.
Figure 7:
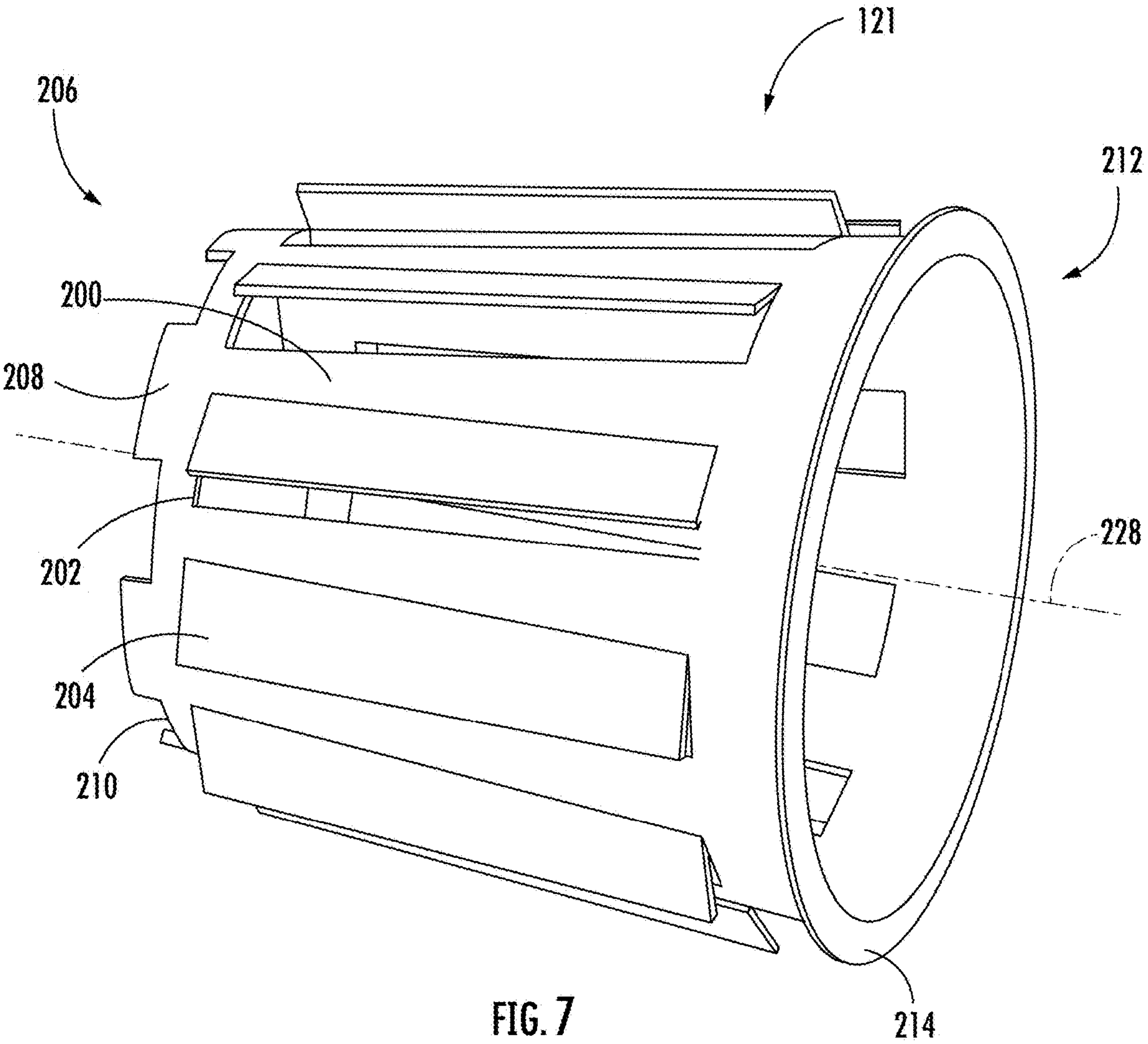
Figure 8:
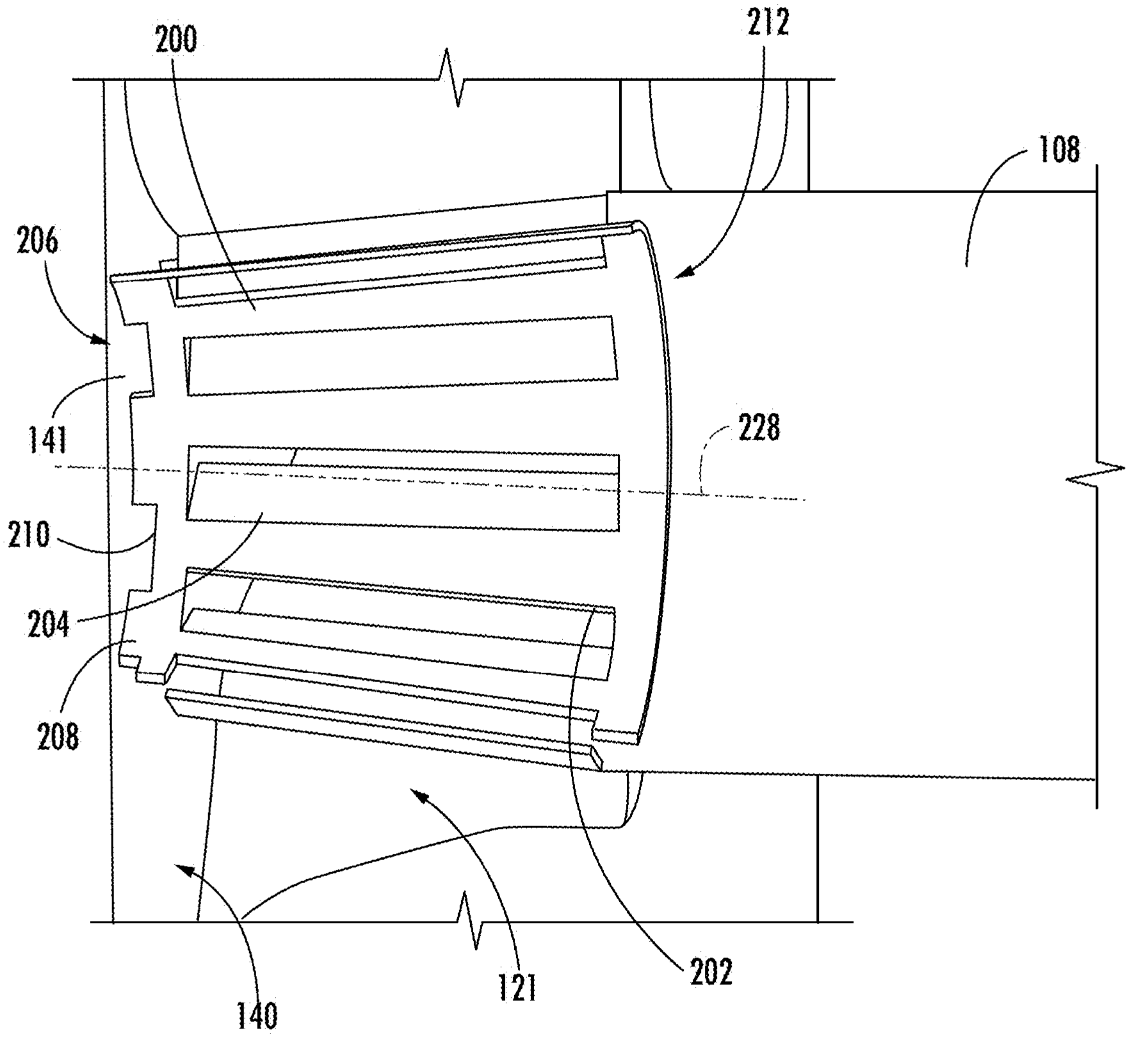
FIG. 8 is a cross-sectional view of another mixer coupled to a panel within an exhaust aftertreatment system.
Figure 31:
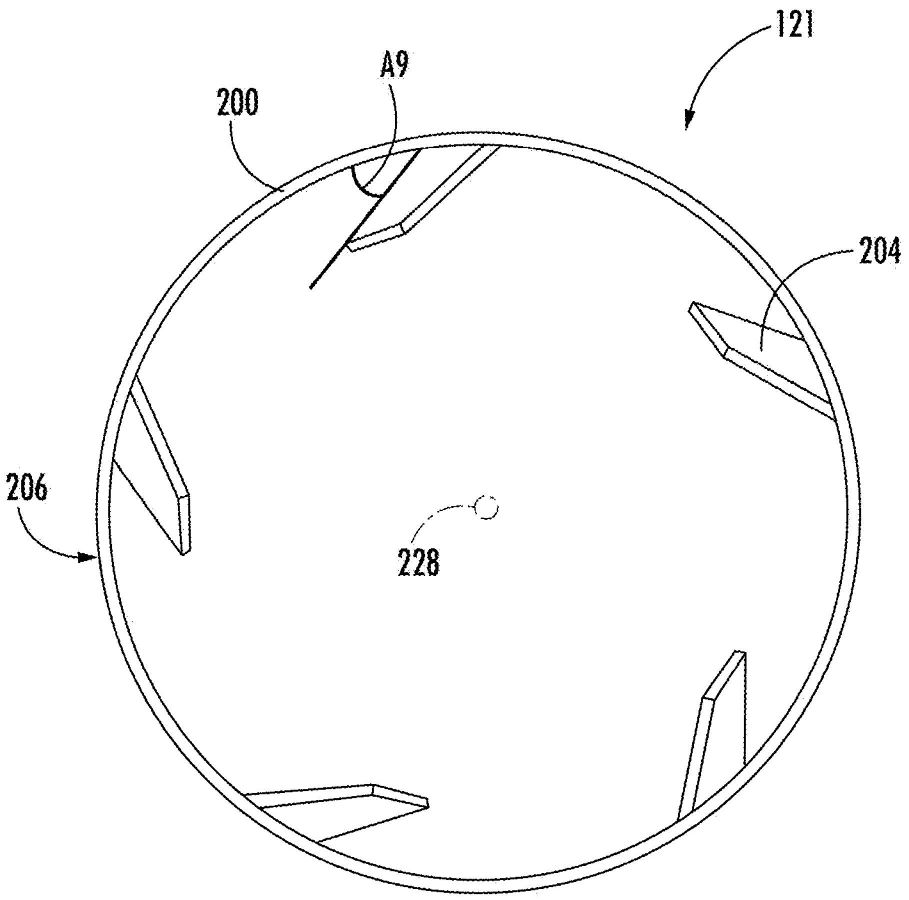
FIG. 31 is a left side view of the mixer of FIG. 30.
Figure 32:
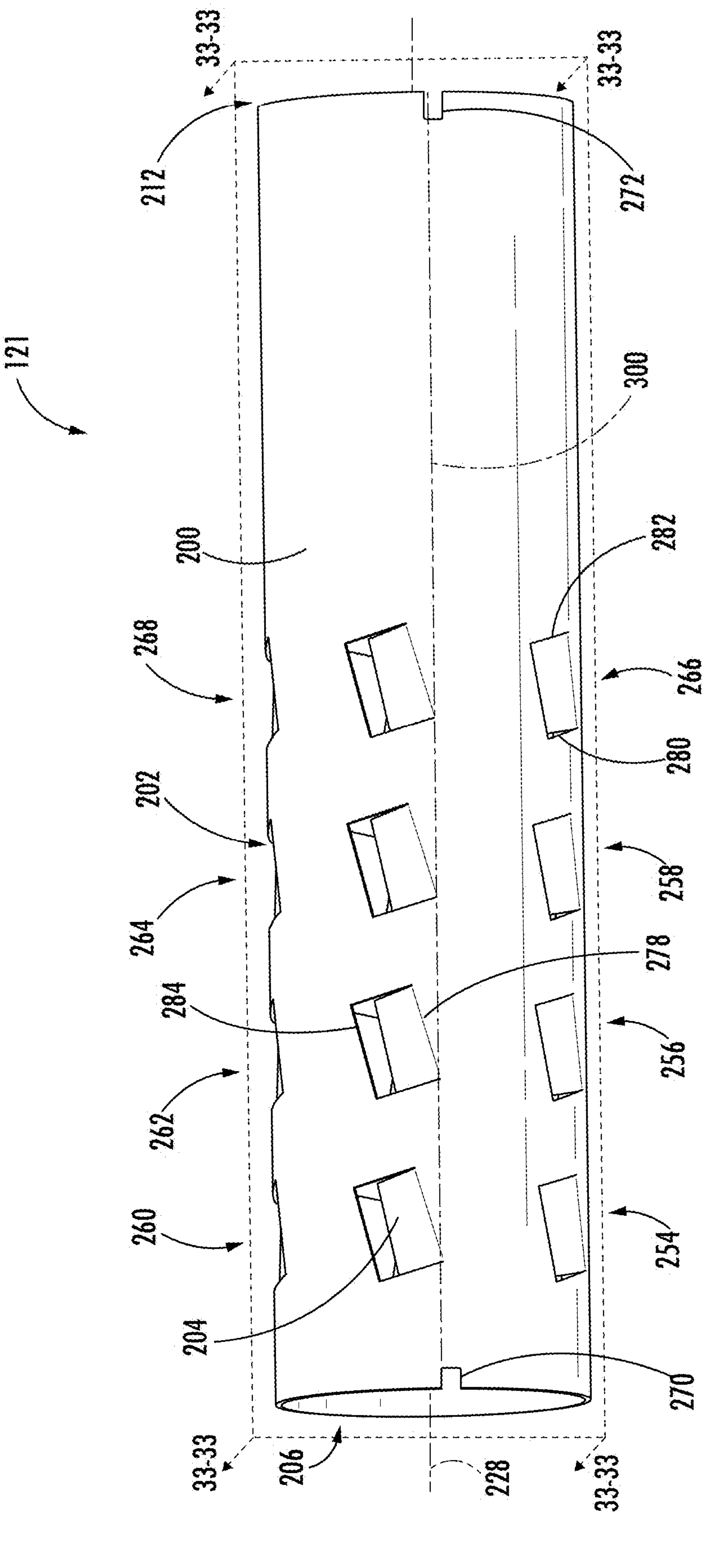
FIG. 32 is a perspective view of yet another mixer.

The mixer 121 also includes a plurality of blades 204. Each blade 204 is coupled to the mixer body 200 along a portion of one of the apertures 202. In some embodiments, each blade 204 extends radially outward from the mixer body 200. In these embodiments, as shown in FIG. 6, at least one of the blades 204 extends radially outward from the mixer body 200 at an angle A0 between approximately 15 degrees and approximately 85 degrees relative to the mixer body 200 (e.g., 20 degrees, 25 degrees, 35 degrees, etc.). In other embodiments, each blade 204 extends radially inward from the mixer body 200. In these embodiments, as shown in FIG. 31, at least one of the blades 204 extends radially inward from the mixer body 200 at an angle A9 between approximately 15 degrees and approximately 85 degrees relative to the mixer body 200 (e.g., 35 degrees, 45 degrees, 50 degrees, etc.). In some embodiments, one or more of the blades 204 extends radially inward from the mixer body 200 while one or more of the blades 204 extends radially outward from the mixer body 200. The exhaust flows through the apertures 202 and along the blades 204. The blades 204 may be angled relative to the mixer body 200, causing the exhaust to swirl as the exhaust flows through the mixer body 200. This swirl enhances mixing of the treatment fluid with the exhaust downstream of the mixer 121. In some embodiments, the mixer 121 includes ten blades 204. In other embodiments, the mixer 121 includes (i) less than ten blades 204 (e.g., nine, eight, three, etc.) or (ii) more than ten blades 204 (e.g., eleven, twelve, twenty, etc.).

In some embodiments, each of the blades 204 has a mostly rectangular shape, where a width of the blade 204 is mostly constant throughout the blade 204 and a length of the blade 204 is mostly constant throughout the blade 204. In other embodiments, each blade 204 has a mostly trapezoidal shape, where the width of the blade 204 varies throughout the blade 204 and the length of the blade 204 either (i) is mostly constant throughout the blade 204 or (ii) varies throughout the blade 204.

Figure 22:
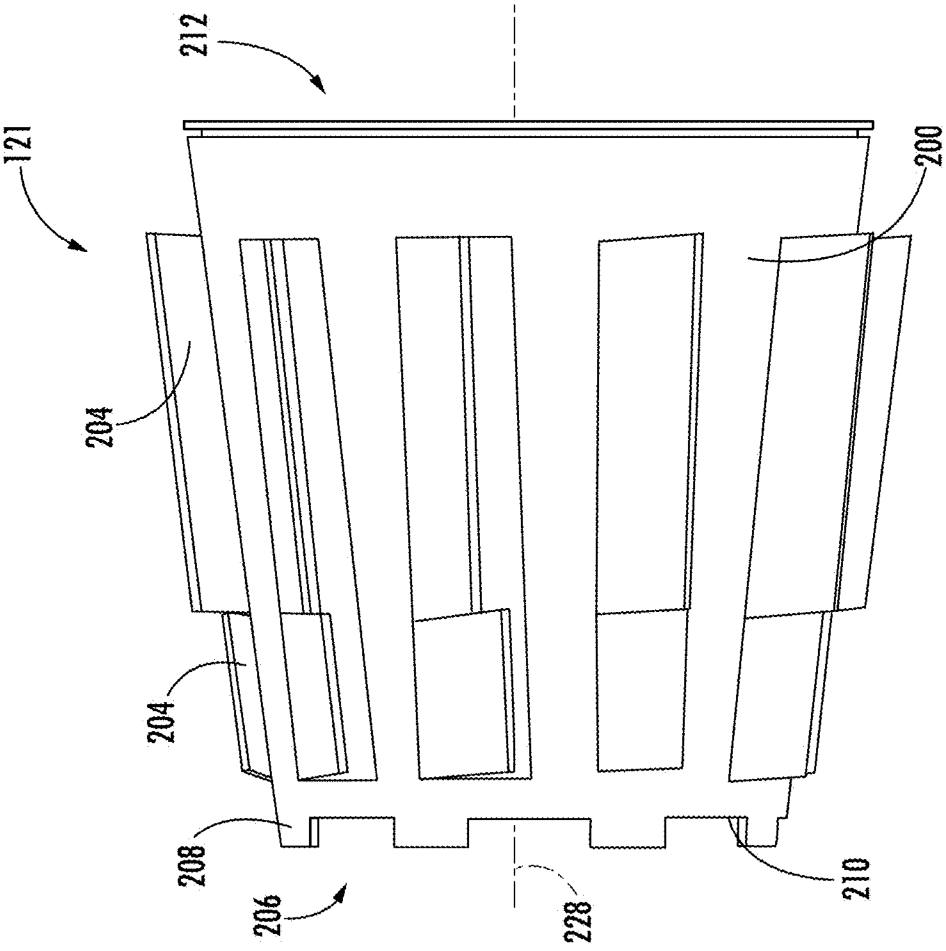
FIG. 22 is a side view of the mixer of FIG. 21.
Figure 21:
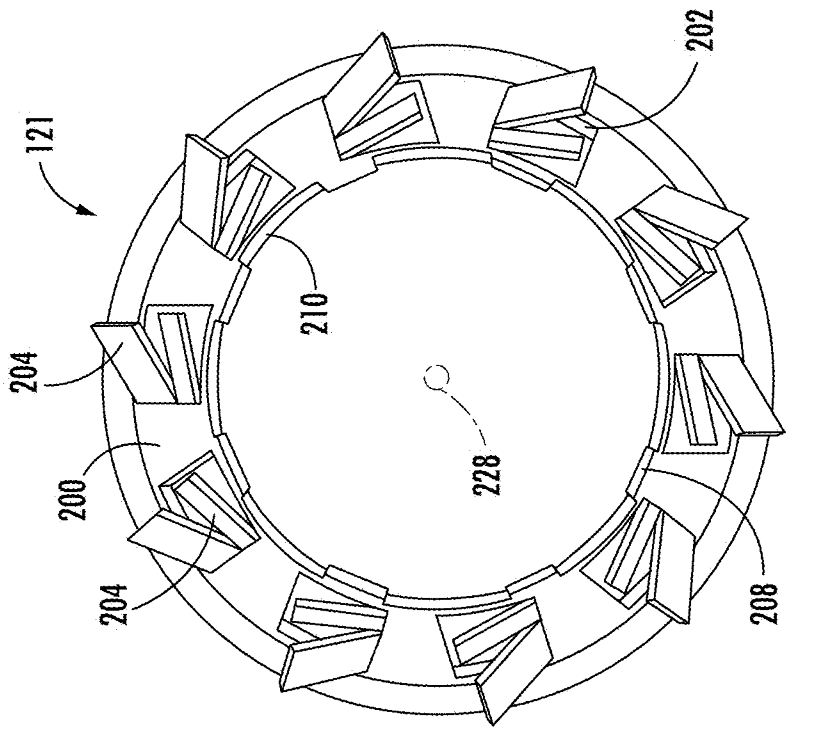
FIG. 21 is a front view of yet another mixer.

In some embodiments, as illustrated in FIGS. 21 and 22, each blade 204 includes a first portion and a second portion. Each of the first portion and the second portion includes a first edge that is contiguous with the mixer body 200. The first edges of the first portion and the second portion may be contiguous with the aperture 202. Each of the first portion and the second portion also includes a second edge. The second edges of the first portion and the second portion are adjacent to each other (e.g., the second edge of the first portion is adjacent to the second edge of the second portion). The first portion is angled at a first opening angle away from the mixer body 200 and the second portion is angled at a second opening angle away from the mixer body 200. In some embodiments, the first opening angle is equal to the second opening angle. In other embodiments, the first opening angle is (i) less (e.g., smaller, etc.) than the second opening angle or (ii) more (e.g., larger, etc.) than the second opening angle. In some embodiments, the first opening angle is between approximately 10 degrees and approximately 90 degrees and the second opening angle is between approximately 5 degrees and approximately 60 degrees.

The mixer 121 also includes a first end 206 disposed at a front portion of the mixer 121. In some embodiments, the first end 206 includes a plurality of tabs 208. At least one of the tabs 208 is coupled to the inner side 141 of the panel 140. In these embodiments, the first end 206 also includes a plurality of edge slots 210. Each of the edge slots 210 is positioned between two of the tabs 208 and configured to facilitate flow of the exhaust between the mixer 121 and the inner side 141 of the panel 140. Each of the edge slots 210 is contiguous with two of the tabs 208 and each of the tabs 208 is contiguous with two of the edge slots 210.

In some embodiments, the tabs 208 are spaced evenly around the periphery of the first end 206. In other embodiments, the tabs 208 are spaced unevenly around the periphery of the first end 206, such that a first circumferential distance between a first set of two of the tabs 208 is longer than a second circumferential distance between a second set of two of the tabs 208. In some embodiments, a circumferential length of a surface of the tab 208 is approximately equal to a circumferential length of the edge slot 210. In other embodiments, the circumferential length of the surface of the tab 208 is longer than the circumferential length of the edge slot 210. In yet other embodiments, the circumferential length of the surface of the tab 208 is shorter than the circumferential length of the edge slot 210. In some embodiments, the circumferential length of the surface of the tab 208 is between approximately 10 millimeters (mm) and approximately 50 mm and the circumferential length of the edge slot 210 is between approximately 10 mm and approximately 50 mm. In some embodiments, at least one of the tabs 208 includes a rectangular cross-sectional shape. In other embodiments, at least one of the tabs 208 includes a trapezoidal cross-sectional shape.

The mixer 121 also includes a second end 212 disposed opposite the first end 206 and configured to be received within the decomposition chamber 108. In some embodiments, the second end 212 includes a flange 214 extending radially outward from the mixer body 200. The flange 214 is configured to be received within the decomposition chamber 108. The flange 214 is configured to increase a velocity and a shear stress of the exhaust, resulting in a reduction of treatment fluid deposits at the second end 212 relative to a second end 212 without the flange 214.

Figure 9:
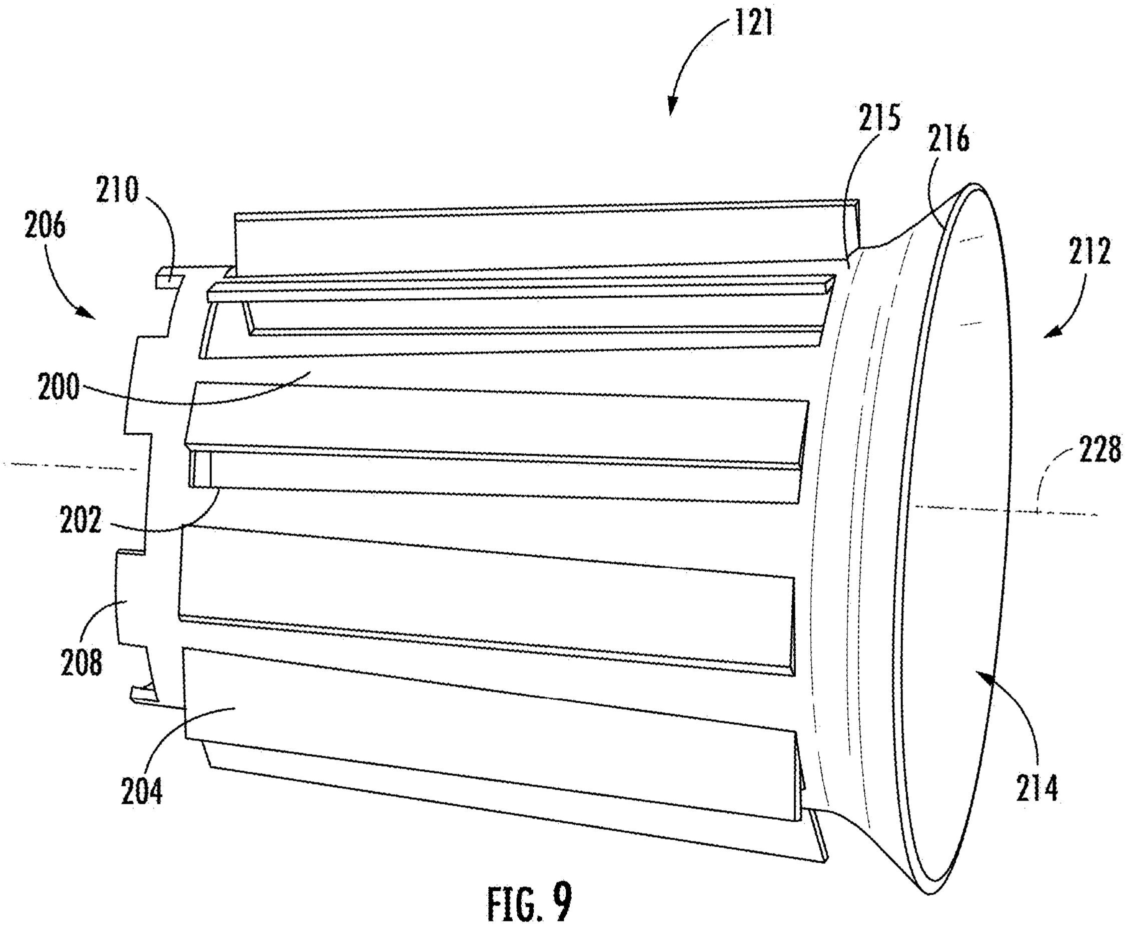
FIG. 9 is a perspective view of yet another mixer.

In some embodiments, as illustrated in FIG. 9, the flange 214 includes a mixer body edge 215 contiguous with the mixer body 200 and an outlet edge 216. In some embodiments, the flange 214 includes the following relationship: $L=(R_{1f}-R_{2f})/\sin(\theta)$. In this relationship, (i) L is a length of the flange 214 measured along the flange 214 between the mixer body edge 215 of the flange 214 and the outlet edge 216 of the flange 214, (ii) $R_{1f}$ is a first flange radius measured from the mixer axis 228 to the outlet edge 216 of the flange 214 and $R_{1f}$ is between 0.04 meters (m) and 0.08 m, (iii) $R_{2f}$ is a second flange radius measured from the mixer axis 228 to the mixer body edge 215 of the flange 214 and is of the form $R_{2f}=R_{1e}/\alpha$, where (a) $R_{1e}$ is a first end radius measured from the mixer axis 228 to the first end 206 of the mixer 121 and $R_{1e}$ is between 0.02 m and 0.05 m and (b) $\alpha$ is a radius ratio and is between 0.06 and 0.09. Additionally, in this relationship, $\theta$ is a flange angle measured relative to the mixer axis 228 and $\theta$ is between 15 degrees and 50 degrees. In other embodiments, the length of the flange 214 (e.g., L) is between approximately 0.01 m and approximately 0.06 m.

Figure 11:
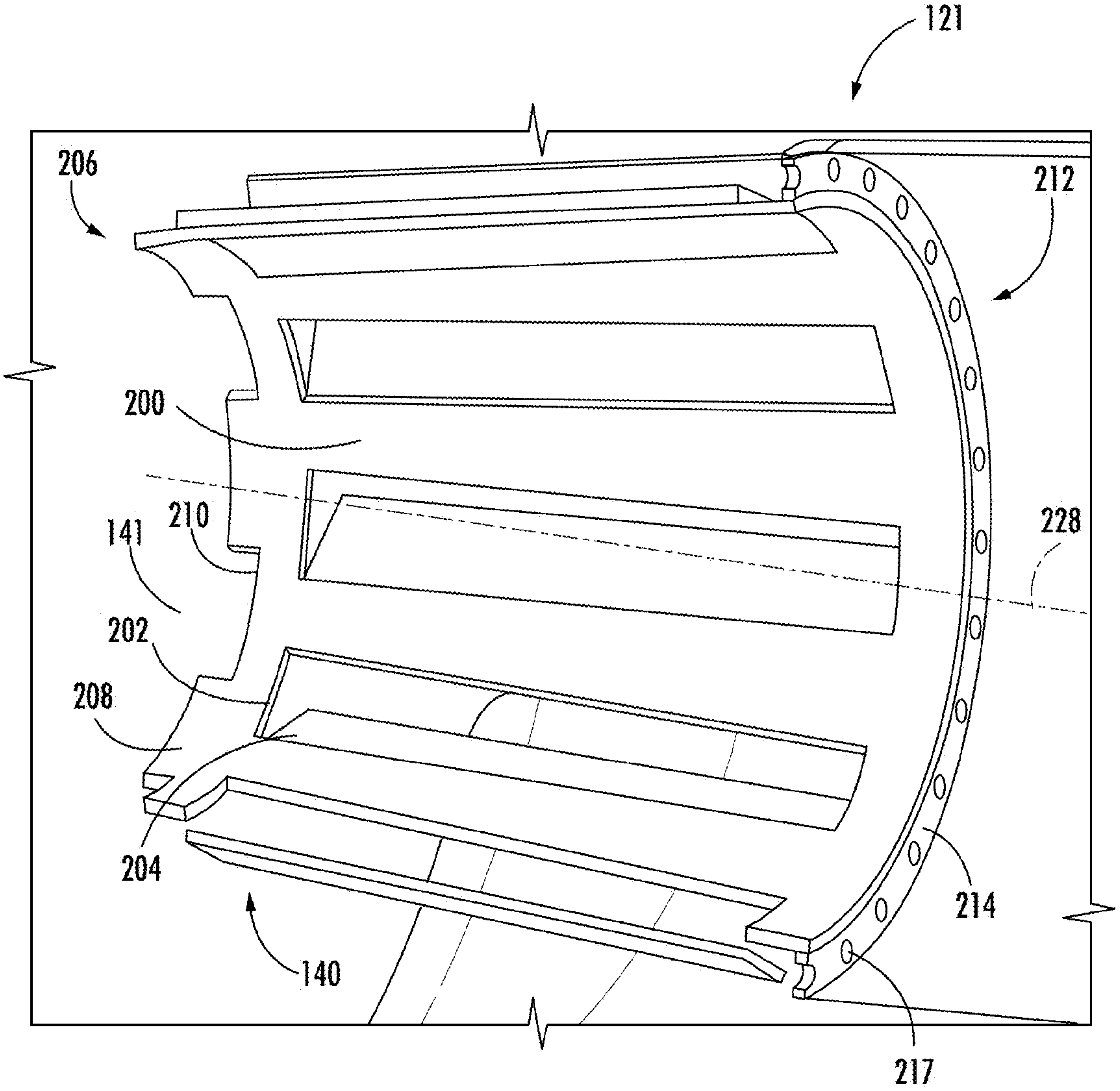
FIG. 11 is a cross-sectional view of yet another mixer within an exhaust aftertreatment system.

In some embodiments, illustrated in FIG. 11, the flange 214 includes a plurality of flange holes 217 extending through the flange 214. Each of the flange holes 217 is configured to facilitate flow of the exhaust through the flange 214, allowing portions of the exhaust to bypass an inside of the mixer body 200 and continue flowing through the decomposition chamber 108. This results in reducing a pressure drop (e.g., a decrease in pressure, etc.) within the decomposition chamber 108, assisting the mixer 121 in efficiently dispersing the treatment fluid within the exhaust downstream of the mixer 121.

In some embodiments, illustrated in FIGS. 13-16, the flange 214 includes a plurality of flange slots 218 extending through the flange 214. The flange slots 218 may be similar to that described above with respect to the flange holes 217. Each of the flange slots 218 generate a gap 220 between an inner surface of the flange slot 218 and an outer surface of the mixer body 200. In some embodiments, a radial width (e.g., width in a radial direction, etc.) of the gap 220 is between 3 mm to 7 mm. In other embodiments, the radial width of the gap 220 is (i) less than 3 mm or (ii) more than 7 mm.

Figure 12:
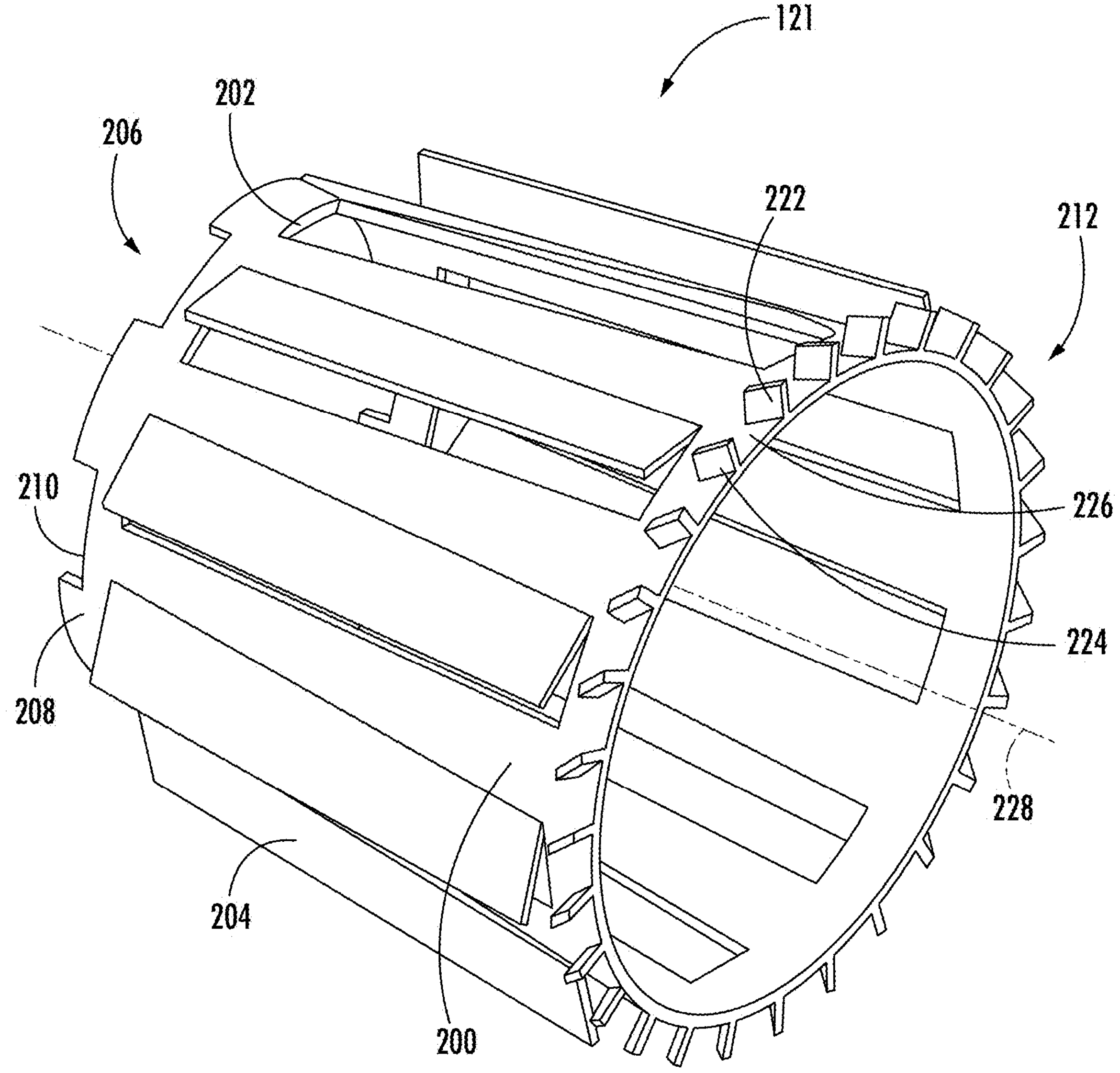
FIG. 12 is a perspective view of yet another mixer.
Figure 13:
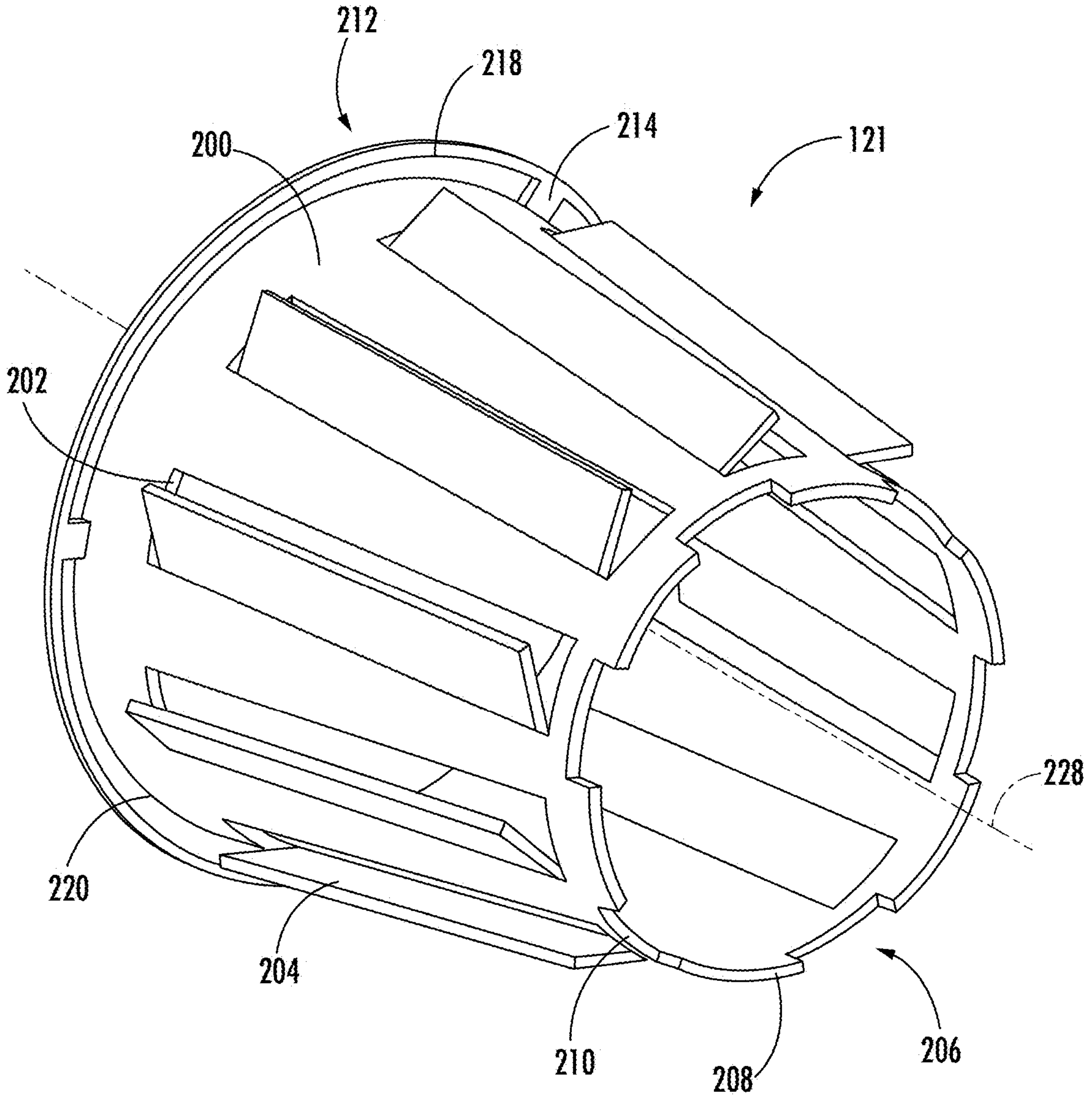
FIG. 13 is a perspective view of yet another mixer.
Figure 14:
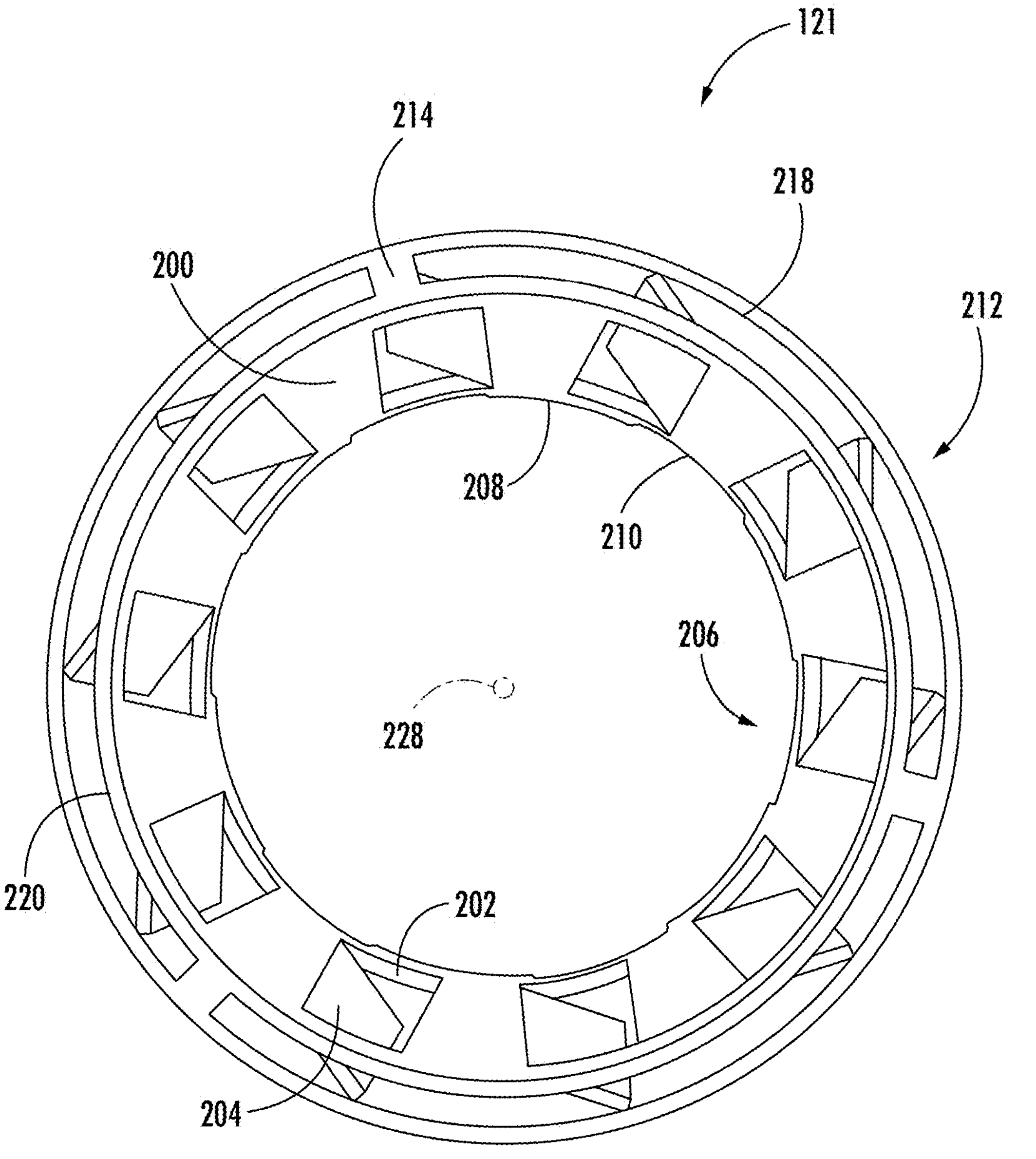
FIG. 14 is a rear view of the mixer of FIG. 13.
Figure 15:
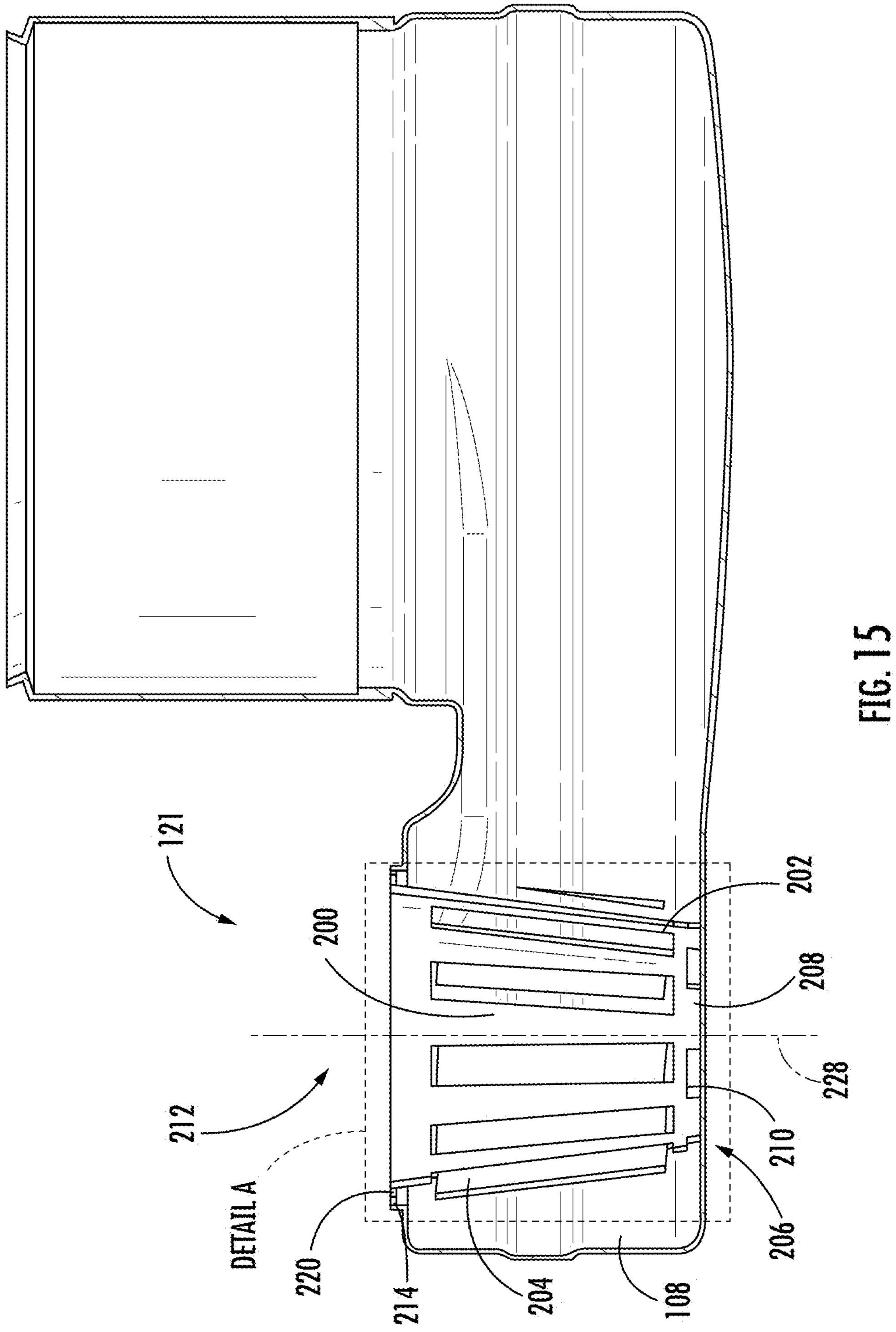
FIG. 15 is a cross-sectional view of the mixer of FIGS. 13 and 14 within an exhaust aftertreatment system.
Figure 16:
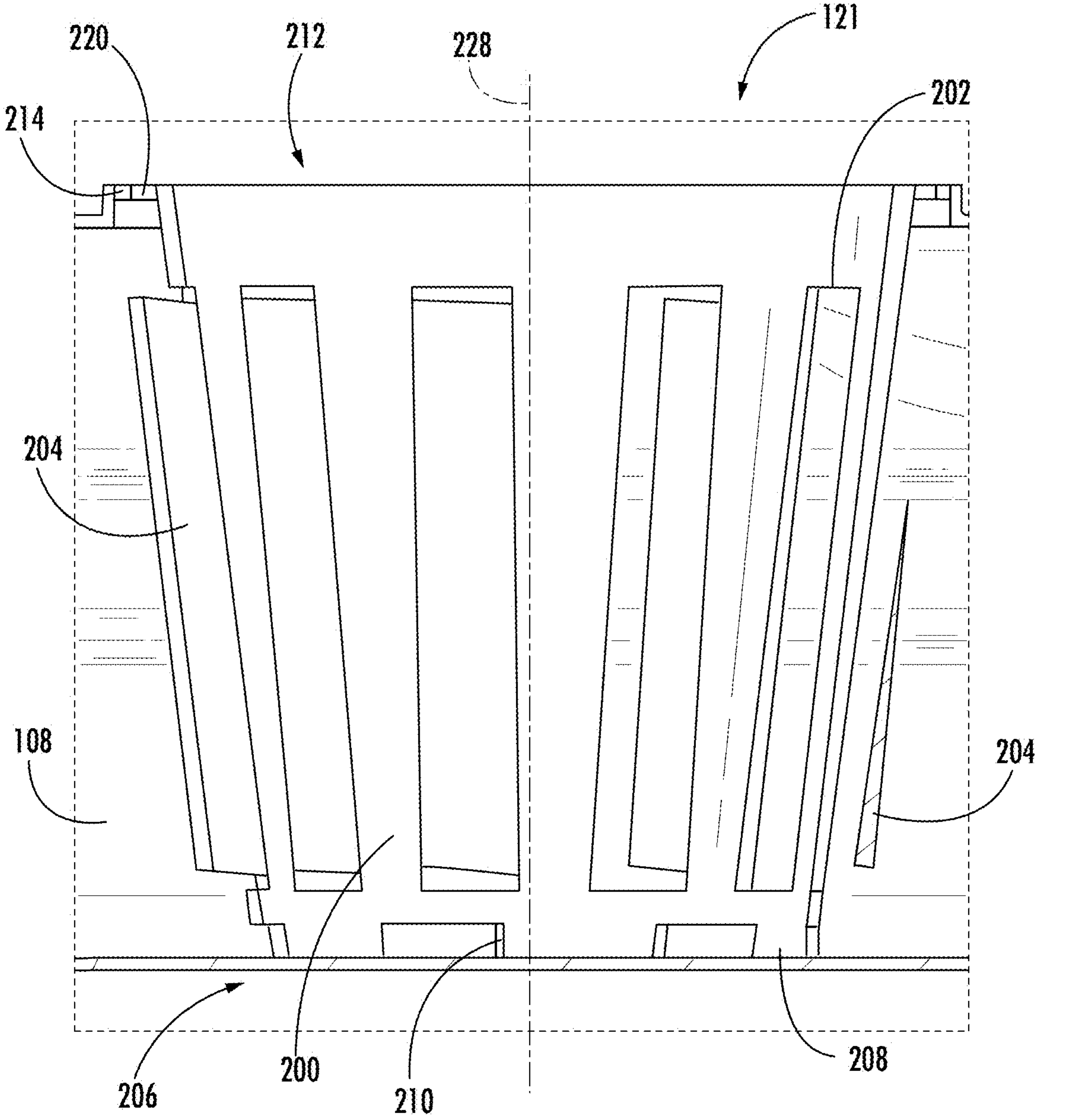
FIG. 16 is a view of Detail A in FIG. 15.
Figure 17:
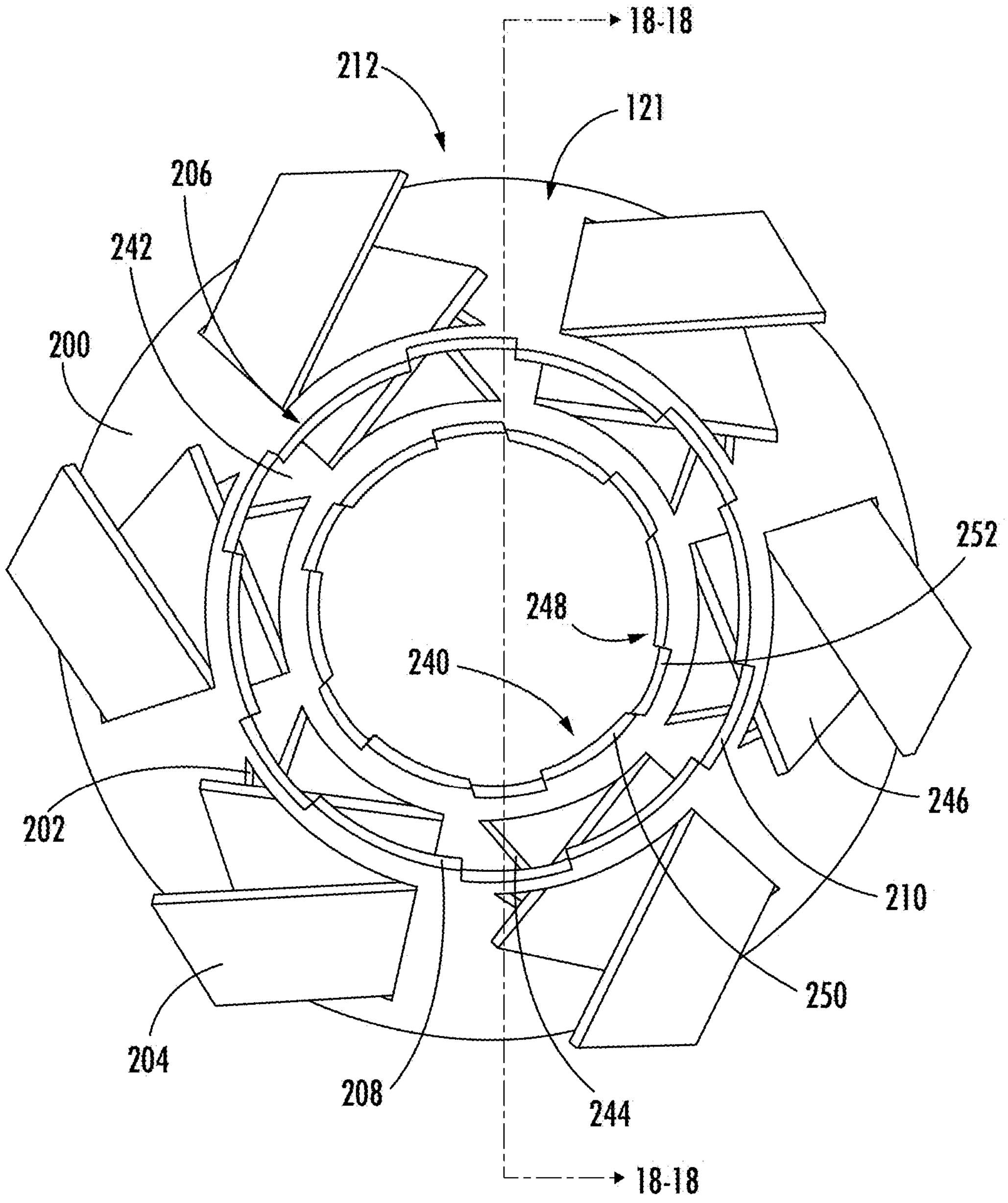
FIG. 17 is front view of yet another mixer.
Figure 18:
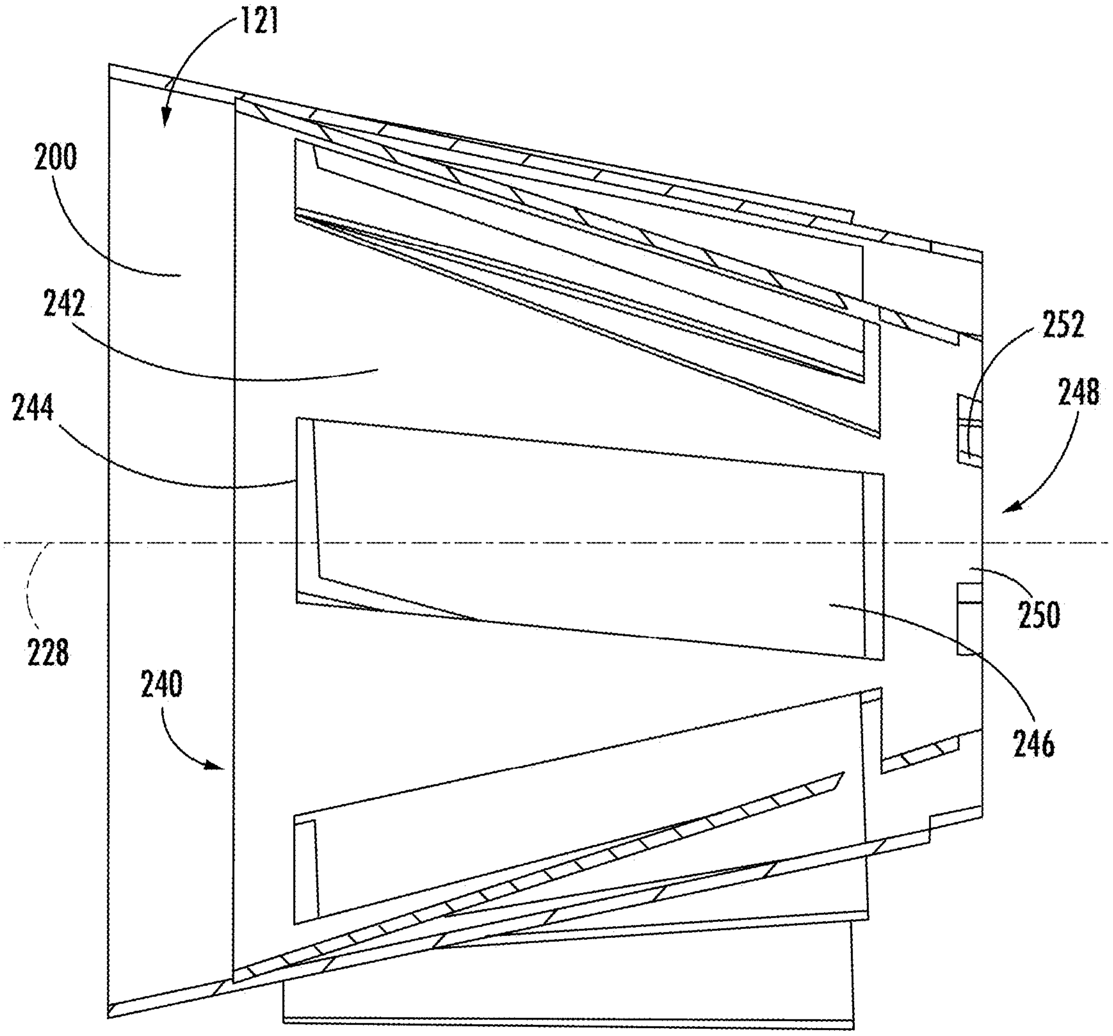
FIG. 18 is a cross-sectional view of the mixer of FIG. 17 taken along line 18-18 in FIG. 17.

In some embodiments, illustrated in FIG. 12, the mixer 121 also includes a first plate 222. The first plate 222 is coupled to the second end 212 and extends radially outward from the second end 212. The mixer 121 also includes a second plate 224. The second plate 224 is coupled to the second end 212 and extends radially outward from the second end 212. The mixer 121 also includes a mixer axis 228 that extends through the mixer body 200. The first plate 222 is angled at a third opening angle relative to the mixer axis 228. The second plate 224 is angled at a fourth opening angle relative to the mixer axis 228. The first plate 222, the second plate 224, and the second end 212 define a plate channel 226 that is configured to facilitate flow of the exhaust therethrough. In some embodiments, the plate channel 226 is only defined by the first plate 222, the second plate 224, and the second end 212.

Figure 10:
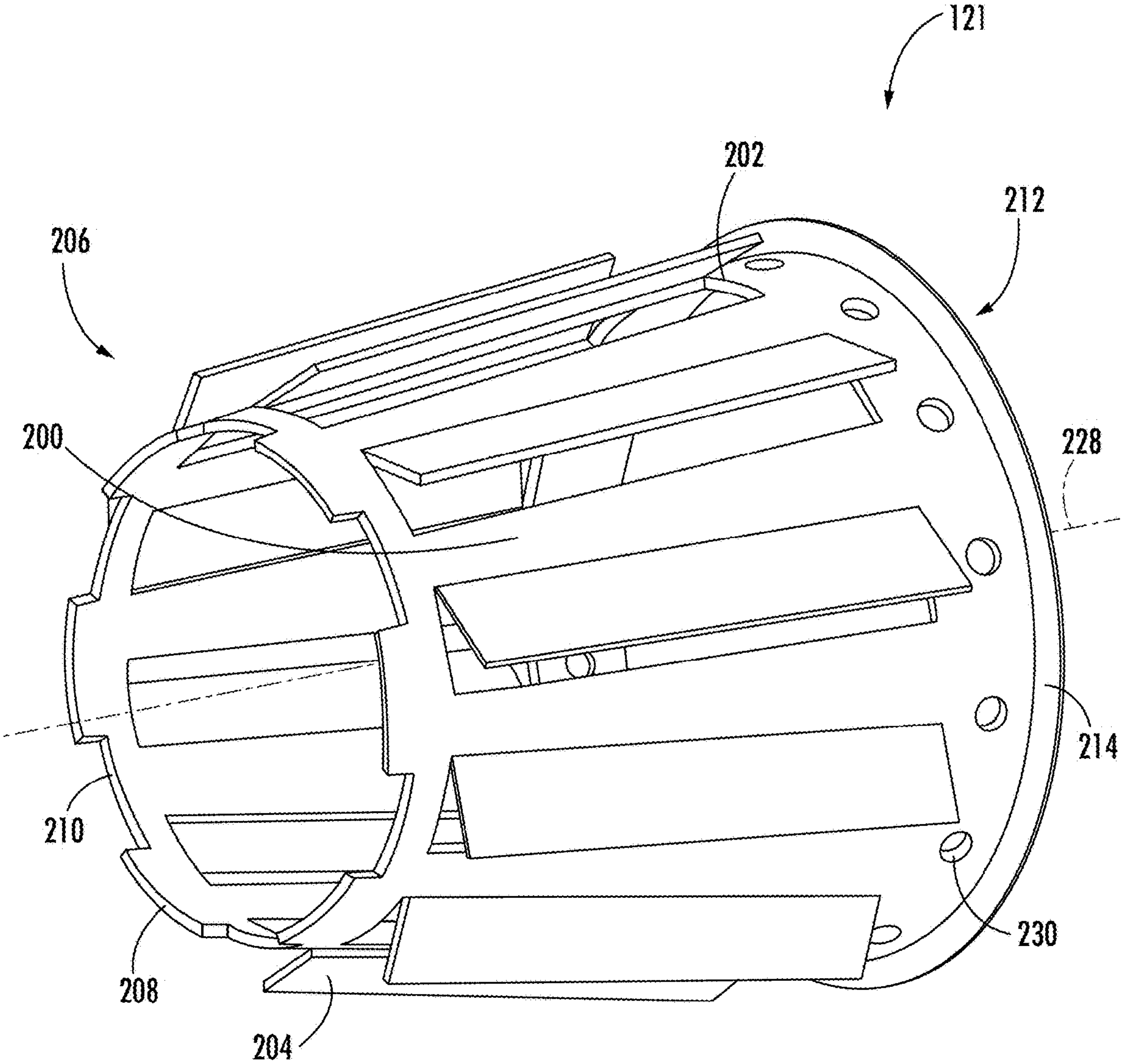
FIG. 10 is a perspective view of yet another mixer.

In some embodiments, illustrated in FIG. 10, the mixer 121 also includes a plurality of body holes 230 extending through the mixer body 200. Each of the body holes 230 are configured to facilitate flow of the exhaust from an outer portion of the mixer body 200 through an inner portion of the mixer body 200. This results in reducing the pressure drop within the decomposition chamber 108, assisting the mixer 121 in efficiently dispersing the treatment fluid within the exhaust downstream of the mixer 121.

In some embodiments, illustrated in FIG. 17-20B, the mixer 121 also includes an inner mixer 240 disposed within the mixer body 200. The inner mixer 240 includes an inner mixer body 242. The inner mixer body 242 extends around the chamber axis 111 and is positioned such that the injection axis 119 extends into the inner mixer body 242. The inner mixer body 242 is configured to receive the exhaust and the treatment fluid. The inner mixer 240 includes a plurality of inner apertures 244. Each inner aperture 244 extends through the inner mixer body 242 and is configured to facilitate flow of the exhaust and the treatment fluid through the inner mixer body 242. In some embodiments, the inner mixer 240 includes ten inner apertures 244. In other embodiments, the inner mixer 240 includes (i) less than ten inner apertures 244 (e.g., nine, eight, three, etc.) or (ii) more than ten inner apertures 244 (e.g., eleven, twelve, twenty, etc.).

In some embodiments, each inner aperture 244 has a mostly rectangular shape, where a width of the inner aperture 244 is mostly constant throughout the inner aperture 244 and a length of the inner aperture 244 is mostly constant throughout the inner aperture 244. In other embodiments, each inner aperture 244 has a mostly trapezoidal shape, where the width of the inner aperture 244 varies throughout the inner aperture 244 and the length of the inner aperture 244 either (i) is mostly constant throughout the inner aperture 244 or (ii) varies throughout the inner aperture 244.

The inner mixer 240 also includes a plurality of inner blades 246. Each inner blade 246 is coupled to the inner mixer body 242 along a portion of one of the inner apertures 244. Each inner blade 246 extends radially outward from the inner mixer body 242. The exhaust flows through the inner blades 246 via the inner apertures 244. The inner blades 246 may be angled relative to the inner mixer body 242, causing the exhaust to swirl as the exhaust flows through the inner mixer body 242. This swirl enhances mixing of the treatment fluid with the exhaust downstream of the inner mixer body 242. Each of the inner blades 246 is configured to extend through each of apertures 202 of the mixer 121. In some embodiments, the inner mixer 240 includes ten inner blades 246. In other embodiments, the inner mixer 240 includes (i) less than ten inner blades 246 (e.g., nine, eight, three, etc.) or (ii) more than ten inner blades 246 (e.g., eleven, twelve, twenty, etc.).

In some embodiments, each inner blade 246 have a mostly rectangular shape, where a width of the inner blade 246 is mostly constant throughout the inner blade 246 and a length of the inner blade 246 is mostly constant throughout the inner blade 246. In other embodiments, each inner blade 246 has a mostly trapezoidal shape, where the width of the inner blade 246 varies throughout the inner blade 246 and the length of the inner blade 246 either (i) is mostly constant throughout the inner blade 246 or (ii) varies throughout the inner blade 246.

In some embodiments, each inner blade 246 includes a third portion and a fourth portion. Each of the third portion and the fourth portion includes a third edge that is contiguous with the inner mixer body 242. The third edges of the third portion and the fourth portion may be contiguous with the inner aperture 244. Each of the third portion and the fourth portion also includes a fourth edge. The fourth edges of the third portion and the fourth portion are adjacent to each other (e.g., the fourth edge of the third portion is adjacent to the fourth edge of the fourth portion). The third portion is angled at a third opening angle away from the inner mixer body 242 and the fourth portion is angled at a fourth opening angle away from the inner mixer body 242. In some embodiments, the third opening angle is equal to the fourth opening angle. In other embodiments, the third opening angle is (i) less than the fourth opening angle or (ii) more than the fourth opening angle.

The inner mixer 240 also includes a third end 248 disposed at a front portion of the inner mixer 240 and a fourth end 249 disposed at a back portion of the inner mixer 240. The third end 248 includes a plurality of inner tabs 250. At least one of the inner tabs 250 is coupled to the inner side 141 of the panel 140. The third end 248 also includes a plurality of inner edge slots 252. Each of the inner edge slots 252 are positioned between two of the inner tabs 250 and configured to facilitate flow of the exhaust through the third end 248 and into the inner mixer body 242. In some embodiments, the third end 248 and the first end 206 are coplanar. In other embodiments, the third end 248 and the first end 206 are not coplanar.

Figure 19A:
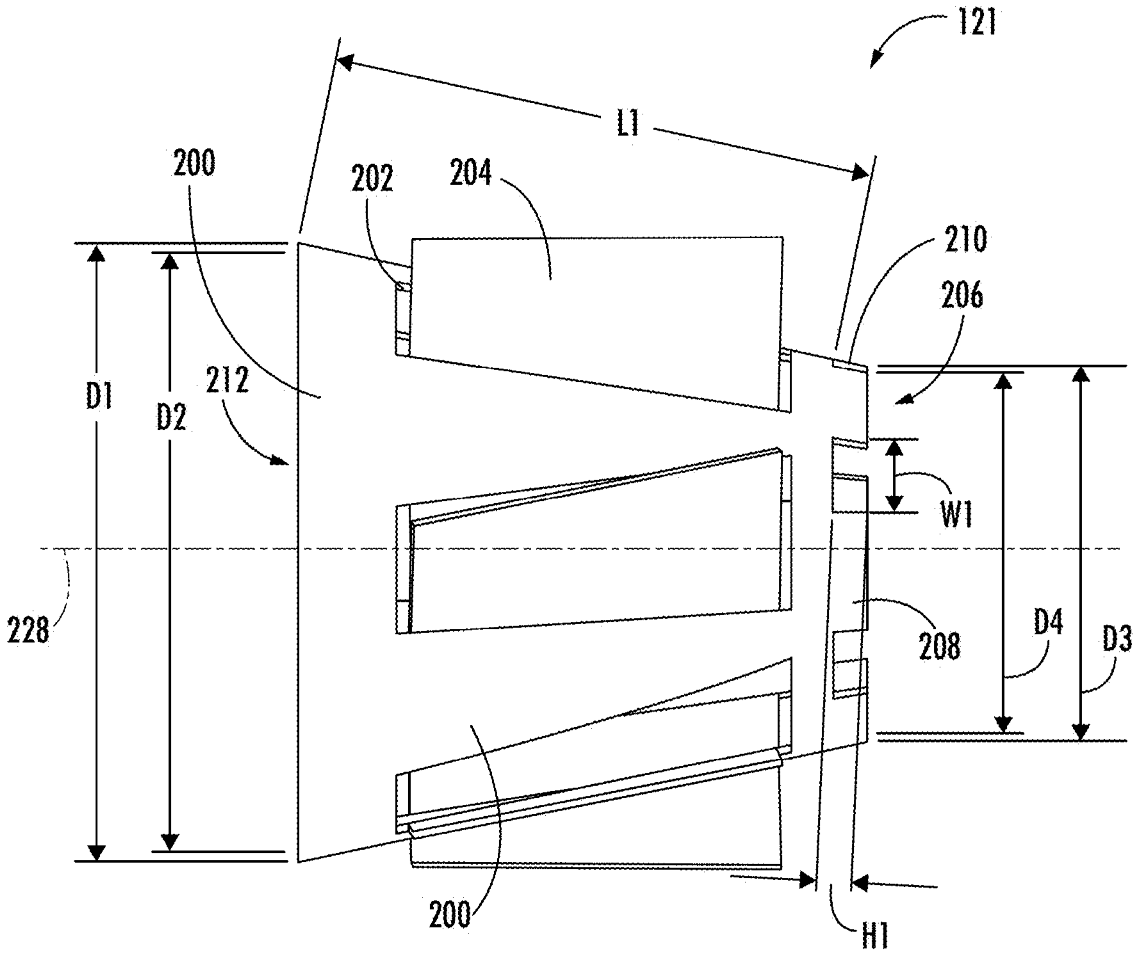
FIGS. 19A and 19B are side views of a portion of the mixer of FIGS. 17 and 18.

As illustrated in FIG. 19A, the mixer 121 includes a length L1 from the second end 212 to a lower surface of one of the edge slots 210. In some embodiments, the length L1 may be between approximately 100 mm and approximately 120 mm (e.g., 107.67 mm, etc.). The mixer 121 further includes a second end outer diameter D1 extending across an outer portion of the mixer body 200 proximate the second end 212. In some embodiments, the second end outer diameter D1 may be between approximately 115 mm and approximately 130 mm (e.g., 122 mm, etc.). In other embodiments, the second end outer diameter D1 may be between approximately 90 mm and approximately 101 mm (e.g., 95.9 mm, etc.). The mixer 121 further includes a second end inner diameter D2 extending across an inner portion of the mixer body 200 proximate the second end 212. In some embodiments, the second end inner diameter D2 is between approximately 112 mm and 127 mm (e.g., 118.93 mm, etc.). The mixer 121 further includes a first end outer diameter D3 extending across an outer portion of the mixer body 200 proximate the first end 206. In some embodiments, the first end outer diameter D3 may be between approximately 70 mm and approximately 80 mm (e.g., 74.39 mm, etc.). The mixer 121 further includes a first end inner diameter D4 extending across an inner portion of the mixer body 200 proximate the first end 206. In some embodiments, the first end inner diameter D4 is between approximately 67 mm and 76 mm (e.g., 71.32 mm, etc.). In other embodiments, the first end inner diameter D4 is between approximately 86 mm and 98 mm (e.g., 92.5 mm, etc.). The mixer 121 includes a tab height H1 defining a height of at least one of the tabs 208. In some embodiments, the tab height H1 is between approximately 4 mm and approximately 10 mm (e.g., 6.69 mm, etc.). The mixer 121 includes an edge slot width W1 defining a width of a non-circumferential width of at least one of the edge slots 210. In some embodiments, the edge slot width W1 is between approximately 10 mm and 20 mm (e.g., 14.41 mm, etc.).

Figure 19B:
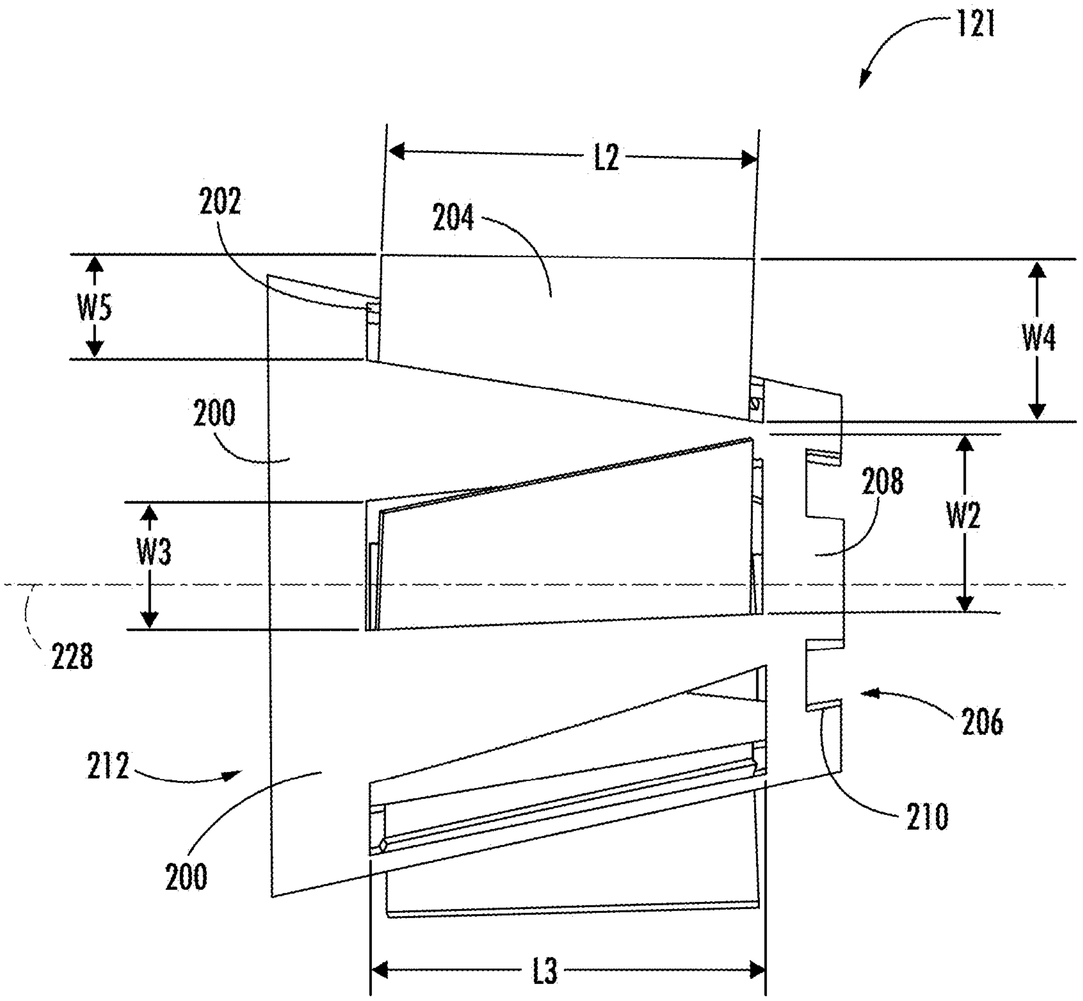

As illustrated in FIG. 19B, the mixer 121 includes a blade length L2 taken across an outer most portion of at least one of the blades 204. In some embodiments, the blade length L2 is between approximately 65 mm and approximately 77 mm (e.g., 72.76 mm, etc.). The mixer 121 further includes an aperture length L3 defining a length of at least one of the apertures 202. In some embodiments, the aperture length L3 is between approximately 71 mm and approximately 85 mm (e.g., 77.56 mm, etc.). The mixer 121 further includes a first aperture width W2 defining a width of at least one of the apertures 202 proximate the first end 206. In some embodiments, the first aperture width W2 is between approximately 25 mm and approximately 35 mm (e.g., 30.5 mm, etc.). The mixer 121 further includes a second aperture width W3 defining a width of at least one of the apertures 202 proximate the second end 212. In some embodiments, the second aperture width W3 is between approximately 20 mm and approximately 30 mm (e.g., 25.45 mm, etc.). The mixer 121 further includes a first blade width W4 defining a width of at least one of the blades 204 proximate the first end 206. In some embodiments, the first blade width W4 is between approximately 27 mm and approximately 38 mm (e.g., 33.79 mm, etc.). The mixer 121 further includes a second blade width W5 defining a width of at least one of the blades 204 proximate the second end 212. In some embodiments, the second blade width W5 is between approximately 16 mm and approximately 28 mm (e.g., 22.76 mm, etc.).

Figure 20A:
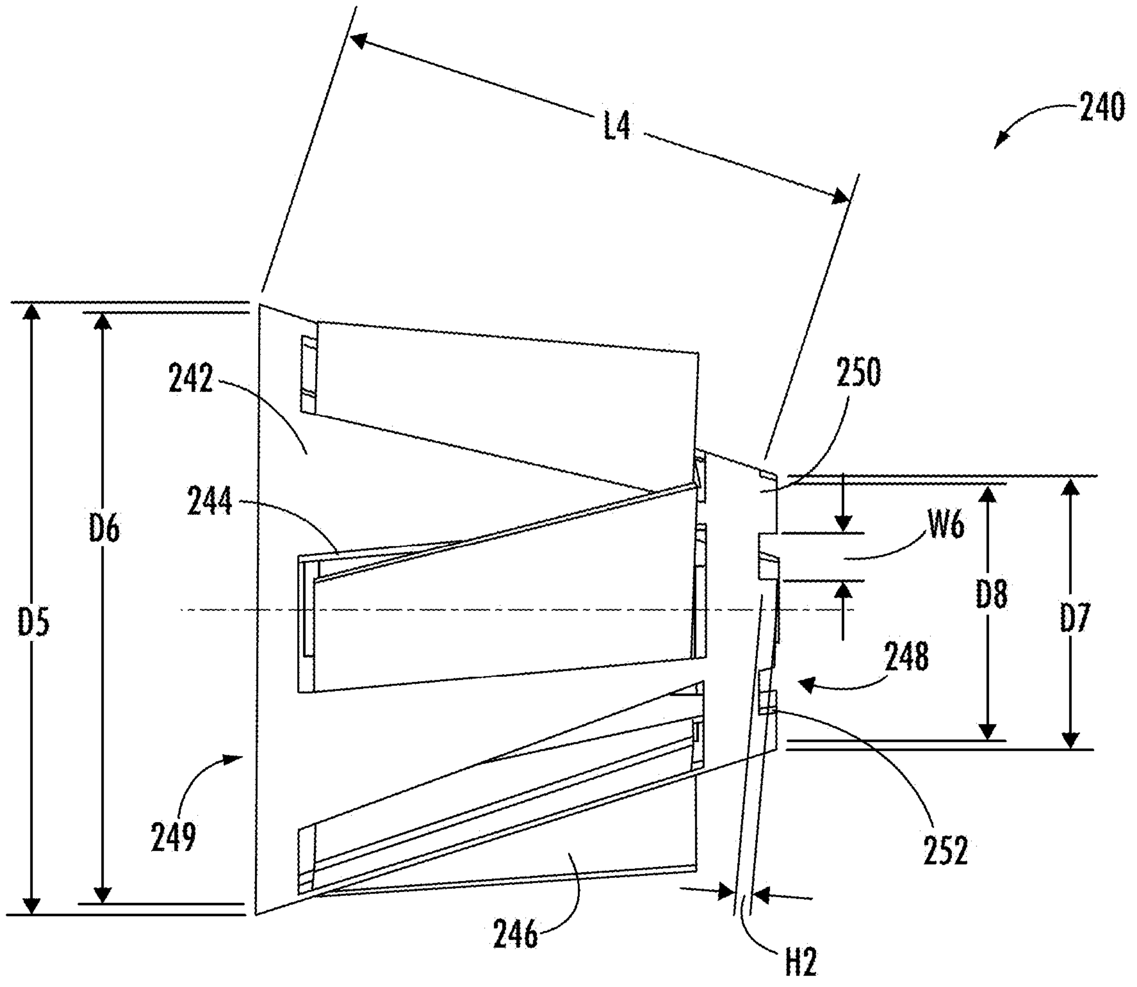
FIGS. 20A and 20B are side views of another portion of the mixer of FIGS. 17 and 18.

As illustrated in FIG. 20A, the inner mixer 240 includes a length L4 from the fourth end 249 to a lower surface of one of the inner edge slot 252. In some embodiments, the length L4 may be between approximately 90 mm and approximately 110 mm (e.g., 97.79 mm, etc.). The inner mixer 240 further includes a fourth end outer diameter D5 extending across an outer portion of the inner mixer body 242 proximate the fourth end 249. In some embodiments, the fourth end outer diameter D5 may be between approximately 100 mm and approximately 125 mm (e.g., 113.7 mm, etc.). The inner mixer 240 further includes a second end inner diameter D6 extending across an inner portion of the inner mixer body 242 proximate the fourth end 249. In some embodiments, the second end inner diameter D6 is between approximately 95 mm and 120 mm (e.g., 110.55 mm, etc.). The inner mixer 240 further includes a third end outer diameter D7 extending across an outer portion of the inner mixer body 242 proximate the third end 248. In some embodiments, the third end outer diameter D7 may be between approximately 40 mm and approximately 60 mm (e.g., 51.24 mm, etc.). The inner mixer 240 further includes a first end inner diameter D8 extending across an inner portion of the inner mixer body 242 proximate the third end 248. In some embodiments, the first end inner diameter D8 is between approximately 37 mm and 57 mm (e.g., 48.09 mm, etc.). The inner mixer 240 includes a tab height H2 defining a height of at least one of the inner tabs 250. In some embodiments, the tab height H2 is between approximately 1.5 mm and approximately 4.5 mm (e.g., 3.1 mm, etc.). The inner mixer 240 includes an edge slot width W6 defining a width of a non-circumferential width of at least one of the inner edge slots 252. In some embodiments, the edge slot width W6 is between approximately 5 mm and 15 mm (e.g., 9.36 mm, etc.).

Figure 20B:
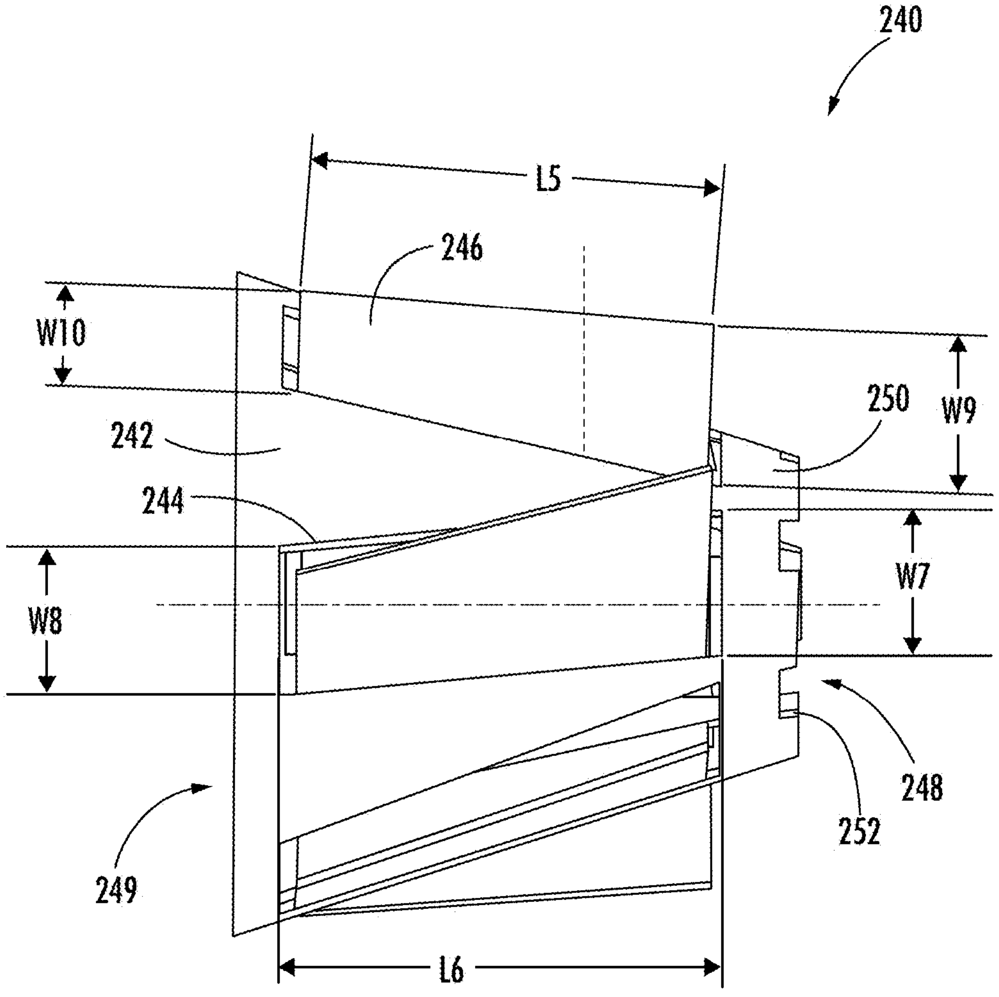

As illustrated in FIG. 20B, the inner mixer 240 includes a blade length L5 taken across an outer most portion of at least one of the inner blades 246. In some embodiments, the blade length L5 is between approximately 63 mm and approximately 75 mm (e.g., 70.53 mm, etc.). The inner mixer 240 further includes an aperture length L6 defining a length of at least one of the inner apertures 244. In some embodiments, the aperture length L6 is between approximately 65 mm and approximately 82 mm (e.g., 75 mm, etc.). The inner mixer 240 further includes a first aperture width W7 defining a width of at least one of the inner apertures 244 proximate the third end 248. In some embodiments, the first aperture width W7 is between approximately 20 mm and approximately 30 mm (e.g., 25.32 mm, etc.). The inner mixer 240 further includes a second aperture width W8 defining a width of at least one of the inner apertures 244 proximate the fourth end 249. In some embodiments, the second aperture width W8 is between approximately 20 mm and approximately 30 mm (e.g., 25.62 mm, etc.). The inner mixer 240 further includes a first blade width W9 defining a width of at least one of the inner blades 246 proximate the third end 248. In some embodiments, the first blade width W9 is between approximately 22 mm and approximately 33 mm (e.g., 27.71 mm, etc.). The inner mixer 240 further includes a second blade width W10 defining a width of at least one of the inner blades 246 proximate the fourth end 249. In some embodiments, the second blade width W10 is between approximately 13 mm and approximately 23 mm (e.g., 17.42 mm, etc.).

Figure 28:
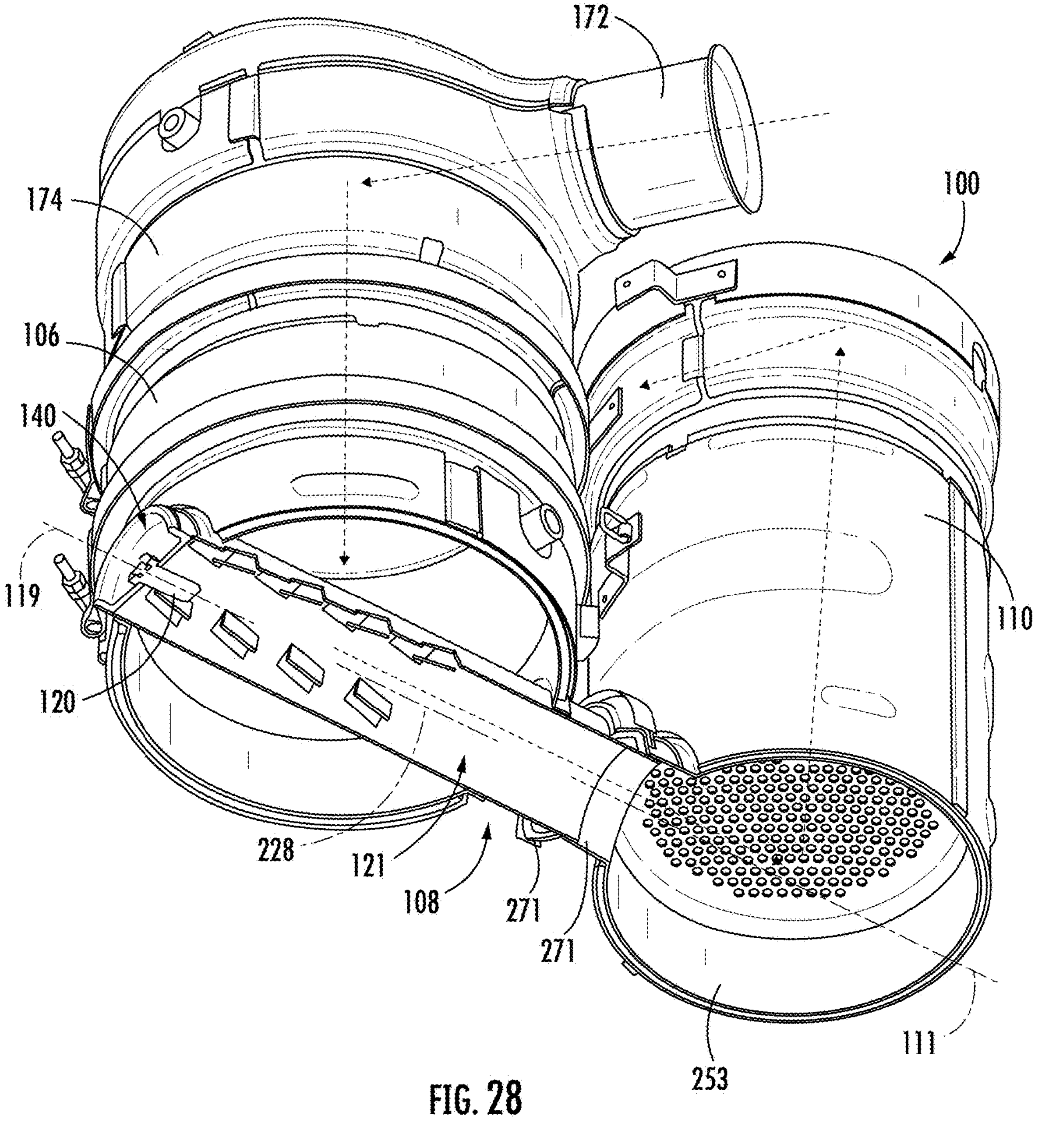
FIGS. 28 and 29 are cross-sectional views of the exhaust aftertreatment system of FIGS. 23 and 24 taken along plane 28-28 in FIG. 24.
Figure 29:
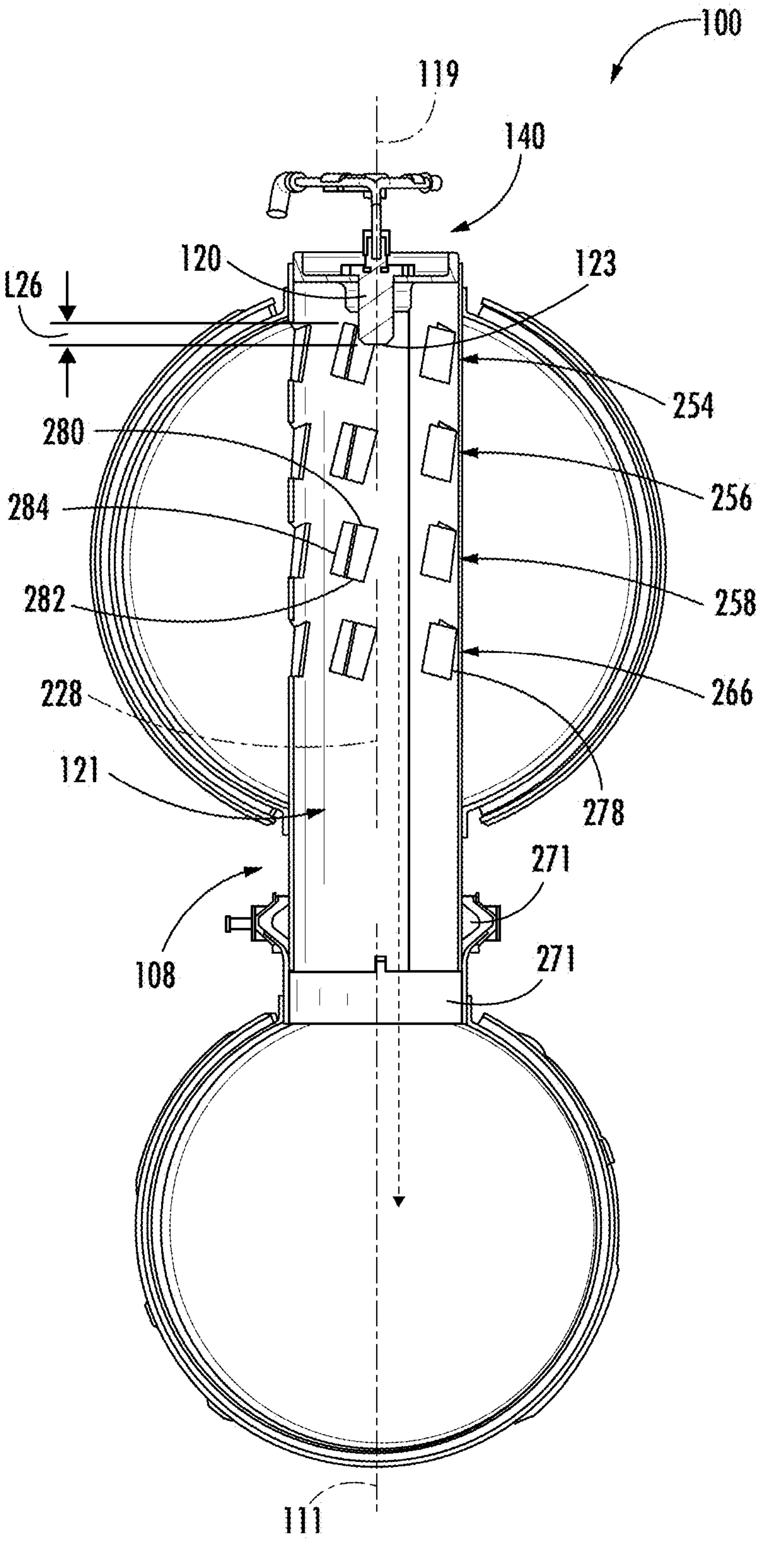
Figure 30:
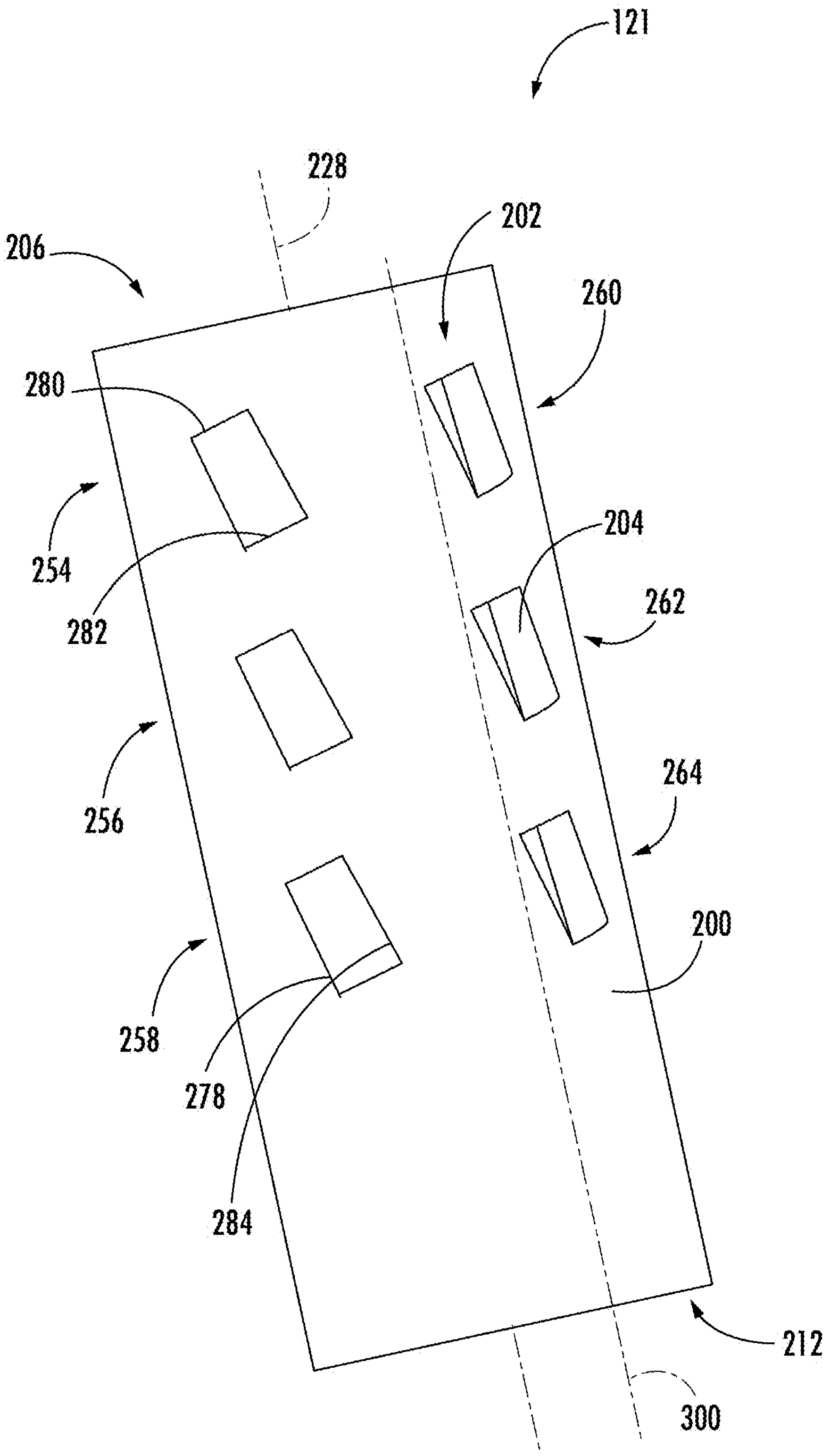
FIG. 30 is a front view of yet another mixer.

In some embodiments, illustrated in FIGS. 28 and 29, the mixer body 200 may be combined with the decomposition chamber 108, such that the mixer body 200 functions as the decomposition chamber 108 (e.g., the mixer body 200 is the decomposition chamber 108). This results in reducing a pressure drop within the decomposition chamber 108, assisting the mixer 121 in efficiently dispersing the treatment fluid within the exhaust downstream of the mixer 121. As a result, a portion of the mixer body 200 may extend across a gap between two adjacent bodies (e.g., a first body containing the particulate filter 106 and a second body containing the catalyst member 110, etc.). Furthermore, the exhaust aftertreatment system 100 may include an additional mixing volume 253 downstream of the mixer 121. The additional mixing volume 253 provides additional time, via space (e.g., volume), for the exhaust and treatment fluid to mix before entering the catalyst member 110. This results in better mixing of the exhaust and treatment fluid, thereby reducing $NO_x$ emissions.

As illustrated in FIGS. 30-41, the apertures 202 may include a first set of apertures 254 (e.g., a first row of apertures, etc.), a second set of apertures 256, and a third set of apertures 258. Similarly, the blades 204 may include a first set of blades 260, a second set of blades 262, and a third set of blades 264. The first set of apertures 254 corresponds to the first set of blades 260, such that each of the first set of blades 260 is coupled to the mixer body 200 along a portion of the first set of apertures 254. The second set of apertures 256 corresponds to the second set of blades 262, such that each of the second set of blades 262 is coupled to the mixer body 200 along a portion of the second set of apertures 256. The third set of apertures 258 corresponds to the third set of blades 264, such that and each of the third set of blades 264 is coupled to the mixer body 200 along a portion of the third set of apertures 258. This configuration generates swirling of the exhaust along the length of the mixer 121, which may increase swirling of the exhaust. This may enhance mixing of the treatment fluid with the exhaust within of the mixer 121. This may also enhance reduction of deposits along the mixer 121.

In other embodiments, illustrated in FIGS. 32-41, the apertures 202 may also include a fourth set of apertures 266. The blades 204 may also include a fourth set of blades 268. The fourth set of apertures 266 corresponds to the fourth set of blades 268, such that each of the fourth set of blades 268 is coupled to the mixer body along a portion of the fourth set of apertures 266.

In still other embodiments, the apertures 202 may include (i) more than four sets of apertures (e.g., five sets of apertures, six sets of apertures, seven sets of apertures, etc.), or (ii) less than three sets of apertures (e.g., only the first set of apertures 254, only the first set of apertures 254 and the second set of apertures 256, etc.). The blades 204 may include (i) more than four sets of blades (e.g., a fifth set of blades, a sixth set of blades, a seventh set of blades, etc.), or (ii) less than three sets of blades (e.g., only the first set of blades 260, only the first set of blades 260 and the second set of blades 262, etc.).

As illustrated in FIGS. 28, 29, 32, and 33, the first end 206 may include a first connection slot 270 configured to couple the mixer 121 with conduit couplings 271 (e.g., pipe connectors, etc.) and/or other components of the exhaust aftertreatment system 100 (e.g., the panel 140, the particulate filter 106, etc.). The second end 212 may also include a second connection slot 272 configured to couple the mixer 121 with conduit couplings 271 and/or other components of the exhaust aftertreatment system 100 that are downstream of the mixer 121 (e.g., the catalyst member 110, etc.). In some embodiments, the first end 206 may include multiple first connection slots 270 and the second end 212 may include multiple second connection slots 272. In some embodiments, the conduit couplings 271 couple to the mixer body 200 without coupling to the first connection slot 270 or the second connection slot 272. In some embodiments, the conduit couplings 271 couple to the mixer body 200 around an outer surface of the mixer body 200, such that the conduit couplings 271 are less likely to collect deposits of the treatment fluid.

Figure 33:
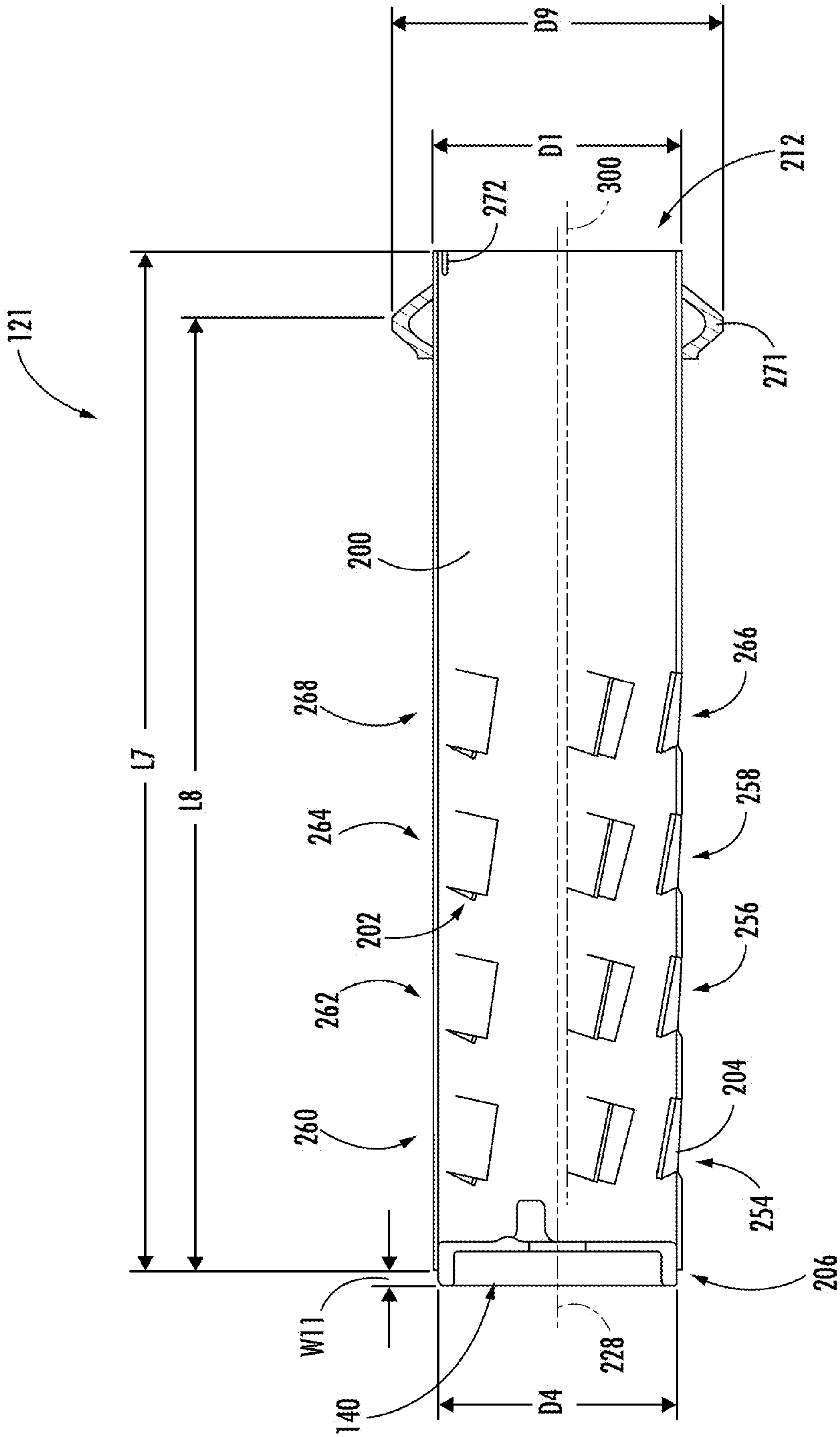
FIG. 33 is a cross-sectional view of the mixer of FIG. 32 taken along plane 33-33 in FIG. 32 and including conduit couplings.

As illustrated in FIG. 33, the mixer 121 includes a length L7 extending from the first end 206 to the second end 212.

Figure 34:
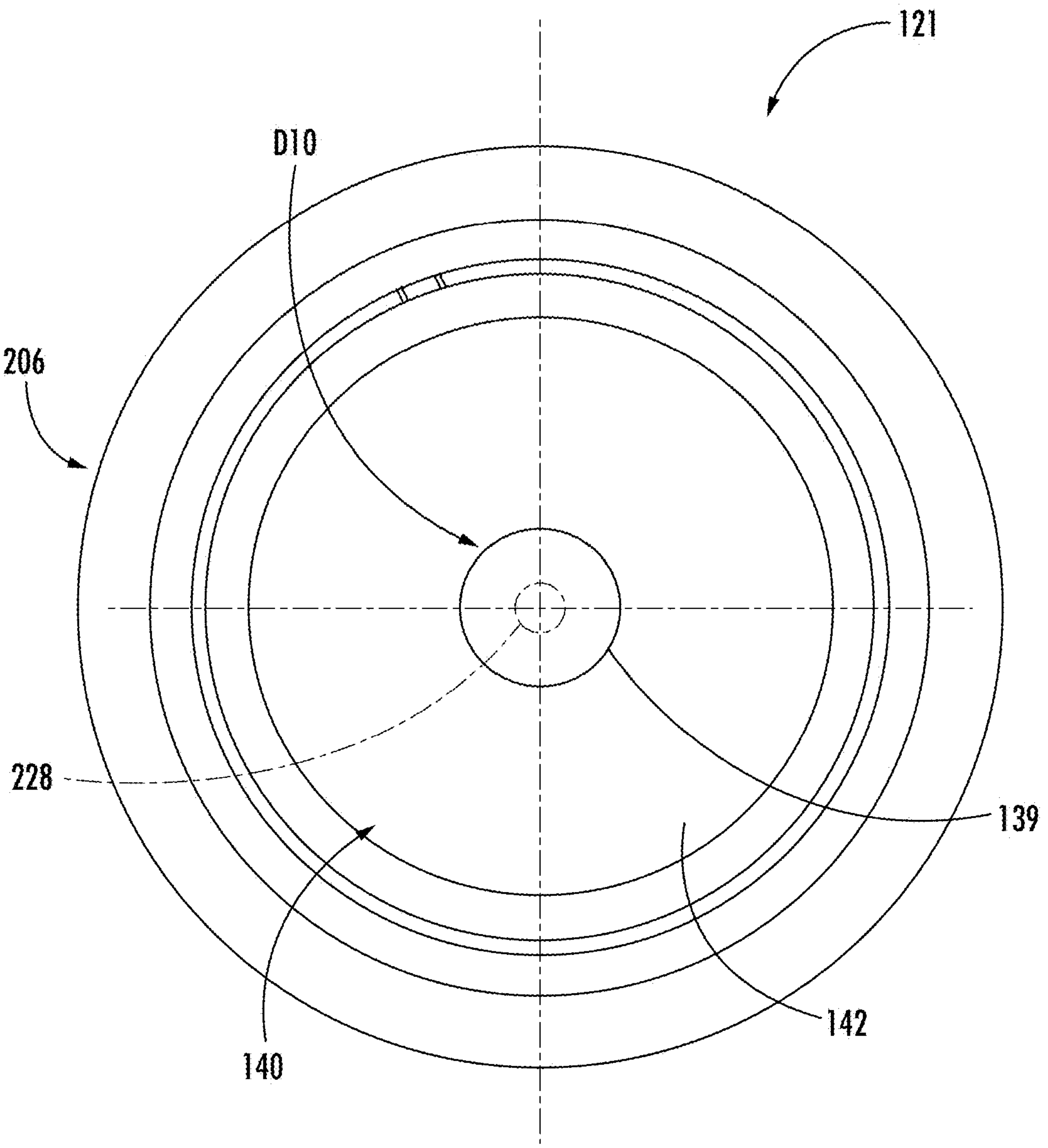
FIG. 34 is a left side view of the mixer of FIG. 33.

In some embodiments, the length L7 is between approximately 390 mm and approximately 400 mm (e.g., 394 mm, etc.). The mixer 121 further includes a length L8 extending from the first end 206 to the conduit coupling 271. In some embodiments, the length L8 is between approximately 360 mm and approximately 376 mm (e.g., 368.3 mm, etc.). The conduit coupling 271 includes an outer diameter D9. In some embodiments, the outer diameter D9 is between approximately 120 mm and approximately 136 mm (e.g., 128 mm, etc.). When the panel 140 is coupled to the mixer 121 proximate the first end 206, the panel 140 may have a panel width W11 protruding outward from the first end 206. In some embodiments, the panel width W11 is between approximately 4 mm and approximately 10 mm (e.g., 6 mm, etc.). As illustrated in FIG. 34, the injector aperture 139 includes an injector aperture diameter D10. In some embodiments, the injector aperture diameter D10 is between approximately 15 mm and approximately 29 mm (e.g., 22 mm, etc.).

Figure 35:
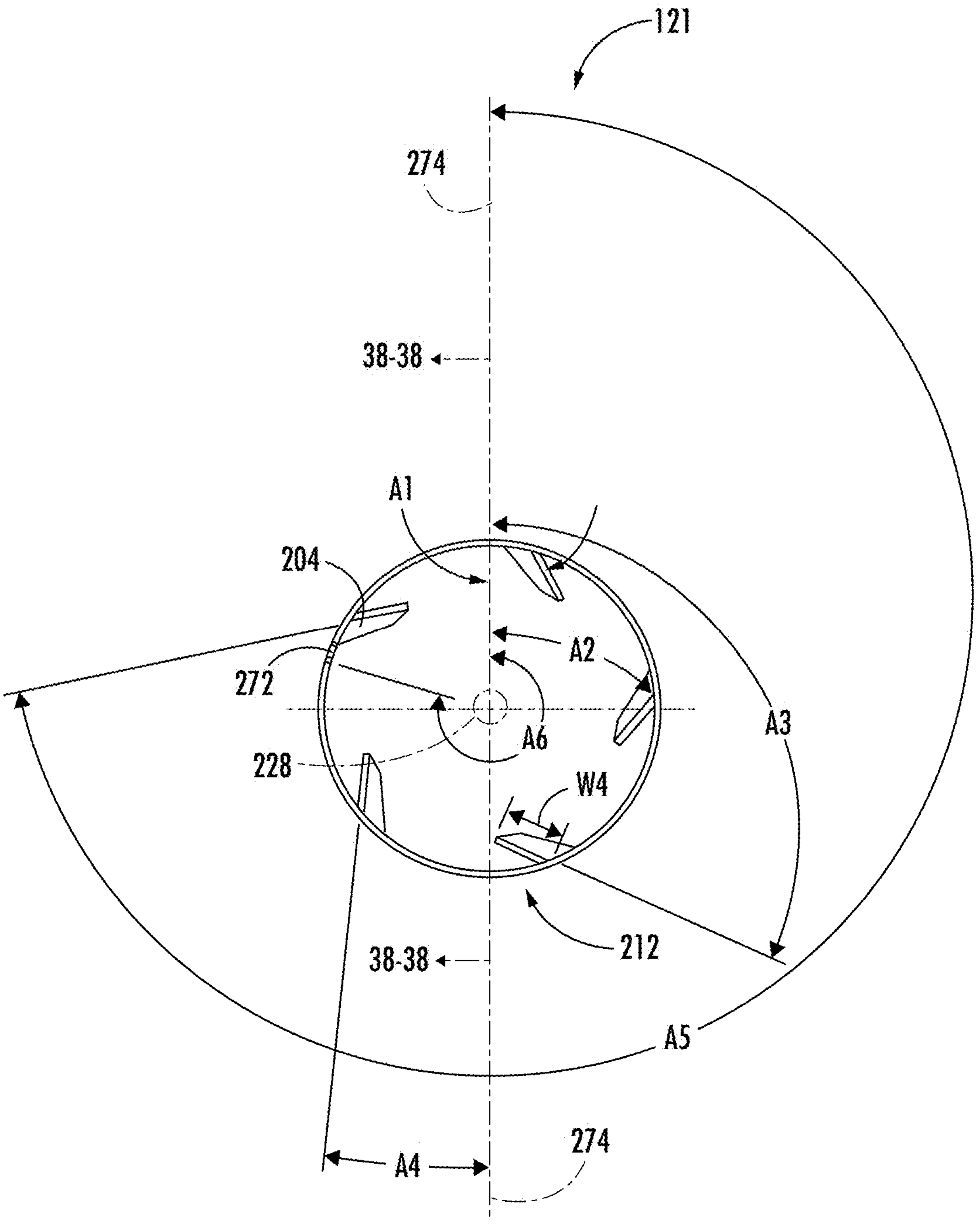
FIG. 35 is a right side view of the mixer of FIG. 32.

As illustrated in FIG. 35, the mixer 121 may include a vertical axis 274 perpendicular from the mixer axis 228. The mixer 121 includes an angle A1 between an edge of one of the blades 204 and the vertical axis 274. In some embodiments, the angle A1 is between approximately 25 degrees and approximately 35 degrees (e.g., 30 degrees, etc.). The mixer 121 includes an angle A2 between an edge of another one of the blades 204 and the vertical axis 274. In some embodiments, the angle A2 is between approximately 37 degrees and approximately 47 degrees (e.g., 42 degrees, etc.). The mixer 121 includes an angle A3 between an edge of yet another one of the blades 204 and the vertical axis 274. In some embodiments, the angle A3 is between approximately 110 degrees and approximately 120 degrees (e.g., 114 degrees, etc.). The mixer 121 includes an angle A4 between an edge of yet another one of the blades 204 and the vertical axis 274. In some embodiments, the angle A4 is between approximately 1 degrees and approximately 11 degrees (e.g., 5.9 degrees, etc.). The mixer 121 includes an angle A5 between an edge of yet another one of the blades 204 and the vertical axis 274. In some embodiments, the angle A5 is between approximately 250 degrees and approximately 266 degrees (e.g., 258 degrees, etc.). The mixer 121 includes an angle A6 between an edge of the second connection slot 272 and the vertical axis 274. In some embodiments, the angle A6 is between approximately 279 degrees and approximately 293 degrees (e.g., 286 degrees, etc.).

Figure 36:
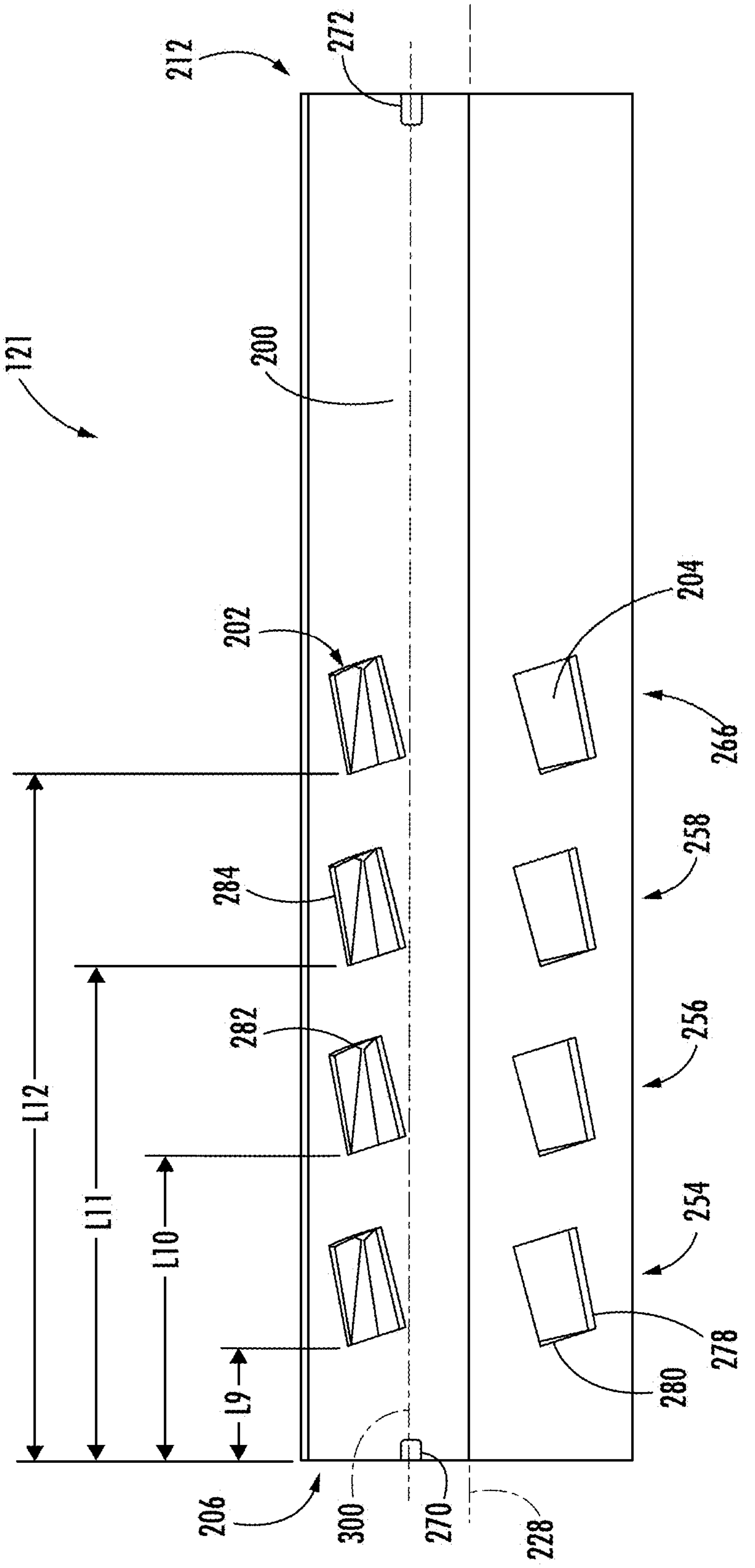
FIG. 36 is a front view of the mixer of FIGS. 32 and 35.
Figure 37:
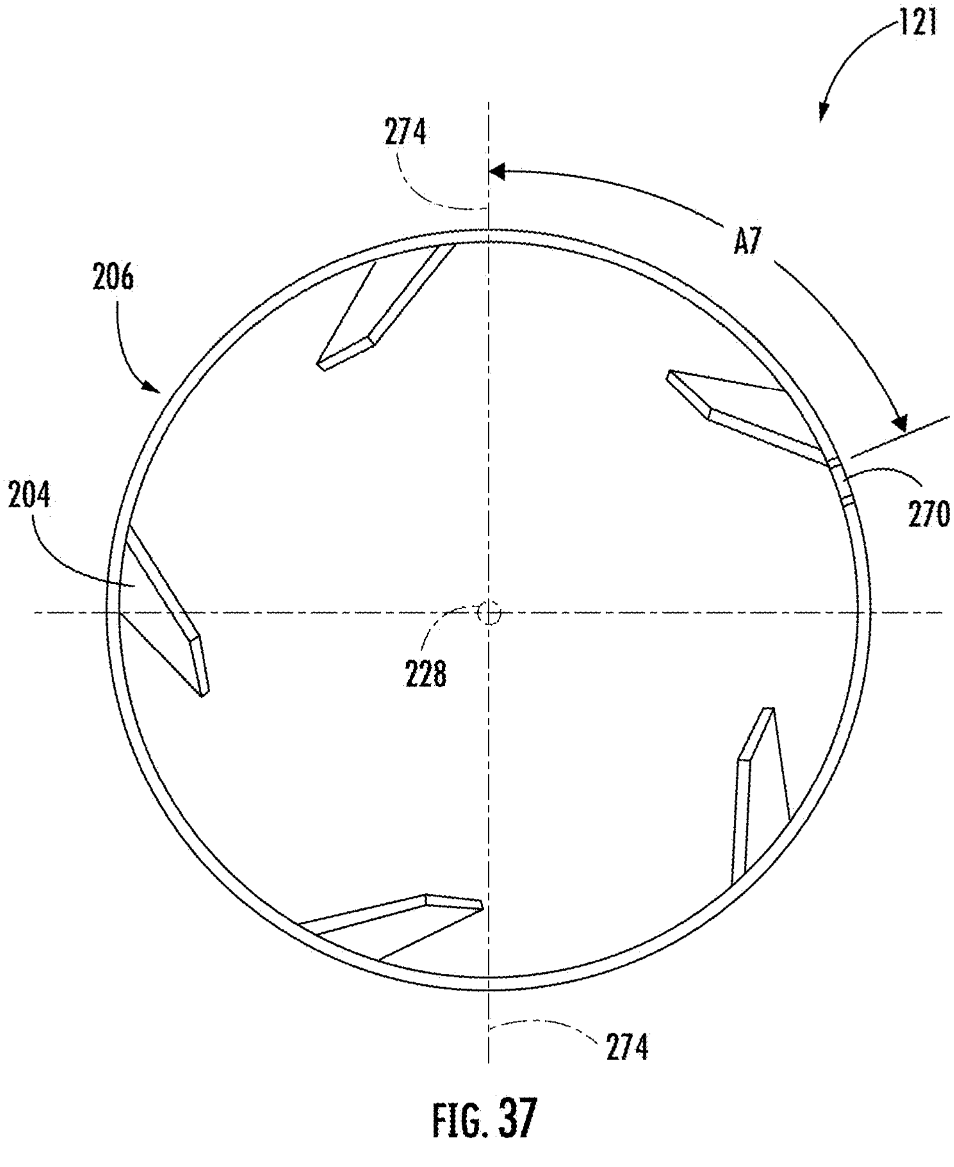
FIG. 37 is a left side view of the mixer of FIGS. 32 and 35.

As illustrated in FIG. 36, the mixer 121 includes a length L9 between an edge of one aperture of the first set of apertures 254 and the first end 206. In some embodiments, the length L9 is between approximately 26 mm and approximately 40 mm (e.g., 32.9 mm, etc.). The mixer 121 includes a length L10 between an edge of one aperture of the second set of apertures 256 and the first end 206. In some embodiments, the length L10 is between approximately 80 mm and approximately 96 mm (e.g., 87.9 mm, etc.). The mixer 121 includes a length L11 between an edge of one aperture of the third set of apertures 258 and the first end 206. In some embodiments, the length L11 is between approximately 135 mm and approximately 151 mm (e.g., 142.9 mm, etc.). The mixer 121 includes a length L12 between an edge of one aperture of the fourth set of apertures 266 and the first end 206. In some embodiments, the length L12 is between approximately 190 mm and approximately 206 mm (e.g., 197.9 mm, etc.). As illustrated in FIG. 37, the mixer 121 includes an angle A7 between an edge of the first connection slot 270 and the vertical axis 274. In some embodiments, the angle A7 is between approximately 60 degrees and approximately 76 degrees (e.g., 68 degrees, etc.).

Figure 38:
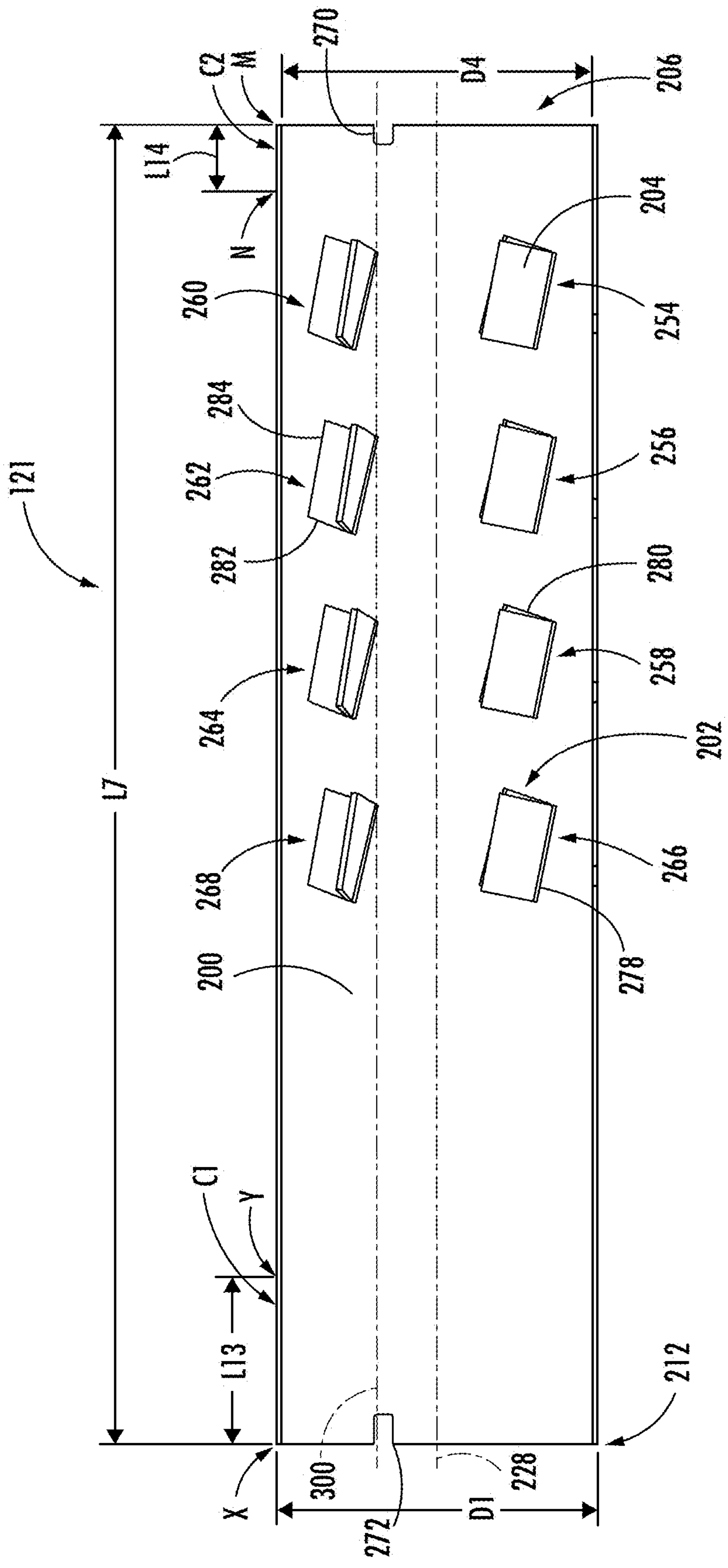
FIG. 38 is a cross-sectional view of the mixer of FIGS. 32 and 35 taken along plane 38-38 of FIG. 35.

As illustrated in FIG. 38, the mixer 121 may include a point X disposed at the second end 212 and a point Y disposed on the mixer body 200. The point X and the point Y are coplanar. The mixer 121 further includes a length L13 between the point X and the point Y. In some embodiments, the length L13 is between approximately 42 mm and approximately 57 mm (e.g., 50 mm, etc.). The mixer 121 further includes a circularity tolerance C1 (e.g., roughness, etc.) between the point X and the point Y. In some embodiments, the circularity tolerance C1 is between approximately 0.1 mm and approximately 1.5 mm (e.g., 0.8 mm, etc.). The mixer 121 may further include a point N disposed on the mixer body 200 and a point M disposed at the first end 206. The point N and the point M are coplanar. The mixer 121 further includes a length L14 between the point N and the point M. In some embodiments, the length L14 is between approximately 13 mm and approximately 27 mm (e.g., 20 mm, etc.). The mixer 121 further includes a circularity tolerance C2 between the point N and the point M. In some embodiments, the circularity tolerance C2 is between approximately 0.1 mm and approximately 1.5 mm (e.g., 0.8 mm, etc.).

Figure 39:
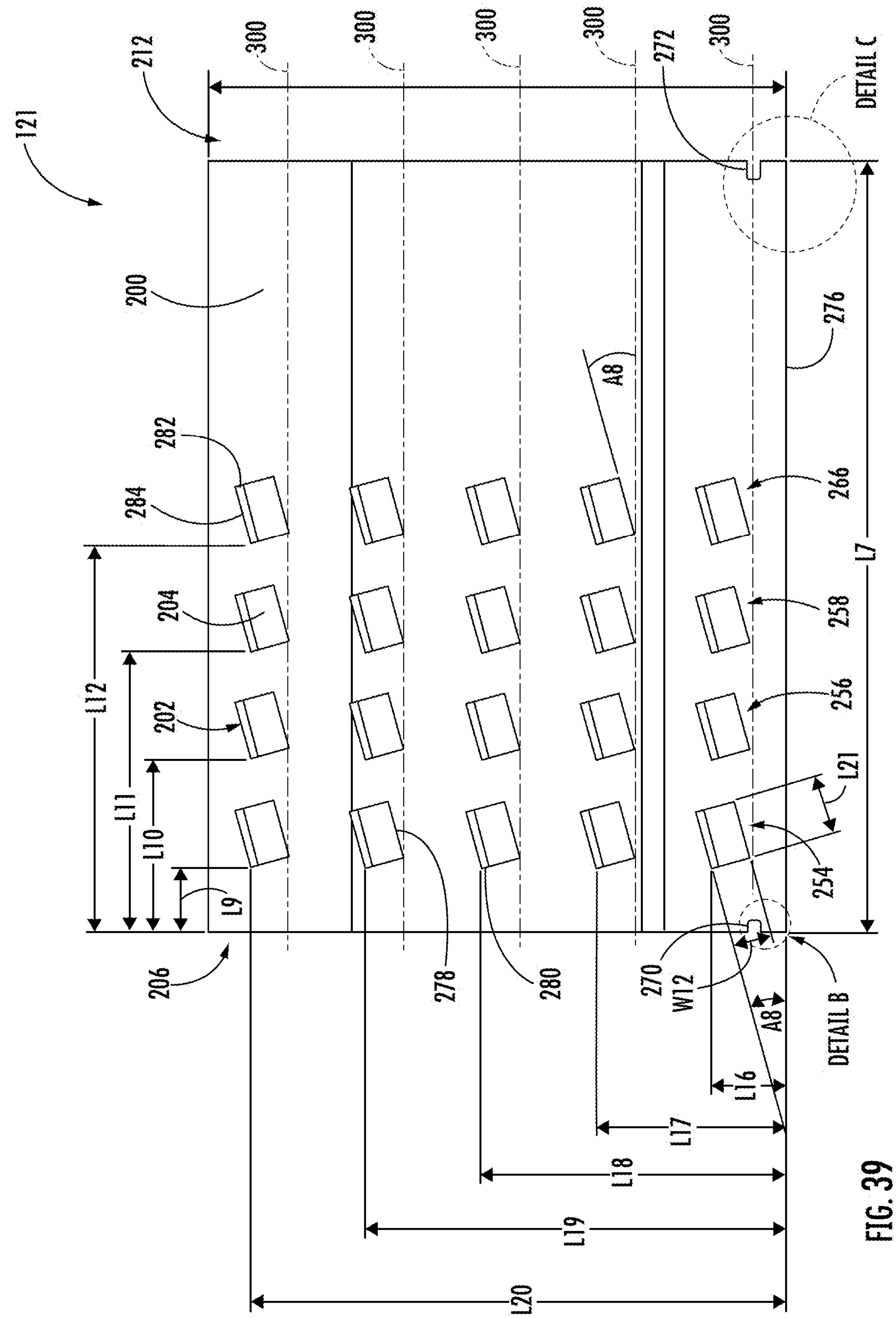
FIG. 39 is a view of a flat blank for forming the mixer of FIGS. 32 and 35.

As illustrated in FIG. 39, the mixer 121 may include an axial edge 276 parallel to the mixer axis 228. The mixer 121 further includes a length L16 from the axial edge 276 to an edge of one aperture of the apertures 202. In some embodiments, the length L16 is between approximately 30 mm and approximately 46 mm (e.g., 37.8 mm, etc.). The mixer 121 further includes a length L17 from the axial edge 276 to an edge of another aperture of the apertures 202. In some embodiments, the length L17 is between approximately 90 mm and approximately 104 mm (e.g., 96.8 mm, etc.). The mixer 121 further includes a length L18 from the axial edge 276 to an edge of yet another aperture of the apertures 202. In some embodiments, the length L18 is between approximately 150 mm and approximately 162 mm (e.g., 155.7 mm, etc.). The mixer 121 further includes a length L19 from the axial edge 276 to an edge of yet another aperture of the apertures 202. In some embodiments, the length L19 is between approximately 206 mm and approximately 222 mm (e.g., 214.7 mm, etc.). The mixer 121 further includes a length L20 from the axial edge 276 to an edge of yet another aperture of the apertures 202. In some embodiments, the length L20 is between approximately 266 mm and approximately 280 mm (e.g., 273.7 mm, etc.). The mixer 121 may include a continuous length L21 for at least one aperture of the apertures 202. In some embodiments, the continuous length L21 is between approximately 25 mm and approximately 35 mm (e.g., 30.1 mm, etc.). The mixer 121 may include a continuous width W12 for at least one aperture of the apertures 202. In some embodiments, the continuous width W12 is between approximately 15 mm and approximately 25 mm (e.g., 20.4 mm, etc.).

As illustrated in 30, 32, 36, 38, and 39, each of the apertures 202 includes a first edge 278 contiguous with one blade of the blades 204. Each of the apertures 202 further includes a second edge 280 perpendicular to the first edge 278 and disposed along a first end of the first edge 278. Each of the apertures 202 further includes a third edge 282 perpendicular to the first edge 278 and disposed along a second end of the first edge 278 opposite the first end of the first edge 278. Each of the apertures 202 further includes a fourth edge 284 opposite the first edge 278 and perpendicular to both the second edge 280 and the third edge 282. In some embodiments, a length of the first edge 278 is between approximately 20 mm and approximately 40 mm (e.g., 30.1 mm, etc.). In some embodiments, a length of the second edge 280 is between approximately 10 mm and approximately 30 mm (e.g., 20.66 mm, etc.). In some embodiments, the first edge 278 and the fourth edge 284 include equal or approximately equal lengths. In other embodiments, the first edge 278 and the fourth edge 284 include different (e.g., unequal, etc.) lengths. In some embodiments, the second edge 280 and the third edge 282 include equal or approximately equal lengths. In other embodiments, the second edge 280 and the third edge 282 include different lengths.

As illustrated in FIGS. 30, 32, 33, 36, 38, and 39, the mixer 121 may include a plurality of reference axes 300. Each of the reference axes 300 is parallel to the mixer axis 228 and the axial edge 276 and extends through at least (i) an intersection between the first edge 278 and the second edge 280 of one aperture of the first set of apertures 254, and (ii) an intersection between the first edge 278 and the second edge 280 of one aperture of the second set of apertures 256. The mixer 121 may include an aperture angle A8 on the mixer body 200 between the first edge 278 of at least one of the apertures 202 and the axial edge 276. The aperture angle A8 is also on the mixer body 200 between the first edge 278 of at least one of the apertures 202 and one of the reference axes 300. In some embodiments, the aperture angle A8 is between approximately 5 degrees and approximately 30 degrees. In other embodiments, the aperture angle A8 is between approximately 10 degrees and approximately 20 degrees (e.g., 15.5 degrees, etc.). In some embodiments, only some (e.g., not all, etc.) of the apertures 202 include the apertures angle A8. In other embodiments, all of the apertures 202 include the aperture angle A8.

Figure 40:
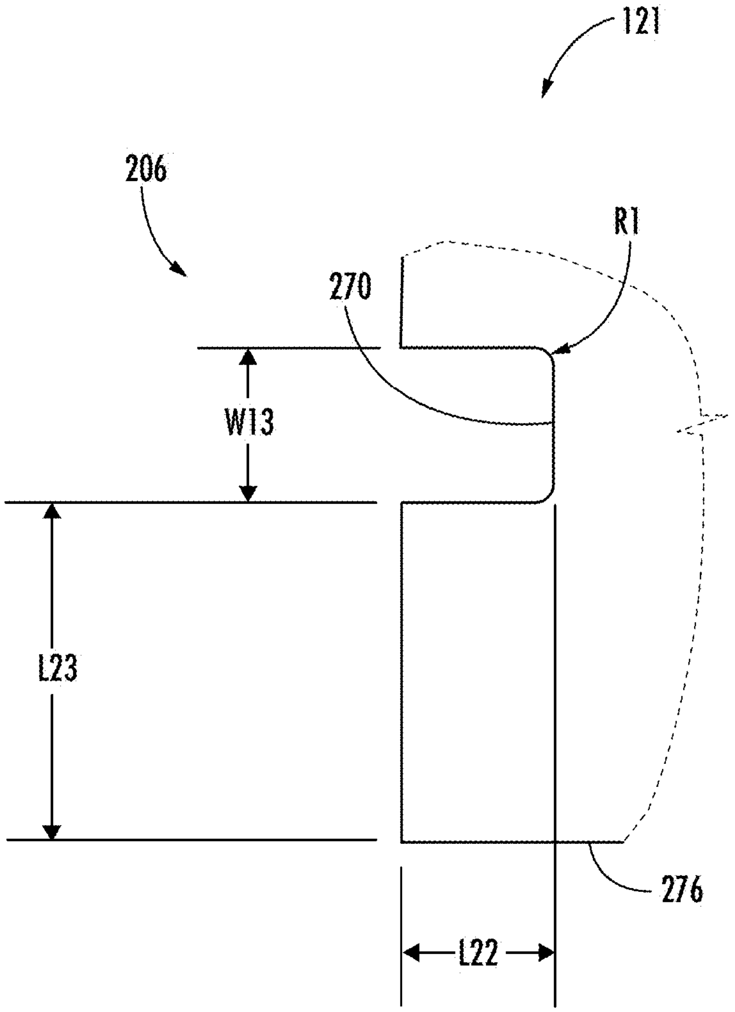
FIG. 40 is a view of Detail B in FIG. 39.

As illustrated in FIG. 40, the first connection slot 270 includes a first slot width W13. In some embodiments, the first slot width W13 is between approximately 3 mm and approximately 10 mm (e.g., 6 mm, etc.). The first connection slot 270 further includes a first slot length L22. In some embodiments, the first slot length L22 is between approximately 3 mm and approximately 10 mm (e.g., 6 mm, etc.). The first connection slot 270 further includes a radius of curvature R1. In some embodiments, the radius of curvature R1 is between approximately 0.5 mm and approximately 1.5 mm (e.g., 1 mm, etc.). The mixer 121 includes a length L23 between an edge of the first connection slot 270 and the axial edge 276. In some embodiments, the length L23 is between approximately 7 mm and approximately 18 mm (e.g., 13.35 mm, etc.).

Figure 41:
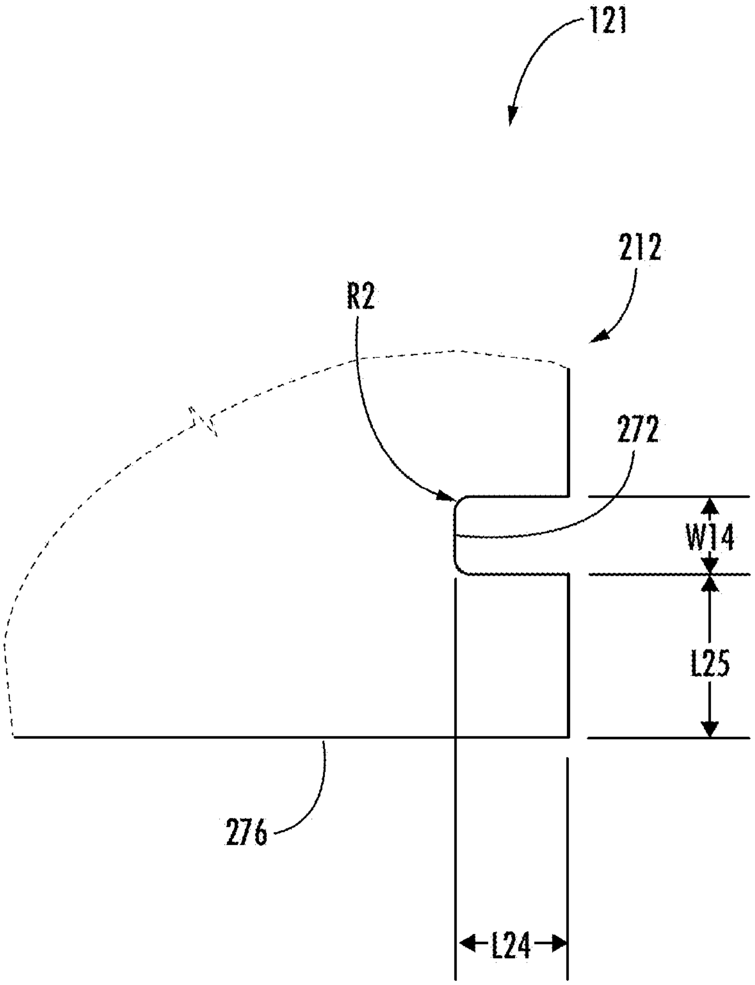
FIG. 41 is a view of Detail C in FIG. 39.

As illustrated in FIG. 41, the second connection slot 272 includes a second slot width W14. In some embodiments, the second slot width W14 is between approximately 3 mm and approximately 10 mm (e.g., 6 mm, etc.). The second connection slot 272 further includes a second slot length L24. In some embodiments, the second slot length L24 is between approximately 5 mm and approximately 14 mm (e.g., 9 mm, etc.). The first connection slot 270 further includes a radius of curvature R2. In some embodiments, the radius of curvature R2 is between approximately 0.5 mm and approximately 1.5 mm (e.g., 1 mm, etc.). The mixer 121 includes a length L25 between an edge of the second connection slot 272 and the axial edge 276. In some embodiments, the length L25 is between approximately 7 mm and approximately 18 mm (e.g., 13.35 mm, etc.).

As illustrated in FIG. 29, the injector 120 may include a tip surface 123 (e.g., an end surface, etc.). The mixer 121 further includes a length L26 from the tip surface 123 to an intersection between the second edge 280 and the fourth edge 284 of one aperture of the first set of apertures 254. In some embodiments, the length L25 is between approximately 2 mm and approximately 10 mm (e.g., 6 mm, etc.).

It is to be appreciated that the mixer 121 may be manufactured (e.g., created, built, etc.) through various conventional methods, such as Mannesmann plug mill process, Mandrel mill process, extrusion process, forging (e.g., forged seamless pipe manufacturing process, etc.), welding (e.g., welded pipe manufacturing process, etc.), casting, drawing, forming, machining, cutting, punching, stamping, and 3D printing.

IV. Configuration of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, treatment fluid, an air-treatment fluid mixture, exhaust, hydrocarbon, an air-hydrocarbon mixture, may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An exhaust aftertreatment system comprising:

a decomposition chamber centered on a chamber axis;

a panel positioned such that the chamber axis extends through the panel, the panel comprising:

an inner side facing the decomposition chamber, and an outer side opposite the inner side;

a dosing module coupled to the outer side of the panel, the dosing module comprising an injector configured to provide a treatment fluid through the panel, into the decomposition chamber, and along an injection axis; and a mixer comprising:

a mixer body positioned such that the injection axis of the injector of the dosing module extends into the mixer body, the mixer body configured to receive exhaust and the treatment fluid, a plurality of apertures extending through the mixer body, each of the apertures configured to facilitate flow of the exhaust and the treatment fluid through the mixer body, a plurality of blades, each of the blades coupled to the mixer body along a portion of one of the apertures, each of the blades extending radially outward from the mixer body, a plurality of tabs located at a first end of the mixer, each of the tabs comprising a tab end coupled to the inner side of the panel opposite of the dosing module, and a plurality of edge slots, each of the edge slots positioned between two of the tabs, wherein the tabs, the edge slots, and the inner side of the panel define a plurality of openings configured to facilitate flow of the exhaust between the mixer and the inner side of the panel.

2. The exhaust aftertreatment system of claim 1, wherein each of the blades of the mixer comprises:

a first portion angled at a first opening angle away from the mixer body, the first portion contiguous with the mixer body; and a second portion angled at a second opening angle away from the mixer body, the second portion contiguous with the mixer body.

3. The exhaust aftertreatment system of claim 1, wherein the mixer further comprises a second end opposite the first end, the second end comprising a flange extending radially outward from the mixer body.

4. The exhaust aftertreatment system of claim 3, wherein:

the mixer body is centered on a mixer axis;

the flange comprises a mixer body edge contiguous with the mixer body and an outlet edge;

$$L = (R_{1f} - R_{2f})/\sin(\theta);$$

L is a length of the flange measured along the flange between the mixer body edge of the flange and the outlet edge of the flange;

R1f is a first flange radius measured from the mixer axis to the outlet edge of the flange and 0.04 meters$\leq R_{1f} \leq$0.08 meters;

$R_{2f}$ is a second flange radius measured from the mixer axis to the mixer body edge of the flange and is of the form $R_{2f}=R_{1e}/\alpha$;

R1e is a first end radius measured from the mixer axis to the first end of the mixer and 0.02 meters$\leq R_{1e} \leq$0.05 meters;

$\alpha$ is a radius ratio and $0.06 \leq \alpha \leq 0.09$; and $\theta$ is a flange angle measured relative to the mixer axis and 15 degrees$\leq\theta\leq$50 degrees.

5. The exhaust aftertreatment system of claim 3, wherein the flange comprises at least one of:

a plurality of flange holes extending through the flange, each of the flange holes configured to facilitate flow of the exhaust through the flange; or a plurality of flange slots extending through the flange, each of the flange slots configured to facilitate flow of the exhaust through the flange, wherein the flange is configured to be received within the decomposition chamber.

6. The exhaust aftertreatment system of claim 1, the mixer further comprising:

a second end opposite the first end;

a first plate coupled to the second end and extending radially outward from the second end; and a second plate coupled to the second end and extending radially outward from the second end, wherein the first plate, the second plate, and the second end define a plate channel configured to facilitate flow of the exhaust therethrough such that the plate channel is only defined by the first plate, the second plate, and the second end.

7. The exhaust aftertreatment system of claim 1, the mixer further comprising:

a second end opposite the first end; and a plurality of body holes extending through the mixer body and disposed between the second end and the apertures, each of the body holes configured to facilitate flow of the exhaust through the mixer body.

8. The exhaust aftertreatment system of claim 1, the mixer further comprising an inner mixer, the inner mixer disposed within the mixer body, the inner mixer comprising:

an inner mixer body positioned such that the injection axis extends into the inner mixer body, the inner mixer body configured to receive the exhaust and the treatment fluid;

a plurality of inner apertures extending through the inner mixer body, each of the inner apertures configured to facilitate flow of the exhaust and the treatment fluid through the inner mixer body; and a plurality of inner blades, each of the inner blades coupled to the inner mixer body along a portion of one of the inner apertures, each of the inner blades extending radially outward from the inner mixer body.

9. The exhaust aftertreatment system of claim 8, wherein each of the inner blades extends through each of the apertures of the mixer.

10. The exhaust aftertreatment system of claim 1, wherein the mixer body extends around the chamber axis.

11. The exhaust aftertreatment system of claim 1, wherein at least a portion of the mixer body comprises a frustoconical shape.

12. The exhaust aftertreatment system of claim 1, wherein at least a portion of the mixer body comprises a cylindrical shape.

13. The exhaust aftertreatment system of claim 1, wherein each of the apertures has a rectangular shape.

14. The exhaust aftertreatment system of claim 1, wherein each of the apertures defines an open area between 400 mm2 and 850 mm2.

15. The exhaust aftertreatment system of claim 1, wherein at least one of the blades extends radially outward from the mixer body at an angle between 15 degrees and 85 degrees.

16. The exhaust aftertreatment system of claim 1, wherein each of the blades has a mostly rectangular shape.

17. The exhaust aftertreatment system of claim 1, wherein the mixer further comprises a second end opposite the first end, a length from the second end to a lower surface of one of the edge slots is between 100 mm to 120 mm.

18. The exhaust aftertreatment system of claim 1, wherein the mixer further comprises a second end opposite the first end, and an outer diameter of an outer portion of the mixer body proximate the second end is between 90 mm and 130 mm.

19. The exhaust aftertreatment system of claim 1, wherein a height of at least one of the tabs is between 4 mm and 10 mm.

20. The exhaust aftertreatment system of claim 1, wherein a non-circumferential width of at least one of the edge slots is between 10 mm and 20 mm.

21. A mixer for an exhaust aftertreatment system, the mixer comprising:

a mixer body centered on a mixer axis and positioned such that an injection axis of an injector of a dosing module extends into the mixer body, the mixer body configured to receive exhaust and treatment fluid;

a plurality of apertures extending through the mixer body, each of the apertures being elongated in a direction that extends at an aperture angle relative to a reference axis that is parallel to the mixer axis, each of the apertures configured to facilitate flow of the exhaust through the mixer body, and each of the apertures comprising:

a first edge, and a second edge perpendicular to the first edge and contiguous with the first edge; and a plurality of blades, each of the blades coupled to the mixer body along a portion of one of the apertures, each of the blades extending radially inward from the mixer body at an angle between 15 degrees and 85 degrees from the mixer body;

wherein the reference axis extends through: (i) an intersection between the first edge and the second edge of one of the apertures and (ii) an intersection between the first edge and the second edge of another of the apertures.

22. The mixer of claim 21, wherein the aperture angle is between 10 degrees and 20 degrees.

23. The mixer of claim 21, wherein the mixer body comprises a cylindrical shape.

24. The mixer of claim 21, wherein the mixer body extends around the injection axis.

25. A mixer for an exhaust aftertreatment system, the mixer comprising:

a mixer body positioned such that an injection axis of an injector of a dosing module extends into the mixer body, the mixer body configured to receive exhaust and treatment fluid;

a plurality of apertures extending through the mixer body, each of the apertures configured to facilitate flow of the exhaust and the treatment fluid through the mixer body, each of the apertures comprising a first edge, a second edge opposite of the first edge, a third edge extending between the first edge and the second edge, and a fourth edge opposite of the third edge and extending between the first edge and the second edge;

a plurality of blades, each of the blades coupled to the mixer body along the first edge of one of the apertures, each of the blades extending radially outward from the mixer body, each of the blades comprising:

a first portion coupled to the first edge and angled at a first opening angle away from the mixer body, the first portion contiguous with the mixer body, and a second portion coupled to the first edge and angled at a second opening angle away from the mixer body, the second portion contiguous with the mixer body, the second opening angle being different from the first opening angle; and a first end comprising:

a plurality of tabs, and a plurality of edge slots, each of the edge slots positioned between two of the tabs.

26. A mixer for an exhaust aftertreatment system, the mixer comprising:

a mixer body positioned such that an injection axis of an injector of a dosing module extends into the mixer body, the mixer body configured to receive exhaust and treatment fluid, the mixer body centered on a mixer axis;

a plurality of apertures extending through the mixer body, each of the apertures configured to facilitate flow of the exhaust and the treatment fluid through the mixer body;

a plurality of blades, each of the blades coupled to the mixer body along a portion of one of the apertures, each of the blades extending radially outward from the mixer body;

a first end comprising:

a plurality of tabs, and a plurality of edge slots, each of the edge slots positioned between two of the tabs; and a second end opposite the first end, the second end comprising a flange extending radially outward from the mixer body, the flange comprises a mixer body edge contiguous with the mixer body and an outlet edge, wherein:

$$L = (R_{1f} - R_{2f})/\sin(\theta),$$

L is a length of the flange measured along the flange between the mixer body edge of the flange and the outlet edge of the flange, $R_{1f}$ is a first flange radius measured from the mixer axis to the outlet edge of the flange and 0.04 meters≤$R_{1f}$≤0.08 meters, $R_{2f}$ is a second flange radius measured from the mixer axis to the mixer body edge of the flange and is of the form $R_{2f}=R_{1e}/\alpha$, $R_{1e}$ is a first end radius measured from the mixer axis to the first end of the mixer and 0.02 meters≤$R_{1e}$≤0.05 meters, $\alpha$ is a radius ratio and $0.06 \leq \alpha \leq 0.09$, and $\theta$ is a flange angle measured relative to the mixer axis and 15 degrees≤$\theta$≤50 degrees.

27. A mixer for an exhaust aftertreatment system, the mixer comprising:

a mixer body positioned such that an injection axis of an injector of a dosing module extends into the mixer body, the mixer body configured to receive exhaust and treatment fluid;

a plurality of apertures extending through the mixer body, each of the apertures configured to facilitate flow of the exhaust and the treatment fluid through the mixer body;

a plurality of blades, each of the blades coupled to the mixer body along a portion of one of the apertures, each of the blades extending radially outward from the mixer body;

a first end comprising:

a plurality of tabs, and a plurality of edge slots, each of the edge slots positioned between two of the tabs;

a second end opposite the first end;

a first plate coupled to the second end and extending radially outward from the second end; and a second plate coupled to the second end and extending radially outward from the second end, wherein the first plate, the second plate, and the second end define a plate channel configured to facilitate flow of the exhaust therethrough such that the plate channel is only defined by the first plate, the second plate, and the second end.

28. A mixer for an exhaust aftertreatment system, the mixer comprising:

a mixer body positioned such that an injection axis of an injector of a dosing module extends into the mixer body, the mixer body configured to receive exhaust and treatment fluid;

a plurality of apertures extending through the mixer body, each of the apertures configured to facilitate flow of the exhaust and the treatment fluid through the mixer body;

a plurality of blades, each of the blades coupled to the mixer body along a portion of one of the apertures, each of the blades extending radially outward from the mixer body;

a first end comprising:

a plurality of tabs, and a plurality of edge slots, each of the edge slots positioned between two of the tabs; and an inner mixer disposed within the mixer body, the inner mixer comprising:

an inner mixer body positioned such that the injection axis extends into the inner mixer body, the inner mixer body configured to receive the exhaust and the treatment fluid, a plurality of inner apertures extending through the inner mixer body, each of the inner apertures configured to facilitate flow of the exhaust and the treatment fluid through the inner mixer body, and a plurality of inner blades, each of the inner blades coupled to the inner mixer body along a portion of one of the inner apertures, each of the inner blades extending radially outward from the inner mixer body.

* * * * *